(12) United States Patent
Bita et al.

(10) Patent No.: US 8,979,349 B2
(45) Date of Patent: Mar. 17, 2015

(54) ILLUMINATION DEVICES AND METHODS OF FABRICATION THEREOF

(75) Inventors: Ion Bita, San Jose, CA (US); Sapna Patel, San Jose, CA (US); Clayton Ka Tsun Chan, San Jose, CA (US); SuryaPrakash Ganti, San Jose, CA (US); Brian W. Arbuckle, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 886 days.

(21) Appl. No.: 12/789,404

(22) Filed: May 27, 2010

(65) Prior Publication Data

US 2010/0302803 A1 Dec. 2, 2010

Related U.S. Application Data

(60) Provisional application No. 61/182,594, filed on May 29, 2009, provisional application No. 61/292,783, filed on Jan. 6, 2010.

(51) Int. Cl.
*F21V 7/04* (2006.01)
*F21V 8/00* (2006.01)
(Continued)

(52) U.S. Cl.
CPC ............ *G02B 6/0036* (2013.01); *G02B 6/0065* (2013.01); *G02B 26/001* (2013.01); *G02F 2001/133616* (2013.01)
USPC ........... 362/623; 362/615; 362/616; 362/617; 362/618; 362/619; 362/620; 362/621; 362/622; 362/624; 362/625; 362/626; 362/627; 362/628; 362/629

(58) Field of Classification Search
USPC .................................. 362/600–634
See application file for complete search history.

(56) References Cited

U.S. PATENT DOCUMENTS

| 2,590,906 A | 4/1952 | Tripp |
| 2,677,714 A | 5/1954 | Auwarter |

(Continued)

FOREIGN PATENT DOCUMENTS

| CA | 2 490 975 | 1/2004 |
| CN | 2056903 U | 5/1990 |

(Continued)

OTHER PUBLICATIONS

Invitation to Pay Additional Fees received Aug. 23, 2010, for International Application No. PCT/US2010/036473.

(Continued)

*Primary Examiner* — William Carter
(74) *Attorney, Agent, or Firm* — Knobbe, Martens, Olson & Bear LLP

(57) ABSTRACT

Illumination devices and methods of making same are disclosed. In one embodiment, an illumination apparatus includes a light source, a light guide having a planar first surface, a first end and a second end, and a length therebetween, the light guide positioned to receive light from the light source into the light guide first end, and the light guide configured such that light from the light source provided into the first end of the light guide propagates towards the second end, and a plurality of light turning features that are configured to reflect light propagating towards the second end of the light guide out of the planar first surface of the light guide, each light turning feature having a turning surface and an interferometric stack formed on the turning surface.

38 Claims, 58 Drawing Sheets

(51) Int. Cl.
*G02B 26/00* (2006.01)
*G02F 1/1335* (2006.01)

(56) References Cited

U.S. PATENT DOCUMENTS

| | | |
|---|---|---|
| 3,247,392 A | 4/1966 | Thelen |
| 3,439,973 A | 4/1969 | Bernt |
| 3,679,313 A | 7/1972 | Robert |
| 3,728,030 A | 4/1973 | Hawes |
| 3,886,310 A | 5/1975 | Guldberg |
| 3,924,929 A | 12/1975 | Holmen et al. |
| 3,955,190 A | 5/1976 | Teraishi |
| 4,154,219 A | 5/1979 | Gupta et al. |
| 4,228,437 A | 10/1980 | Shelton |
| 4,282,862 A | 8/1981 | Soleau |
| 4,287,449 A | 9/1981 | Takeda et al. |
| 4,375,312 A | 3/1983 | Tangonan |
| 4,378,567 A | 3/1983 | Mir |
| 4,403,248 A | 9/1983 | Te Velde |
| 4,421,381 A | 12/1983 | Ueda |
| 4,441,789 A | 4/1984 | Pohlack |
| 4,441,791 A | 4/1984 | Hornbeck |
| 4,460,940 A | 7/1984 | Mori |
| 4,471,412 A | 9/1984 | Mori |
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |
| 4,705,361 A | 11/1987 | Frazier et al. |
| 4,779,959 A | 10/1988 | Saunders |
| 4,786,128 A | 11/1988 | Birnbach |
| 4,822,993 A | 4/1989 | Dillon et al. |
| 4,832,459 A | 5/1989 | Harper |
| 4,850,682 A | 7/1989 | Gerritsen |
| 4,859,060 A | 8/1989 | Katagiri et al. |
| 4,915,479 A | 4/1990 | Clarke |
| 4,918,577 A | 4/1990 | Furudate |
| 4,925,259 A | 5/1990 | Emmett |
| 4,947,291 A | 8/1990 | McDermott |
| 4,954,789 A | 9/1990 | Sampsell |
| 4,956,619 A | 9/1990 | Hornbeck |
| 4,961,617 A | 10/1990 | Shahidi |
| 4,973,131 A | 11/1990 | Carnes |
| 4,974,942 A | 12/1990 | Gross |
| 4,982,184 A | 1/1991 | Kirkwood |
| 5,022,745 A | 6/1991 | Zayhowski et al. |
| 5,028,939 A | 7/1991 | Hornbeck et al. |
| 5,042,921 A | 8/1991 | Sato et al. |
| 5,050,946 A | 9/1991 | Hathaway |
| 5,062,689 A | 11/1991 | Koehler |
| 5,091,983 A | 2/1992 | Lukosz |
| 5,096,279 A | 3/1992 | Hornbeck et al. |
| 5,110,370 A | 5/1992 | Vogeli et al. |
| 5,123,247 A | 6/1992 | Nelson |
| 5,136,483 A | 8/1992 | Schoniger et al. |
| 5,142,414 A | 8/1992 | Koehler |
| 5,151,801 A | 9/1992 | Hiroshima |
| 5,164,858 A | 11/1992 | Aguilera |
| 5,170,283 A | 12/1992 | O'Brien et al. |
| 5,206,747 A | 4/1993 | Wiley et al. |
| 5,221,982 A | 6/1993 | Faris |
| 5,226,099 A | 7/1993 | Mignardi et al. |
| 5,231,532 A | 7/1993 | Magel et al. |
| 5,261,970 A | 11/1993 | Landis et al. |
| 5,272,496 A | 12/1993 | Nicolas et al. |
| 5,278,680 A | 1/1994 | Karasawa et al. |
| 5,283,600 A | 2/1994 | Imai |
| 5,291,314 A | 3/1994 | Agranat et al. |
| 5,311,360 A | 5/1994 | Bloom et al. |
| 5,315,370 A | 5/1994 | Bulow |
| 5,326,426 A | 7/1994 | Tam |
| 5,339,179 A | 8/1994 | Rudisill |
| 5,341,242 A | 8/1994 | Gilboa et al. |
| 5,361,190 A | 11/1994 | Roberts et al. |
| 5,381,232 A | 1/1995 | Van Wijk |
| 5,387,953 A | 2/1995 | Minoura et al. |
| 5,387,991 A | 2/1995 | Mitsutake et al. |
| 5,422,683 A | 6/1995 | Tanigaki |
| 5,446,510 A | 8/1995 | Mitsutake et al. |
| 5,452,138 A | 9/1995 | Mignardi et al. |
| 5,452,385 A | 9/1995 | Izumi et al. |
| 5,467,417 A | 11/1995 | Nakamura et al. |
| 5,471,341 A | 11/1995 | Warde et al. |
| 5,474,865 A | 12/1995 | Vasudev |
| 5,481,385 A | 1/1996 | Zimmerman et al. |
| 5,497,293 A | 3/1996 | Noguchi et al. |
| 5,500,761 A | 3/1996 | Goossen et al. |
| 5,506,929 A | 4/1996 | Tai et al. |
| 5,515,184 A | 5/1996 | Caulfield et al. |
| 5,517,366 A | 5/1996 | Togino |
| 5,526,172 A | 6/1996 | Kanack |
| 5,544,268 A | 8/1996 | Bischel et al. |
| 5,550,373 A | 8/1996 | Cole |
| 5,555,160 A | 9/1996 | Tawara |
| 5,555,186 A | 9/1996 | Shioya |
| 5,559,358 A | 9/1996 | Burns et al. |
| 5,561,523 A | 10/1996 | Blomberg et al. |
| 5,579,149 A | 11/1996 | Moret et al. |
| 5,587,816 A | 12/1996 | Gunjima et al. |
| 5,592,332 A | 1/1997 | Nishio |
| 5,594,830 A | 1/1997 | Winston et al. |
| 5,597,736 A | 1/1997 | Sampsell |
| 5,600,383 A | 2/1997 | Hornbeck |
| 5,601,351 A | 2/1997 | Van Den Brandt |
| 5,606,441 A | 2/1997 | Florence et al. |
| 5,615,024 A | 3/1997 | May et al. |
| 5,626,408 A | 5/1997 | Heynderickx et al. |
| 5,633,739 A | 5/1997 | Matsuyama |
| 5,636,052 A | 6/1997 | Arney et al. |
| 5,646,729 A | 7/1997 | Koskinen et al. |
| 5,646,768 A | 7/1997 | Kaeriyama |
| 5,647,036 A | 7/1997 | Deacon |
| 5,648,642 A | 7/1997 | Miller et al. |
| 5,650,865 A | 7/1997 | Smith |
| 5,659,410 A | 8/1997 | Koike et al. |
| 5,661,592 A | 8/1997 | Bornstein et al. |
| 5,664,862 A | 9/1997 | Redmond et al. |
| 5,665,997 A | 9/1997 | Weaver et al. |
| 5,671,994 A | 9/1997 | Tai |
| 5,673,128 A | 9/1997 | Ohta et al. |
| 5,699,181 A | 12/1997 | Choi |
| 5,703,667 A | 12/1997 | Ochiai |
| 5,710,656 A | 1/1998 | Goossen |
| 5,712,694 A | 1/1998 | Taira et al. |
| 5,719,068 A | 2/1998 | Suzawa et al. |
| 5,731,857 A | 3/1998 | Neijzen |
| 5,734,177 A | 3/1998 | Sakamoto |
| 5,735,590 A | 4/1998 | Kashima et al. |
| 5,749,642 A | 5/1998 | Kimura et al. |
| 5,751,492 A | 5/1998 | Meyers |
| 5,754,260 A | 5/1998 | Ooi |
| 5,771,116 A | 6/1998 | Miller et al. |
| 5,771,321 A | 6/1998 | Stern |
| 5,772,299 A | 6/1998 | Koo et al. |
| 5,777,589 A | 7/1998 | Gale et al. |
| 5,783,614 A | 7/1998 | Chen |
| 5,786,927 A | 7/1998 | Greywall |
| 5,805,117 A | 9/1998 | Mazurek |
| 5,808,708 A | 9/1998 | Oyama et al. |
| 5,808,781 A | 9/1998 | Arney et al. |
| 5,810,464 A | 9/1998 | Ishikawa et al. |
| 5,815,229 A | 9/1998 | Shapiro |
| 5,818,095 A | 10/1998 | Sampsell |
| 5,825,528 A | 10/1998 | Goossen |
| 5,835,255 A | 11/1998 | Miles |
| 5,838,484 A | 11/1998 | Goossen |
| 5,845,035 A | 12/1998 | Wimberger-Friedl |
| 5,853,240 A | 12/1998 | Tanaka et al. |
| 5,854,872 A | 12/1998 | Tai |
| 5,867,302 A | 2/1999 | Fleming |
| 5,870,221 A | 2/1999 | Goossen |
| 5,883,684 A | 3/1999 | Millikan et al. |
| 5,892,598 A | 4/1999 | Asakawa et al. |
| 5,913,594 A | 6/1999 | Iimura |

(56) References Cited

U.S. PATENT DOCUMENTS

| | | |
|---|---|---|
| 5,914,760 A | 6/1999 | Daiku |
| 5,914,804 A | 6/1999 | Goossen |
| 5,920,417 A | 7/1999 | Johnson |
| 5,920,418 A | 7/1999 | Shiono et al. |
| 5,933,183 A | 8/1999 | Enomoto |
| 5,961,198 A | 10/1999 | Hira et al. |
| 5,961,848 A | 10/1999 | Jacquet et al. |
| 5,975,703 A | 11/1999 | Holman et al. |
| 5,982,540 A | 11/1999 | Koike et al. |
| 5,991,073 A | 11/1999 | Woodgate et al. |
| 6,002,829 A | 12/1999 | Winston et al. |
| 6,008,449 A | 12/1999 | Cole |
| 6,014,192 A | 1/2000 | Lehureau et al. |
| 6,021,007 A | 2/2000 | Murtha |
| 6,023,373 A | 2/2000 | Inoguchi et al. |
| 6,028,689 A | 2/2000 | Michalicek et al. |
| 6,031,653 A | 2/2000 | Wang |
| 6,040,937 A | 3/2000 | Miles |
| 6,046,659 A | 4/2000 | Loo et al. |
| 6,048,071 A | 4/2000 | Sawayama |
| 6,049,317 A | 4/2000 | Thompson et al. |
| 6,055,090 A | 4/2000 | Miles |
| 6,073,034 A | 6/2000 | Jacobsen et al. |
| 6,074,069 A | 6/2000 | Chao-Ching |
| 6,091,469 A | 7/2000 | Naito |
| 6,094,285 A | 7/2000 | Wickham et al. |
| 6,099,134 A | 8/2000 | Taniguchi |
| 6,100,861 A | 8/2000 | Cohen et al. |
| 6,104,454 A | 8/2000 | Hiyama et al. |
| 6,123,431 A | 9/2000 | Teragaki et al. |
| 6,124,851 A | 9/2000 | Jacobson |
| 6,128,077 A | 10/2000 | Jovin et al. |
| 6,147,725 A | 11/2000 | Yuuki et al. |
| 6,151,089 A | 11/2000 | Yang et al. |
| 6,158,156 A | 12/2000 | Patrick |
| 6,195,196 B1 | 2/2001 | Kimura |
| 6,196,691 B1 | 3/2001 | Ochiai |
| 6,199,989 B1 | 3/2001 | Maeda et al. |
| 6,211,853 B1 | 4/2001 | Takeuchi et al. |
| 6,213,606 B1 | 4/2001 | Holman et al. |
| 6,232,937 B1 | 5/2001 | Jacobsen et al. |
| 6,242,932 B1 | 6/2001 | Hembree |
| 6,259,082 B1 | 7/2001 | Fujimoto et al. |
| 6,262,697 B1 | 7/2001 | Stephenson |
| 6,273,577 B1 | 8/2001 | Goto et al. |
| 6,282,010 B1 | 8/2001 | Sulzbach |
| 6,283,602 B1 | 9/2001 | Kawaguchi et al. |
| 6,285,424 B1 | 9/2001 | Yoshida |
| 6,288,824 B1 | 9/2001 | Kastalsky |
| 6,292,504 B1 | 9/2001 | Halmos |
| 6,301,000 B1 | 10/2001 | Johnson |
| 6,305,813 B1 | 10/2001 | Lekson et al. |
| 6,322,236 B1 | 11/2001 | Campbell et al. |
| 6,323,415 B1 | 11/2001 | Uematsu et al. |
| 6,323,987 B1 | 11/2001 | Rinaudo et al. |
| 6,327,071 B1 | 12/2001 | Kimura |
| 6,335,235 B1 | 1/2002 | Bhakta et al. |
| 6,342,970 B1 | 1/2002 | Sperger |
| 6,351,329 B1 | 2/2002 | Greywall |
| 6,356,378 B1 | 3/2002 | Huibers |
| 6,359,668 B1 | 3/2002 | Iijima et al. |
| 6,368,885 B1 | 4/2002 | Offenberg et al. |
| 6,369,947 B1 | 4/2002 | Staub et al. |
| 6,375,327 B2 | 4/2002 | Holman et al. |
| 6,377,233 B2 | 4/2002 | Colgan |
| 6,379,017 B2 | 4/2002 | Nakabayashi et al. |
| 6,381,022 B1 | 4/2002 | Zavracky |
| 6,384,952 B1 | 5/2002 | Clark et al. |
| 6,392,368 B1 | 5/2002 | Deller et al. |
| 6,399,257 B1 | 6/2002 | Shirota et al. |
| 6,400,738 B1 | 6/2002 | Tucker et al. |
| 6,402,325 B1 | 6/2002 | Yamamoto |
| 6,407,785 B1 | 6/2002 | Yamazaki |
| 6,411,423 B2 | 6/2002 | Ham |
| 6,412,969 B1 | 7/2002 | Torihara et al. |
| 6,421,103 B2 | 7/2002 | Yamaguchi |
| 6,431,716 B1 | 8/2002 | Kusakabe |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,442,124 B1 | 8/2002 | Chung et al. |
| 6,448,709 B1 | 9/2002 | Chuang |
| 6,452,652 B1 | 9/2002 | Moore |
| 6,452,712 B2 | 9/2002 | Atobe et al. |
| 6,454,452 B1 | 9/2002 | Sasagawa |
| 6,456,279 B1 | 9/2002 | Kubo |
| 6,466,354 B1 | 10/2002 | Gudeman |
| 6,474,826 B1 | 11/2002 | Tanaka et al. |
| 6,480,634 B1 | 11/2002 | Corrigan |
| 6,483,613 B1 | 11/2002 | Woodgate |
| 6,494,588 B1 | 12/2002 | Okada |
| 6,512,626 B1 | 1/2003 | Schmidt |
| 6,519,073 B1 | 2/2003 | Goossen |
| 6,519,379 B1 | 2/2003 | Izawa et al. |
| 6,520,643 B1 | 2/2003 | Holman et al. |
| 6,522,373 B1 | 2/2003 | Hira et al. |
| 6,522,794 B1 | 2/2003 | Bischel |
| 6,527,410 B2 | 3/2003 | Yamaguchi |
| 6,529,854 B2 | 3/2003 | Kida et al. |
| 6,540,368 B2 | 4/2003 | Akaoka |
| 6,561,661 B2 | 5/2003 | Egawa |
| 6,565,225 B2 | 5/2003 | Mabuchi et al. |
| 6,574,033 B1 | 6/2003 | Chui |
| 6,582,095 B1 | 6/2003 | Toyoda |
| 6,592,234 B2 | 7/2003 | Epstein |
| 6,597,490 B2 | 7/2003 | Tayebati |
| 6,598,987 B1 | 7/2003 | Parikka |
| 6,601,984 B2 | 8/2003 | Yamamoto et al. |
| 6,603,520 B2 | 8/2003 | Umemoto |
| 6,608,268 B1 | 8/2003 | Goldsmith |
| 6,613,620 B2 | 9/2003 | Fujimoto et al. |
| 6,628,246 B1 | 9/2003 | Van |
| 6,630,786 B2 | 10/2003 | Cummings et al. |
| 6,630,968 B1 | 10/2003 | Tsuchihashi et al. |
| 6,631,998 B2 | 10/2003 | Egawa et al. |
| 6,632,698 B2 | 10/2003 | Ives |
| 6,636,322 B1 | 10/2003 | Terashita |
| 6,636,358 B2 | 10/2003 | Umemoto et al. |
| 6,642,913 B1 | 11/2003 | Kimura |
| 6,643,067 B2 | 11/2003 | Miyamae |
| 6,650,455 B2 | 11/2003 | Miles |
| 6,652,109 B2 | 11/2003 | Nakamura |
| 6,657,683 B2 | 12/2003 | Richard |
| 6,657,700 B2 | 12/2003 | Sako et al. |
| 6,657,832 B2 | 12/2003 | Williams et al. |
| 6,659,615 B2 | 12/2003 | Umemoto |
| 6,660,997 B2 | 12/2003 | Laberge et al. |
| 6,661,561 B2 | 12/2003 | Fitzpatrick et al. |
| 6,667,782 B1 | 12/2003 | Taira et al. |
| 6,669,350 B2 | 12/2003 | Yamashita |
| 6,674,562 B1 | 1/2004 | Miles |
| 6,680,792 B2 | 1/2004 | Miles |
| 6,683,693 B1 | 1/2004 | O'Tsuka |
| 6,685,342 B2 | 2/2004 | Terada |
| 6,687,040 B2 | 2/2004 | Kimura |
| 6,693,690 B2 | 2/2004 | Umemoto et al. |
| 6,698,295 B1 | 3/2004 | Sherrer |
| 6,706,339 B1 | 3/2004 | Miyatake et al. |
| 6,709,123 B2 | 3/2004 | Flohr |
| 6,710,908 B2 | 3/2004 | Miles et al. |
| 6,738,194 B1 | 5/2004 | Ramirez et al. |
| 6,741,377 B2 | 5/2004 | Miles |
| 6,742,907 B2 | 6/2004 | Funamoto et al. |
| 6,742,921 B2 | 6/2004 | Umemoto et al. |
| 6,747,801 B2 | 6/2004 | Umemoto |
| 6,751,023 B2 | 6/2004 | Umemoto et al. |
| 6,760,146 B2 | 7/2004 | Ikeda et al. |
| 6,761,461 B2 | 7/2004 | Mizutani et al. |
| 6,768,555 B2 | 7/2004 | Chen et al. |
| 6,773,126 B1 | 8/2004 | Hatjasalo |
| 6,778,746 B2 | 8/2004 | Charlton et al. |
| 6,792,293 B1 | 9/2004 | Awan et al. |
| 6,794,119 B2 | 9/2004 | Miles |
| 6,799,860 B2 | 10/2004 | Nakaoka et al. |

(56) References Cited

U.S. PATENT DOCUMENTS

| | | |
|---|---|---|
| 6,813,059 B2 | 11/2004 | Hunter et al. |
| 6,819,380 B2 | 11/2004 | Wen et al. |
| 6,828,606 B2 | 12/2004 | Glebov |
| 6,829,258 B1 | 12/2004 | Carlisle et al. |
| 6,836,366 B1 | 12/2004 | Flanders et al. |
| 6,841,081 B2 | 1/2005 | Chang et al. |
| 6,841,787 B2 | 1/2005 | Almogy |
| 6,844,959 B2 | 1/2005 | Huibers |
| 6,849,471 B2 | 2/2005 | Patel et al. |
| 6,852,396 B1 | 2/2005 | Mineo |
| 6,862,127 B1 | 3/2005 | Ishii |
| 6,862,141 B2 | 3/2005 | Olczak |
| 6,863,413 B1 | 3/2005 | Umemoto |
| 6,863,428 B2 | 3/2005 | Lundin |
| 6,864,882 B2 | 3/2005 | Newton |
| 6,865,312 B2 | 3/2005 | Niv et al. |
| 6,867,896 B2 | 3/2005 | Miles |
| 6,870,654 B2 | 3/2005 | Lin et al. |
| 6,871,982 B2 | 3/2005 | Holman et al. |
| 6,879,354 B1 | 4/2005 | Sawayama |
| 6,880,959 B2 | 4/2005 | Houston |
| 6,882,458 B2 | 4/2005 | Lin et al. |
| 6,882,461 B1 | 4/2005 | Tsai |
| 6,883,924 B2 | 4/2005 | Maeda et al. |
| 6,885,377 B2 | 4/2005 | Lim |
| 6,891,530 B2 | 5/2005 | Umemoto |
| 6,891,658 B2 | 5/2005 | Whitehead et al. |
| 6,892,009 B2 | 5/2005 | Ito et al. |
| 6,896,386 B2 | 5/2005 | Kitazawa et al. |
| 6,897,855 B1 | 5/2005 | Matthies et al. |
| 6,912,022 B2 | 6/2005 | Lin |
| 6,913,942 B2 | 7/2005 | Patel et al. |
| 6,917,469 B2 | 7/2005 | Momose |
| 6,930,816 B2 | 8/2005 | Mochizuki |
| 6,940,630 B2 | 9/2005 | Xie |
| 6,947,200 B2 | 9/2005 | Huibers |
| 6,951,401 B2 | 10/2005 | Van Hees et al. |
| 6,952,303 B2 | 10/2005 | Lin et al. |
| 6,958,847 B2 | 10/2005 | Lin |
| 6,960,305 B2 | 11/2005 | Doan et al. |
| 6,961,045 B2 | 11/2005 | Tsao |
| 6,964,484 B2 | 11/2005 | Gupta |
| 6,966,685 B2 | 11/2005 | Li et al. |
| 6,967,779 B2 | 11/2005 | Fadel et al. |
| 6,972,753 B1 | 12/2005 | Kimura et al. |
| 6,972,827 B2 | 12/2005 | Mi |
| 6,980,350 B2 | 12/2005 | Hung et al. |
| 6,982,820 B2 | 1/2006 | Tsai |
| 6,998,196 B2 | 2/2006 | Rich et al. |
| 7,002,726 B2 | 2/2006 | Patel |
| 7,006,272 B2 | 2/2006 | Tsai |
| 7,009,754 B2 | 3/2006 | Huibers |
| 7,010,212 B2 | 3/2006 | Emmons et al. |
| 7,014,349 B2 | 3/2006 | Shinohara et al. |
| 7,018,088 B2 | 3/2006 | Yu et al. |
| 7,019,734 B2 | 3/2006 | Cross et al. |
| 7,027,204 B2 | 4/2006 | Trisnadi et al. |
| 7,041,344 B2 | 5/2006 | Kusume et al. |
| 7,042,444 B2 | 5/2006 | Cok |
| 7,042,643 B2 | 5/2006 | Miles |
| 7,046,422 B2 | 5/2006 | Kimura et al. |
| 7,048,426 B2 | 5/2006 | Kao et al. |
| 7,050,219 B2 | 5/2006 | Kimura |
| 7,056,001 B2 | 6/2006 | Chuang |
| 7,061,226 B2 | 6/2006 | Durr |
| 7,072,093 B2 | 7/2006 | Piehl |
| 7,072,096 B2 | 7/2006 | Holman et al. |
| 7,092,163 B2 | 8/2006 | Bastawros et al. |
| 7,110,158 B2 | 9/2006 | Miles |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,128,459 B2 | 10/2006 | Igarashi et al. |
| 7,130,104 B2 | 10/2006 | Cummings |
| 7,133,022 B2 | 11/2006 | Grabert |
| 7,138,984 B1 | 11/2006 | Miles |
| 7,142,347 B2 | 11/2006 | Islam |
| 7,156,546 B2 | 1/2007 | Higashiyama |
| 7,161,136 B1 | 1/2007 | Wenstrand et al. |
| 7,161,730 B2 | 1/2007 | Floyd |
| 7,180,672 B2 | 2/2007 | Olczak |
| 7,184,195 B2 | 2/2007 | Yang |
| 7,184,202 B2 | 2/2007 | Miles et al. |
| 7,186,014 B2 | 3/2007 | Shimura |
| 7,187,489 B2 | 3/2007 | Miles |
| 7,198,973 B2 | 4/2007 | Lin et al. |
| 7,206,133 B2 | 4/2007 | Cassarly et al. |
| 7,210,806 B2 | 5/2007 | Holman et |
| 7,212,345 B2 | 5/2007 | Wilson |
| 7,218,429 B2 | 5/2007 | Batchko |
| 7,218,812 B2 | 5/2007 | Maxwell et al. |
| 7,221,495 B2 | 5/2007 | Miles et al. |
| 7,223,010 B2 | 5/2007 | Min et al. |
| 7,234,854 B2 | 6/2007 | Masamoto |
| 7,236,284 B2 | 6/2007 | Miles |
| 7,236,663 B2 | 6/2007 | Wakita et al. |
| 7,245,285 B2 | 7/2007 | Yeh et al. |
| 7,256,922 B2 | 8/2007 | Chui |
| 7,262,754 B1 | 8/2007 | Yamazaki |
| 7,262,916 B2 | 8/2007 | Kao et al. |
| 7,265,800 B2 | 9/2007 | Jagt et al. |
| 7,278,774 B2 | 10/2007 | Chang |
| 7,289,259 B2 | 10/2007 | Chui et al. |
| 7,290,917 B2 | 11/2007 | Cho et al. |
| 7,302,157 B2 | 11/2007 | Chui |
| 7,304,784 B2 | 12/2007 | Chui et al. |
| 7,321,456 B2 | 1/2008 | Cummings |
| 7,321,457 B2 | 1/2008 | Heald |
| 7,324,284 B2 | 1/2008 | Olczak |
| 7,327,510 B2 | 2/2008 | Cummings et al. |
| 7,336,329 B2 | 2/2008 | Yoon |
| 7,342,705 B2 | 3/2008 | Chui et al. |
| 7,342,709 B2 | 3/2008 | Lin |
| 7,349,139 B2 | 3/2008 | Chui et al. |
| 7,349,141 B2 | 3/2008 | Tung |
| 7,352,501 B2 | 4/2008 | Chopra et al. |
| 7,352,940 B2 | 4/2008 | Charters et al. |
| 7,355,780 B2 | 4/2008 | Chui et al. |
| 7,359,011 B2 | 4/2008 | Hamada et al. |
| 7,360,899 B2 | 4/2008 | McGuire, Jr. et al. |
| 7,360,939 B2 | 4/2008 | Sugiura |
| 7,366,393 B2 | 4/2008 | Cassarly |
| 7,372,613 B2 | 5/2008 | Chui et al. |
| 7,372,619 B2 | 5/2008 | Miles |
| 7,374,327 B2 | 5/2008 | Schexnaider |
| 7,375,779 B2 | 5/2008 | Lee et al. |
| 7,376,308 B2 | 5/2008 | Cheben et al. |
| 7,380,969 B2 | 6/2008 | Yamashita |
| 7,380,970 B2 | 6/2008 | Hwang et al. |
| 7,385,744 B2 | 6/2008 | Kogut et al. |
| 7,385,762 B2 | 6/2008 | Cummings |
| 7,388,706 B2 | 6/2008 | Miles |
| 7,400,439 B2 | 7/2008 | Holman |
| 7,400,488 B2 | 7/2008 | Lynch et al. |
| 7,405,852 B2 | 7/2008 | Hagood et al. |
| 7,417,746 B2 | 8/2008 | Lin et al. |
| 7,417,784 B2 | 8/2008 | Sasagawa |
| 7,420,638 B2 | 9/2008 | Tasaka et al. |
| 7,436,573 B2 | 10/2008 | Doan et al. |
| 7,450,295 B2 | 11/2008 | Tung |
| 7,452,120 B2 | 11/2008 | Lee et al. |
| 7,459,402 B2 | 12/2008 | Doan et al. |
| 7,460,292 B2 | 12/2008 | Chou |
| 7,476,327 B2 | 1/2009 | Tung et al. |
| 7,477,440 B1 | 1/2009 | Huang |
| 7,477,809 B1 | 1/2009 | Tan et al. |
| 7,492,503 B2 | 2/2009 | Chui |
| 7,494,830 B2 | 2/2009 | Liu et al. |
| 7,508,566 B2 | 3/2009 | Feenstra et al. |
| 7,515,327 B2 | 4/2009 | Cummings |
| 7,515,336 B2 | 4/2009 | Lippey et al. |
| 7,520,642 B2 | 4/2009 | Holman et al. |
| 7,527,995 B2 | 5/2009 | Sampsell |

(56) References Cited

U.S. PATENT DOCUMENTS

| | | |
|---|---|---|
| 7,532,377 B2 | 5/2009 | Miles |
| 7,532,800 B2 | 5/2009 | Iimura |
| 7,535,621 B2 | 5/2009 | Chiang |
| 7,542,198 B2 | 6/2009 | Kothari |
| 7,543,974 B2 | 6/2009 | Bourdelais et al. |
| 7,545,569 B2 | 6/2009 | Cassarly |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,561,321 B2 | 7/2009 | Heald |
| 7,561,323 B2 | 7/2009 | Gally |
| 7,564,612 B2 | 7/2009 | Chui |
| 7,566,664 B2 | 7/2009 | Yan et al. |
| 7,567,373 B2 | 7/2009 | Chui et al. |
| 7,569,488 B2 | 8/2009 | Rafanan |
| 7,573,550 B2 | 8/2009 | Lubart et al. |
| 7,573,631 B1 | 8/2009 | Amm |
| 7,603,001 B2 | 10/2009 | Wang |
| 7,612,932 B2 | 11/2009 | Chui et al. |
| 7,612,933 B2 | 11/2009 | Djordjev |
| 7,629,197 B2 | 12/2009 | Luo et al. |
| 7,630,119 B2 | 12/2009 | Tung et al. |
| 7,630,121 B2 | 12/2009 | Endisch et al. |
| 7,643,199 B2 | 1/2010 | Lan |
| 7,643,202 B2 | 1/2010 | Sasagawa |
| 7,649,671 B2 | 1/2010 | Kothari et al. |
| 7,653,371 B2 | 1/2010 | Floyd |
| 7,656,391 B2 | 2/2010 | Kimura et al. |
| 7,663,714 B2 | 2/2010 | Haga et al. |
| 7,663,794 B2 | 2/2010 | Cummings |
| 7,672,035 B2 | 3/2010 | Sampsell et al. |
| 7,692,844 B2 | 4/2010 | Miles |
| 7,704,772 B2 | 4/2010 | Tung et al. |
| 7,706,050 B2 | 4/2010 | Sampsell |
| 7,715,079 B2 | 5/2010 | Kogut et al. |
| 7,715,085 B2 | 5/2010 | Sasagawa |
| 7,719,500 B2 | 5/2010 | Chui |
| 7,719,747 B2 | 5/2010 | Tung |
| 7,733,439 B2 | 6/2010 | Sampsell |
| 7,738,157 B2 | 6/2010 | Miles |
| 7,742,123 B2 | 6/2010 | Jung |
| 7,742,220 B2 | 6/2010 | Kogut et al. |
| 7,746,539 B2 | 6/2010 | Sampsell |
| 7,750,886 B2 | 7/2010 | Sampsell |
| 7,766,498 B2 | 8/2010 | Sampsell |
| 7,766,531 B2 | 8/2010 | Anderson et al. |
| 7,768,690 B2 | 8/2010 | Sampsell |
| 7,773,286 B2 | 8/2010 | Mignard |
| 7,777,954 B2 | 8/2010 | Gruhlke et al. |
| 7,782,517 B2 | 8/2010 | Griffiths et al. |
| 7,782,523 B2 | 8/2010 | Ishii |
| 7,787,173 B2 | 8/2010 | Chui |
| 7,807,488 B2 | 10/2010 | Gally |
| 7,808,694 B2 | 10/2010 | Miles |
| 7,813,029 B2 | 10/2010 | Kothari et al. |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,835,061 B2 | 11/2010 | Kogut et al. |
| 7,839,557 B2 | 11/2010 | Chui et al. |
| 7,847,880 B2 | 12/2010 | Kim et al. |
| 7,847,999 B2 | 12/2010 | Lee et al. |
| 7,848,003 B2 | 12/2010 | Kothari et al. |
| 7,852,544 B2 | 12/2010 | Sampsell et al. |
| 7,852,545 B2 | 12/2010 | Miles |
| 7,855,826 B2 | 12/2010 | De Groot et al. |
| 7,855,827 B2 | 12/2010 | Xu et al. |
| 7,864,395 B2 | 1/2011 | Chui |
| 7,872,394 B1 | 1/2011 | Gritters et al. |
| 7,880,954 B2 | 2/2011 | Sampsell |
| 7,898,722 B2 | 3/2011 | Miles |
| 7,916,378 B2 | 3/2011 | Wang |
| 7,927,003 B2 | 4/2011 | Chang |
| 7,933,475 B2 | 4/2011 | Wang |
| 7,969,531 B1 | 6/2011 | Li et al. |
| 7,986,451 B2 | 7/2011 | Gally et al. |
| 8,053,987 B2 | 11/2011 | Egi et al. |
| 8,402,647 B2 | 3/2013 | Chui et al. |
| 2001/0003487 A1 | 6/2001 | Miles |
| 2001/0003504 A1 | 6/2001 | Ishihara et al. |
| 2001/0019240 A1 | 9/2001 | Takahashi |
| 2001/0019380 A1 | 9/2001 | Ishihara |
| 2001/0019479 A1 | 9/2001 | Nakabayashi |
| 2001/0022636 A1 | 9/2001 | Yang et al. |
| 2001/0028503 A1 | 10/2001 | Flanders et al. |
| 2001/0030861 A1 | 10/2001 | Oda et al. |
| 2001/0043171 A1 | 11/2001 | Van Gorkom et al. |
| 2001/0049061 A1 | 12/2001 | Nakagaki |
| 2001/0055076 A1 | 12/2001 | Ochi et al. |
| 2001/0055208 A1 | 12/2001 | Kimura |
| 2002/0001189 A1 | 1/2002 | Egawa et al. |
| 2002/0006036 A1 | 1/2002 | Egawa et al. |
| 2002/0034071 A1 | 3/2002 | Mabuchi |
| 2002/0044233 A1 | 4/2002 | Ohkawa |
| 2002/0044445 A1 | 4/2002 | Bohler et al. |
| 2002/0048444 A1 | 4/2002 | Sung et al. |
| 2002/0054258 A1 | 5/2002 | Kondo et al. |
| 2002/0057403 A1 | 5/2002 | Yasukawa et al. |
| 2002/0060907 A1 | 5/2002 | Saccomanno |
| 2002/0070931 A1 | 6/2002 | Ishikawa |
| 2002/0075245 A1 | 6/2002 | Kawashima |
| 2002/0075555 A1 | 6/2002 | Miles |
| 2002/0080465 A1 | 6/2002 | Han |
| 2002/0101551 A1 | 8/2002 | Akaoka |
| 2002/0106182 A1 | 8/2002 | Kawashima |
| 2002/0113241 A1 | 8/2002 | Kubota et al. |
| 2002/0131151 A1 | 9/2002 | Engler et al. |
| 2002/0146200 A1 | 10/2002 | Kudrle et al. |
| 2002/0149584 A1 | 10/2002 | Simpson |
| 2002/0149834 A1 | 10/2002 | Mei et al. |
| 2002/0154256 A1 | 10/2002 | Gotoh et al. |
| 2002/0154422 A1 | 10/2002 | Sniegowski et al. |
| 2002/0167730 A1 | 11/2002 | Needham |
| 2002/0172039 A1 | 11/2002 | Inditsky |
| 2002/0176035 A1 | 11/2002 | Yamazaki |
| 2002/0197761 A1 | 12/2002 | Patel et al. |
| 2003/0001985 A1 | 1/2003 | Doe |
| 2003/0011720 A1 | 1/2003 | Kawashima et al. |
| 2003/0011864 A1 | 1/2003 | Flanders |
| 2003/0012009 A1 | 1/2003 | Suzuki et al. |
| 2003/0016428 A1 | 1/2003 | Kato et al. |
| 2003/0016930 A1 | 1/2003 | Inditsky |
| 2003/0020189 A1 | 1/2003 | Chen et al. |
| 2003/0026536 A1 | 2/2003 | Ho |
| 2003/0030764 A1 | 2/2003 | Lee |
| 2003/0034445 A1 | 2/2003 | Boyd et al. |
| 2003/0035196 A1 | 2/2003 | Walker |
| 2003/0046842 A1 | 3/2003 | Maas et al. |
| 2003/0053078 A1 | 3/2003 | Missey et al. |
| 2003/0067760 A1 | 4/2003 | Jagt et al. |
| 2003/0071947 A1 | 4/2003 | Shiraogawa |
| 2003/0083429 A1 | 5/2003 | Smith |
| 2003/0086030 A1 | 5/2003 | Taniguchi |
| 2003/0086031 A1 | 5/2003 | Taniguchi |
| 2003/0095401 A1 | 5/2003 | Hanson |
| 2003/0098957 A1 | 5/2003 | Haldiman |
| 2003/0099118 A1 | 5/2003 | Saitoh et al. |
| 2003/0103177 A1 | 6/2003 | Maeda et al. |
| 2003/0103344 A1 | 6/2003 | Niida |
| 2003/0107692 A1 | 6/2003 | Sekiguchi |
| 2003/0119221 A1 | 6/2003 | Cunningham et al. |
| 2003/0123125 A1 | 7/2003 | Little |
| 2003/0123245 A1 | 7/2003 | Parker |
| 2003/0138669 A1 | 7/2003 | Kojima et al. |
| 2003/0151821 A1 | 8/2003 | Favalora |
| 2003/0160919 A1 | 8/2003 | Suzuki |
| 2003/0161040 A1 | 8/2003 | Ishii |
| 2003/0165067 A1 | 9/2003 | Imamura |
| 2003/0169385 A1 | 9/2003 | Okuwaki |
| 2003/0173504 A1 | 9/2003 | Cole et al. |
| 2003/0174261 A1 | 9/2003 | Sugiura et al. |
| 2003/0184989 A1 | 10/2003 | Matsumoto et al. |

(56) References Cited

U.S. PATENT DOCUMENTS

| | | |
|---|---|---|
| 2003/0193630 A1 | 10/2003 | Chiou |
| 2003/0202265 A1 | 10/2003 | Reboa et al. |
| 2003/0202266 A1 | 10/2003 | Ring et al. |
| 2003/0210222 A1 | 11/2003 | Ogiwara et al. |
| 2003/0210363 A1 | 11/2003 | Yasukawa |
| 2003/0210367 A1 | 11/2003 | Nakano |
| 2003/0214728 A1 | 11/2003 | Olczak |
| 2003/0231483 A1 | 12/2003 | Higashiyama |
| 2004/0001169 A1 | 1/2004 | Saiki |
| 2004/0008396 A1 | 1/2004 | Stappaerts |
| 2004/0008438 A1 | 1/2004 | Sato |
| 2004/0017599 A1 | 1/2004 | Yang |
| 2004/0027315 A1 | 2/2004 | Senda et al. |
| 2004/0027671 A1 | 2/2004 | Wu et al. |
| 2004/0027701 A1 | 2/2004 | Ishikawa |
| 2004/0032401 A1 | 2/2004 | Nakazawa et al. |
| 2004/0032659 A1 | 2/2004 | Drinkwater |
| 2004/0042233 A1 | 3/2004 | Suzuki et al. |
| 2004/0043552 A1 | 3/2004 | Strumpell et al. |
| 2004/0051929 A1 | 3/2004 | Sampsell |
| 2004/0061946 A1 | 4/2004 | Yoshikawa et al. |
| 2004/0066477 A1 | 4/2004 | Morimoto |
| 2004/0070711 A1 | 4/2004 | Wen |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0080807 A1 | 4/2004 | Chen et al. |
| 2004/0085748 A1 | 5/2004 | Sugiura |
| 2004/0100594 A1 | 5/2004 | Huibers et al. |
| 2004/0100677 A1 | 5/2004 | Huibers et al. |
| 2004/0100796 A1 | 5/2004 | Ward |
| 2004/0109305 A1 | 6/2004 | Chisholm et al. |
| 2004/0115339 A1 | 6/2004 | Ito |
| 2004/0125048 A1 | 7/2004 | Fukuda et al. |
| 2004/0135494 A1 | 7/2004 | Miyatake |
| 2004/0137361 A1 | 7/2004 | French et al. |
| 2004/0145811 A1 | 7/2004 | Lin et al. |
| 2004/0147198 A1 | 7/2004 | Lin et al. |
| 2004/0170373 A1 | 9/2004 | Kim |
| 2004/0175577 A1 | 9/2004 | Lin et al. |
| 2004/0184134 A1 | 9/2004 | Makigaki |
| 2004/0188599 A1 | 9/2004 | Viktorovitch |
| 2004/0207897 A1 | 10/2004 | Lin |
| 2004/0207995 A1 | 10/2004 | Park et al. |
| 2004/0209195 A1 | 10/2004 | Lin |
| 2004/0217264 A1 | 11/2004 | Wood et al. |
| 2004/0217919 A1 | 11/2004 | Piehl |
| 2004/0218251 A1 | 11/2004 | Piehl et al. |
| 2004/0228109 A1 | 11/2004 | Leu |
| 2004/0228112 A1 | 11/2004 | Takata |
| 2004/0233357 A1 | 11/2004 | Fujimori |
| 2004/0245511 A1 | 12/2004 | Fujimori et al. |
| 2004/0246743 A1 | 12/2004 | Lee et al. |
| 2004/0259010 A1 | 12/2004 | Kanbe |
| 2005/0002082 A1 | 1/2005 | Miles |
| 2005/0002175 A1 | 1/2005 | Matsui et al. |
| 2005/0003667 A1 | 1/2005 | Lin et al. |
| 2005/0010568 A1 | 1/2005 | Nagatomo |
| 2005/0024557 A1 | 2/2005 | Lin |
| 2005/0024849 A1 | 2/2005 | Parker |
| 2005/0024890 A1 | 2/2005 | Yamamoto |
| 2005/0030732 A1 | 2/2005 | Kimura et al. |
| 2005/0035699 A1 | 2/2005 | Tsai |
| 2005/0036095 A1 | 2/2005 | Yeh et al. |
| 2005/0041175 A1 | 2/2005 | Akiyama |
| 2005/0046011 A1 | 3/2005 | Chen |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0069254 A1 | 3/2005 | Schultheis |
| 2005/0078348 A1 | 4/2005 | Lin |
| 2005/0088719 A1 | 4/2005 | Patel |
| 2005/0116924 A1 | 6/2005 | Sauvante et al. |
| 2005/0117190 A1 | 6/2005 | Iwauchi et al. |
| 2005/0117623 A1 | 6/2005 | Shchukin et al. |
| 2005/0120553 A1 | 6/2005 | Brown |
| 2005/0128543 A1 | 6/2005 | Phillips et al. |
| 2005/0133761 A1 | 6/2005 | Thielemans |
| 2005/0140849 A1 | 6/2005 | Hoelen et al. |
| 2005/0141837 A1 | 6/2005 | Sun |
| 2005/0146897 A1 | 7/2005 | Mimura et al. |
| 2005/0157518 A1 | 7/2005 | Kazuhiro et al. |
| 2005/0168849 A1 | 8/2005 | Lin |
| 2005/0179378 A1 | 8/2005 | Oooka et al. |
| 2005/0185416 A1 | 8/2005 | Lee et al. |
| 2005/0195175 A1 | 9/2005 | Anderson |
| 2005/0195370 A1 | 9/2005 | Gore |
| 2005/0195462 A1 | 9/2005 | Lin |
| 2005/0201122 A1 | 9/2005 | Shinohara et al. |
| 2005/0206802 A1 | 9/2005 | Creemers |
| 2005/0231977 A1 | 10/2005 | Hayakawa |
| 2005/0231981 A1 | 10/2005 | Hoelen et al. |
| 2005/0231982 A1 | 10/2005 | Kajiura |
| 2005/0248524 A1 | 11/2005 | Feng et al. |
| 2005/0257709 A1 | 11/2005 | Mule et al. |
| 2005/0259302 A9 | 11/2005 | Metz et al. |
| 2005/0259939 A1 | 11/2005 | Rinko |
| 2005/0270798 A1 | 12/2005 | Lee et al. |
| 2005/0271325 A1 | 12/2005 | Anderson et al. |
| 2005/0275930 A1 | 12/2005 | Patel et al. |
| 2006/0002141 A1 | 1/2006 | Ouderkirk |
| 2006/0002675 A1 | 1/2006 | Choi |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024017 A1 | 2/2006 | Page et al. |
| 2006/0038643 A1 | 2/2006 | Xu et al. |
| 2006/0044246 A1 | 3/2006 | Mignard |
| 2006/0044523 A1 | 3/2006 | Teijido et al. |
| 2006/0050032 A1 | 3/2006 | Gunner et al. |
| 2006/0051048 A1 | 3/2006 | Gardiner et al. |
| 2006/0056000 A1 | 3/2006 | Mignard |
| 2006/0061705 A1 | 3/2006 | Onishi |
| 2006/0062016 A1 | 3/2006 | Dejima et al. |
| 2006/0065940 A1 | 3/2006 | Kothari |
| 2006/0066541 A1 | 3/2006 | Gally et al. |
| 2006/0066586 A1 | 3/2006 | Gally |
| 2006/0066640 A1 | 3/2006 | Kothari et al. |
| 2006/0066641 A1 | 3/2006 | Gally et al. |
| 2006/0066935 A1 | 3/2006 | Cummings |
| 2006/0072315 A1 | 4/2006 | Han et al. |
| 2006/0072339 A1 | 4/2006 | Li et al. |
| 2006/0077122 A1 | 4/2006 | Gally et al. |
| 2006/0077123 A1 | 4/2006 | Gally et al. |
| 2006/0077156 A1 | 4/2006 | Chui et al. |
| 2006/0082588 A1 | 4/2006 | Mizuno et al. |
| 2006/0082863 A1 | 4/2006 | Piehl et al. |
| 2006/0083028 A1 | 4/2006 | Sun et al. |
| 2006/0110090 A1 | 5/2006 | Ellwood, Jr. |
| 2006/0114244 A1 | 6/2006 | Saxena et al. |
| 2006/0126142 A1 | 6/2006 | Choi |
| 2006/0132383 A1 | 6/2006 | Gally |
| 2006/0132927 A1 | 6/2006 | Yoon |
| 2006/0164740 A1 | 7/2006 | Sone et al. |
| 2006/0164861 A1 | 7/2006 | Maeda |
| 2006/0180886 A1 | 8/2006 | Tsang |
| 2006/0181903 A1 | 8/2006 | Okuwaki |
| 2006/0187676 A1 | 8/2006 | Ishikura |
| 2006/0209012 A1 | 9/2006 | Hagood, IV |
| 2006/0209385 A1 | 9/2006 | Liu |
| 2006/0215958 A1 | 9/2006 | Yeo et al. |
| 2006/0220160 A1 | 10/2006 | Miles |
| 2006/0262562 A1 | 11/2006 | Fukasawa |
| 2006/0265919 A1 | 11/2006 | Huang |
| 2006/0268574 A1 | 11/2006 | Jung |
| 2006/0274243 A1 | 12/2006 | Iijima et al. |
| 2006/0274400 A1 | 12/2006 | Miles |
| 2006/0279558 A1 | 12/2006 | Van Delden et al. |
| 2006/0291769 A1 | 12/2006 | Spoonhower et al. |
| 2007/0001187 A1 | 1/2007 | Kim |
| 2007/0020948 A1 | 1/2007 | Piehl et al. |
| 2007/0036492 A1 | 2/2007 | Lee |
| 2007/0042524 A1 | 2/2007 | Kogut |
| 2007/0047887 A1 | 3/2007 | Selbrede |

(56) References Cited

U.S. PATENT DOCUMENTS

| | | |
|---|---|---|
| 2007/0064294 A1 | 3/2007 | Hoshino et al. |
| 2007/0077525 A1 | 4/2007 | Davis et al. |
| 2007/0086078 A1 | 4/2007 | Hagood et al. |
| 2007/0097694 A1 | 5/2007 | Faase |
| 2007/0115415 A1 | 5/2007 | Piehl et al. |
| 2007/0115686 A1 | 5/2007 | Tyberghien |
| 2007/0116424 A1 | 5/2007 | Ting et al. |
| 2007/0121118 A1 | 5/2007 | Gally et al. |
| 2007/0125415 A1 | 6/2007 | Sachs |
| 2007/0133226 A1 | 6/2007 | Mi |
| 2007/0138608 A1 | 6/2007 | Ikehashi |
| 2007/0147087 A1 | 6/2007 | Parker et al. |
| 2007/0153860 A1 | 7/2007 | Chang-Hasnain et al. |
| 2007/0171418 A1 | 7/2007 | Nyhart, Jr. |
| 2007/0177247 A1 | 8/2007 | Miles |
| 2007/0187852 A1 | 8/2007 | Parker et al. |
| 2007/0189036 A1 | 8/2007 | Chen |
| 2007/0201234 A1 | 8/2007 | Ottermann |
| 2007/0210163 A1 | 9/2007 | Han |
| 2007/0216987 A1 | 9/2007 | Hagood et al. |
| 2007/0223249 A1 | 9/2007 | Lee et al. |
| 2007/0229737 A1 | 10/2007 | Takeda |
| 2007/0236957 A1 | 10/2007 | Koganezawa et al. |
| 2007/0241340 A1 | 10/2007 | Pan |
| 2007/0247872 A1 | 10/2007 | Lee et al. |
| 2007/0253054 A1 | 11/2007 | Miles |
| 2007/0253717 A1 | 11/2007 | Charters et al. |
| 2007/0258123 A1 | 11/2007 | Xu et al. |
| 2007/0268695 A1 | 11/2007 | Seetzen |
| 2007/0279727 A1 | 12/2007 | Gandhi et al. |
| 2007/0285406 A1 | 12/2007 | Kukulj et al. |
| 2007/0285761 A1 | 12/2007 | Zhong et al. |
| 2007/0292091 A1 | 12/2007 | Fujii |
| 2008/0002299 A1 | 1/2008 | Thurn |
| 2008/0013145 A1 | 1/2008 | Chui et al. |
| 2008/0018617 A1 | 1/2008 | Ng et al. |
| 2008/0030657 A1 | 2/2008 | Wu et al. |
| 2008/0049450 A1 | 2/2008 | Sampsell |
| 2008/0055706 A1 | 3/2008 | Chui et al. |
| 2008/0068697 A1 | 3/2008 | Haluzak et al. |
| 2008/0074402 A1 | 3/2008 | Cornish et al. |
| 2008/0079687 A1 | 4/2008 | Cernasov |
| 2008/0079870 A1 | 4/2008 | Kazuhiro et al. |
| 2008/0080043 A1 | 4/2008 | Chui et al. |
| 2008/0084600 A1 | 4/2008 | Bita et al. |
| 2008/0088910 A1 | 4/2008 | Miles |
| 2008/0089092 A1 | 4/2008 | Lee et al. |
| 2008/0090025 A1 | 4/2008 | Freking et al. |
| 2008/0094853 A1 | 4/2008 | Kim |
| 2008/0110855 A1 | 5/2008 | Cummings |
| 2008/0112039 A1 | 5/2008 | Chui |
| 2008/0151347 A1 | 6/2008 | Chui |
| 2008/0170179 A1 | 7/2008 | Shiraishi |
| 2008/0170414 A1 | 7/2008 | Wang |
| 2008/0186581 A1 | 8/2008 | Bita et al. |
| 2008/0192484 A1 | 8/2008 | Lee |
| 2008/0232135 A1 | 9/2008 | Kinder et al. |
| 2008/0239755 A1 | 10/2008 | Parker et al. |
| 2008/0278460 A1 | 11/2008 | Arnett et al. |
| 2008/0278663 A1 | 11/2008 | Krishnan et al. |
| 2008/0285307 A1 | 11/2008 | Aylward |
| 2008/0285308 A1 | 11/2008 | Clary et al. |
| 2008/0295307 A1 | 12/2008 | Tam |
| 2008/0297880 A1 | 12/2008 | Steckl et al. |
| 2009/0015753 A1 | 1/2009 | Ye |
| 2009/0021884 A1 | 1/2009 | Nakamura |
| 2009/0050454 A1 | 2/2009 | Matsukawa |
| 2009/0078316 A1 | 3/2009 | Khazeni et al. |
| 2009/0085497 A1 | 4/2009 | Osborn |
| 2009/0086301 A1 | 4/2009 | Gally |
| 2009/0086466 A1 | 4/2009 | Sugita |
| 2009/0090611 A1 | 4/2009 | Zeijlon |
| 2009/0096956 A1 | 4/2009 | Uehara et al. |
| 2009/0097100 A1 | 4/2009 | Gally et al. |
| 2009/0101192 A1 | 4/2009 | Kothari et al. |
| 2009/0103166 A1 | 4/2009 | Khazeni et al. |
| 2009/0115937 A1 | 5/2009 | Guo et al. |
| 2009/0122384 A1 | 5/2009 | Felnhofer et al. |
| 2009/0126777 A1 | 5/2009 | Khazeni et al. |
| 2009/0126792 A1 | 5/2009 | Gruhlke et al. |
| 2009/0129119 A1 | 5/2009 | Lee et al. |
| 2009/0135469 A1 | 5/2009 | Lee et al. |
| 2009/0145479 A1 | 6/2009 | Williams |
| 2009/0147332 A1 | 6/2009 | Bita et al. |
| 2009/0147535 A1 | 6/2009 | Mienko et al. |
| 2009/0151771 A1 | 6/2009 | Kothari et al. |
| 2009/0159123 A1 | 6/2009 | Kothari et al. |
| 2009/0168459 A1 | 7/2009 | Holman |
| 2009/0190373 A1 | 7/2009 | Bita et al. |
| 2009/0194344 A1 | 8/2009 | Harley et al. |
| 2009/0201301 A1 | 8/2009 | Mienko et al. |
| 2009/0201565 A1 | 8/2009 | Bita et al. |
| 2009/0201566 A1 | 8/2009 | Kothari |
| 2009/0201571 A1 | 8/2009 | Gally et al. |
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0225394 A1 | 9/2009 | Chui et al. |
| 2009/0225395 A1 | 9/2009 | Ganti et al. |
| 2009/0231666 A1 | 9/2009 | Gudlavalleti et al. |
| 2009/0244690 A1 | 10/2009 | Lee |
| 2009/0251761 A1 | 10/2009 | Khazeni et al. |
| 2009/0255569 A1 | 10/2009 | Sampsell |
| 2009/0256218 A1 | 10/2009 | Mignard et al. |
| 2009/0257105 A1 | 10/2009 | Xu et al. |
| 2009/0257108 A1 | 10/2009 | Gruhlke et al. |
| 2009/0273823 A1 | 11/2009 | Tung et al. |
| 2009/0273824 A1 | 11/2009 | Sasagawa |
| 2009/0279162 A1 | 11/2009 | Chui |
| 2009/0279173 A1 | 11/2009 | Chui et al. |
| 2009/0293955 A1 | 12/2009 | Kothari et al. |
| 2009/0296193 A1 | 12/2009 | Bita et al. |
| 2009/0296194 A1 | 12/2009 | Gally |
| 2009/0303417 A1 | 12/2009 | Mizushima et al. |
| 2009/0303746 A1 | 12/2009 | Wang |
| 2009/0309176 A1 | 12/2009 | Akram et al. |
| 2009/0315854 A1 | 12/2009 | Matsuo |
| 2009/0315858 A1 | 12/2009 | Sato |
| 2009/0323153 A1 | 12/2009 | Sampsell |
| 2010/0014148 A1 | 1/2010 | Djordjev |
| 2010/0039832 A1 | 2/2010 | Ahlgren et al. |
| 2010/0045630 A1 | 2/2010 | Gu et al. |
| 2010/0051089 A1 | 3/2010 | Khazeni |
| 2010/0053148 A1 | 3/2010 | Khazeni |
| 2010/0079384 A1 | 4/2010 | Grivna |
| 2010/0080890 A1 | 4/2010 | Tung et al. |
| 2010/0085626 A1 | 4/2010 | Tung et al. |
| 2010/0096718 A1 | 4/2010 | Hynecek et al. |
| 2010/0118382 A1 | 5/2010 | Kothari et al. |
| 2010/0118563 A1 | 5/2010 | Shen et al. |
| 2010/0126777 A1 | 5/2010 | Hallundbaek |
| 2010/0128337 A1 | 5/2010 | Tung |
| 2010/0142226 A1 | 6/2010 | Vogt et al. |
| 2010/0157624 A1 | 6/2010 | Liao et al. |
| 2010/0177533 A1 | 7/2010 | Griffiths |
| 2010/0180946 A1 | 7/2010 | Gruhlke et al. |
| 2010/0182308 A1 | 7/2010 | Holman et al. |
| 2010/0187422 A1 | 7/2010 | Kothari et al. |
| 2010/0195310 A1 | 8/2010 | Baar |
| 2010/0226118 A1 | 9/2010 | Baar |
| 2010/0231510 A1 | 9/2010 | Sampsell et al. |
| 2010/0236624 A1 | 9/2010 | Khazeni et al. |
| 2010/0238529 A1 | 9/2010 | Sampsell et al. |
| 2010/0275999 A1 | 11/2010 | Buelow II |
| 2010/0302218 A1 | 12/2010 | Bita |
| 2010/0302616 A1 | 12/2010 | Bita |
| 2010/0302802 A1 | 12/2010 | Bita |
| 2010/0309103 A1 | 12/2010 | Sampsell |
| 2010/0309540 A1 | 12/2010 | Miles |
| 2010/0309572 A1 | 12/2010 | Mignard |
| 2010/0309687 A1 | 12/2010 | Sampsell et al. |
| 2011/0007020 A1 | 1/2011 | Hong et al. |
| 2011/0019380 A1 | 1/2011 | Miles |
| 2011/0026095 A1 | 2/2011 | Kothari et al. |

(56) References Cited

U.S. PATENT DOCUMENTS

| | | |
|---|---|---|
| 2011/0026096 A1 | 2/2011 | Miles |
| 2011/0032214 A1 | 2/2011 | Gruhlke et al. |
| 2011/0038027 A1 | 2/2011 | Miles |
| 2011/0044496 A1 | 2/2011 | Chui et al. |
| 2011/0062604 A1 | 3/2011 | Yess et al. |
| 2011/0069371 A1 | 3/2011 | Kothari et al. |
| 2011/0075246 A1 | 3/2011 | Wang |
| 2011/0080632 A1 | 4/2011 | Miles |
| 2011/0090554 A1 | 4/2011 | Tung |
| 2011/0115747 A1 | 5/2011 | Powell et al. |
| 2011/0116156 A1 | 5/2011 | Kothari |
| 2011/0122479 A1 | 5/2011 | Sampsell |
| 2011/0134505 A1 | 6/2011 | Sasagawa |
| 2011/0157058 A1 | 6/2011 | Bita |
| 2011/0157093 A1 | 6/2011 | Bita |
| 2011/0169428 A1 | 7/2011 | Wang et al. |
| 2011/0170166 A1 | 7/2011 | Miles |
| 2011/0170167 A1 | 7/2011 | Miles |
| 2011/0170168 A1 | 7/2011 | Endisch et al. |
| 2011/0175533 A1 | 7/2011 | Holman et al. |
| 2011/0175553 A1 | 7/2011 | Sampsell |
| 2011/0182086 A1 | 7/2011 | Mienko et al. |
| 2011/0188109 A1 | 8/2011 | Chui et al. |
| 2011/0188110 A1 | 8/2011 | Miles |
| 2011/0194169 A1 | 8/2011 | Ganti et al. |
| 2011/0199667 A1 | 8/2011 | Wang et al. |
| 2011/0226332 A1 | 9/2011 | Ford et al. |
| 2012/0051088 A1 | 3/2012 | Chui et al. |
| 2012/0075269 A1 | 3/2012 | Xu |
| 2012/0120682 A1 | 5/2012 | Sasagawa et al. |
| 2012/0314451 A1 | 12/2012 | Matsuura |
| 2013/0114294 A1 | 5/2013 | Bita et al. |
| 2013/0141938 A1 | 6/2013 | Khazeni et al. |
| 2013/0212859 A1 | 8/2013 | Chui et al. |

FOREIGN PATENT DOCUMENTS

| | | |
|---|---|---|
| CN | 1158182 | 8/1997 |
| CN | 1272922 | 11/2000 |
| CN | 1286424 | 3/2001 |
| CN | 1381752 | 11/2002 |
| CN | 1396483 | 2/2003 |
| CN | 1414418 A | 4/2003 |
| CN | 1437058 A | 8/2003 |
| CN | 1453610 | 11/2003 |
| CN | 1506728 | 6/2004 |
| CN | 1517743 | 8/2004 |
| CN | 1543549 A | 11/2004 |
| CN | 1612013 A | 5/2005 |
| CN | 1639596 | 7/2005 |
| CN | 1643439 A | 7/2005 |
| CN | 1671991 A | 9/2005 |
| CN | 1737659 | 2/2006 |
| CN | 1795403 | 6/2006 |
| CN | 2837886 | 11/2006 |
| CN | 1926497 A | 3/2007 |
| DE | 3402746 | 8/1985 |
| DE | 196 22 748 | 12/1997 |
| DE | 199 26 227 | 12/1999 |
| DE | 19942513 A1 | 3/2001 |
| DE | 102006039071 A1 | 2/2008 |
| DE | 102007025092 A1 | 12/2008 |
| EP | 0035299 A2 | 9/1981 |
| EP | 0 278 038 | 8/1988 |
| EP | 0362993 A2 | 4/1990 |
| EP | 0 539 099 | 4/1993 |
| EP | 0 590 511 | 4/1994 |
| EP | 0 621 500 | 10/1994 |
| EP | 0668490 A2 | 8/1995 |
| EP | 0695959 A1 | 2/1996 |
| EP | 0 822 441 | 2/1998 |
| EP | 0 833 172 | 4/1998 |
| EP | 0 855 745 | 7/1998 |
| EP | 0866264 A1 | 9/1998 |
| EP | 0867747 A2 | 9/1998 |
| EP | 0 879 991 | 11/1998 |
| EP | 0895274 A1 | 2/1999 |
| EP | 0907050 A1 | 4/1999 |
| EP | 0957392 A1 | 11/1999 |
| EP | 0969306 A1 | 1/2000 |
| EP | 0 984 314 | 3/2000 |
| EP | 0986077 A2 | 3/2000 |
| EP | 1003062 A1 | 5/2000 |
| EP | 1 014 161 | 6/2000 |
| EP | 1 081 633 | 3/2001 |
| EP | 1089115 A1 | 4/2001 |
| EP | 1 116 987 | 7/2001 |
| EP | 1113218 A1 | 7/2001 |
| EP | 1 122 586 | 8/2001 |
| EP | 1122577 A2 | 8/2001 |
| EP | 1127984 A1 | 8/2001 |
| EP | 1 143 270 | 10/2001 |
| EP | 1199512 A1 | 4/2002 |
| EP | 1205782 A2 | 5/2002 |
| EP | 1227346 A2 | 7/2002 |
| EP | 1231757 A2 | 8/2002 |
| EP | 1 251 454 | 10/2002 |
| EP | 1 271 223 | 1/2003 |
| EP | 1275997 A2 | 1/2003 |
| EP | 1279892 A1 | 1/2003 |
| EP | 1 296 094 | 3/2003 |
| EP | 1306609 A1 | 5/2003 |
| EP | 1329664 A1 | 7/2003 |
| EP | 1 336 876 | 8/2003 |
| EP | 1 341 025 | 9/2003 |
| EP | 1347315 A1 | 9/2003 |
| EP | 1 389 775 | 2/2004 |
| EP | 1403212 A2 | 3/2004 |
| EP | 1 413 543 | 4/2004 |
| EP | 1 437 610 | 7/2004 |
| EP | 1 450 418 | 8/2004 |
| EP | 1445629 A1 | 8/2004 |
| EP | 1473581 A2 | 11/2004 |
| EP | 1 519 218 | 3/2005 |
| EP | 1531302 A1 | 5/2005 |
| EP | 1544537 A1 | 6/2005 |
| EP | 1 577 701 | 9/2005 |
| EP | 1 640 770 | 3/2006 |
| EP | 1 640 779 | 3/2006 |
| EP | 1698918 A1 | 9/2006 |
| EP | 1732141 | 12/2006 |
| EP | 1734401 A1 | 12/2006 |
| EP | 1748305 A1 | 1/2007 |
| EP | 1 762 778 A | 3/2007 |
| EP | 1 928 028 A1 | 6/2008 |
| EP | 1 975 651 | 10/2008 |
| FR | 2824643 A1 | 11/2002 |
| FR | 2889597 | 2/2007 |
| GB | 2260203 A | 4/1993 |
| GB | 2 278 222 | 11/1994 |
| GB | 2 315 356 | 1/1998 |
| GB | 2321532 A | 7/1998 |
| GB | 2 331 615 | 5/1999 |
| GB | 2336933 | 11/1999 |
| GB | 2 351 834 | 1/2001 |
| JP | 56-010976 | 2/1981 |
| JP | 56-010977 | 2/1981 |
| JP | 56088111 | 7/1981 |
| JP | 573266 | 1/1982 |
| JP | 58115781 | 7/1983 |
| JP | 60 165621 A | 8/1985 |
| JP | 60242408 A | 12/1985 |
| JP | H0488392 A | 3/1992 |
| JP | 05049238 | 2/1993 |
| JP | 05281479 | 10/1993 |
| JP | H05303004 A | 11/1993 |
| JP | H0682771 A | 3/1994 |
| JP | H06176607 A | 6/1994 |
| JP | 06-209114 | 7/1994 |
| JP | 06-265870 A | 9/1994 |
| JP | H075464 A | 1/1995 |
| JP | 7199829 A | 8/1995 |
| JP | 7306306 A | 11/1995 |

(56) References Cited

FOREIGN PATENT DOCUMENTS

| | | |
|---|---|---|
| JP | 08 050283 A | 2/1996 |
| JP | 8051230 | 2/1996 |
| JP | 09022012 | 1/1997 |
| JP | 09 171111 | 6/1997 |
| JP | 09160032 | 6/1997 |
| JP | H09147615 A | 6/1997 |
| JP | 09189910 A | 7/1997 |
| JP | 09-260696 | 10/1997 |
| JP | 09281917 | 10/1997 |
| JP | 09311333 | 12/1997 |
| JP | 10 500224 | 1/1998 |
| JP | 10-096910 | 4/1998 |
| JP | 10 186249 | 7/1998 |
| JP | 10261309 A | 9/1998 |
| JP | H10260405 A | 9/1998 |
| JP | H10311915 A | 11/1998 |
| JP | 10325953 | 12/1998 |
| JP | 10326515 A | 12/1998 |
| JP | 11 002712 | 1/1999 |
| JP | 11 002764 | 1/1999 |
| JP | H116999 A | 1/1999 |
| JP | 11052887 A | 2/1999 |
| JP | 11160699 A | 6/1999 |
| JP | 11167808 A | 6/1999 |
| JP | 11 174234 | 7/1999 |
| JP | 11 211999 | 8/1999 |
| JP | 11224524 A | 8/1999 |
| JP | 11227248 A | 8/1999 |
| JP | 11231321 A | 8/1999 |
| JP | 11232919 | 8/1999 |
| JP | 11249132 A | 9/1999 |
| JP | 11 326898 | 11/1999 |
| JP | 11316553 A | 11/1999 |
| JP | 2000-028933 | 1/2000 |
| JP | 2000 500245 | 1/2000 |
| JP | 2000 075293 | 3/2000 |
| JP | 2000-081848 | 3/2000 |
| JP | 2000075287 A | 3/2000 |
| JP | 2000147262 A | 5/2000 |
| JP | 2000 181367 | 6/2000 |
| JP | 2000162594 A | 6/2000 |
| JP | 2000171798 A | 6/2000 |
| JP | 2000 193933 | 7/2000 |
| JP | 2000 214804 A | 8/2000 |
| JP | 2000-258622 | 9/2000 |
| JP | 2000 514568 | 10/2000 |
| JP | 2000294021 A | 10/2000 |
| JP | 2000 314882 | 11/2000 |
| JP | 2001-021883 | 1/2001 |
| JP | 2001057106 A | 2/2001 |
| JP | 2001110221 A | 4/2001 |
| JP | 2001126518 A | 5/2001 |
| JP | 2001133774 A | 5/2001 |
| JP | 2001133775 A | 5/2001 |
| JP | 2001135117 A | 5/2001 |
| JP | 2001221913 A | 8/2001 |
| JP | 2001243822 A | 9/2001 |
| JP | 2001249283 A | 9/2001 |
| JP | 2001283622 A | 10/2001 |
| JP | 2001297615 A | 10/2001 |
| JP | 2001320092 A | 11/2001 |
| JP | 2001 343514 | 12/2001 |
| JP | 2002008424 A | 1/2002 |
| JP | 2002014344 A | 1/2002 |
| JP | 2002025320 A | 1/2002 |
| JP | 2002050222 A | 2/2002 |
| JP | 2002062490 A | 2/2002 |
| JP | 2002090549 | 3/2002 |
| JP | 2002-108227 | 4/2002 |
| JP | 2002098838 A | 4/2002 |
| JP | 2002109937 A | 4/2002 |
| JP | 2002-040339 | 6/2002 |
| JP | 2002 174732 | 6/2002 |
| JP | 2002 174780 | 6/2002 |
| JP | 2002163907 A | 6/2002 |
| JP | 2002 523798 | 7/2002 |
| JP | 2002196152 A | 7/2002 |
| JP | 2002196325 A | 7/2002 |
| JP | 2002 245835 | 8/2002 |
| JP | 2002221678 A | 8/2002 |
| JP | 2002229023 A | 8/2002 |
| JP | 2002236290 A | 8/2002 |
| JP | 2002313121 A | 10/2002 |
| JP | 2002538578 A | 11/2002 |
| JP | 2002365438 A | 12/2002 |
| JP | 2003007114 A | 1/2003 |
| JP | 2003021835 A | 1/2003 |
| JP | 2003 057653 | 2/2003 |
| JP | 2003045678 A | 2/2003 |
| JP | 2003057652 | 2/2003 |
| JP | 2003066237 A | 3/2003 |
| JP | 2003066451 | 3/2003 |
| JP | 2003098093 A | 4/2003 |
| JP | 2003107465 A | 4/2003 |
| JP | 2003115209 A | 4/2003 |
| JP | 2003 131215 | 5/2003 |
| JP | 2003131206 A | 5/2003 |
| JP | 2003140118 A | 5/2003 |
| JP | 2003140150 A | 5/2003 |
| JP | 2003149642 | 5/2003 |
| JP | 2003173713 A | 6/2003 |
| JP | 2003177336 A | 6/2003 |
| JP | 2003 186008 A | 7/2003 |
| JP | 2003 188959 | 7/2003 |
| JP | 2003195201 A | 7/2003 |
| JP | 2003263915 A | 9/2003 |
| JP | 2003272424 A | 9/2003 |
| JP | 2003307728 | 10/2003 |
| JP | 2003-315694 | 11/2003 |
| JP | 2003338213 A | 11/2003 |
| JP | 2003 344881 | 12/2003 |
| JP | 2003340795 A | 12/2003 |
| JP | 2004012642 A | 1/2004 |
| JP | 2004012918 | 1/2004 |
| JP | 2004062099 | 2/2004 |
| JP | 2004070189 A | 3/2004 |
| JP | 2004087409 A | 3/2004 |
| JP | 2004-111278 | 4/2004 |
| JP | 2004126196 A | 4/2004 |
| JP | 2004145109 A | 5/2004 |
| JP | 2004149643 A | 5/2004 |
| JP | 2004-206049 | 7/2004 |
| JP | 2004186024 A | 7/2004 |
| JP | 2004205769 A | 7/2004 |
| JP | 2004212638 A | 7/2004 |
| JP | 2004212673 A | 7/2004 |
| JP | 2004212680 A | 7/2004 |
| JP | 2004-219843 A | 8/2004 |
| JP | 2004273147 A | 9/2004 |
| JP | 2005024866 A | 1/2005 |
| JP | 2005031219 A | 2/2005 |
| JP | 2005197227 A | 7/2005 |
| JP | 2005-259365 | 9/2005 |
| JP | 2005266343 A | 9/2005 |
| JP | 2005279831 A | 10/2005 |
| JP | 2005301016 A | 10/2005 |
| JP | 2005308871 A | 11/2005 |
| JP | 2005316178 | 11/2005 |
| JP | 2005350653 A | 12/2005 |
| JP | 2006065360 A | 3/2006 |
| JP | 2006075362 A | 3/2006 |
| JP | 2006 107993 | 4/2006 |
| JP | 2006099105 | 4/2006 |
| JP | 2006 120571 | 5/2006 |
| JP | 2006134632 A | 5/2006 |
| JP | 2006215509 A | 8/2006 |
| JP | 2006292839 A | 10/2006 |
| JP | 2006301326 A | 11/2006 |
| JP | 2006351286 A | 12/2006 |
| JP | 2007026463 A | 2/2007 |
| JP | 2007027150 A | 2/2007 |
| JP | 2007080789 A | 3/2007 |
| JP | 2007-148413 | 6/2007 |
| JP | 2007214082 A | 8/2007 |

(56) References Cited

FOREIGN PATENT DOCUMENTS

| | | |
|---|---|---|
| JP | 2007218540 A | 8/2007 |
| JP | 2007279474 A | 10/2007 |
| JP | 2008084544 | 4/2008 |
| JP | 2008 103110 | 5/2008 |
| KR | 2002 010322 | 2/2002 |
| KR | 10-0329769-0000 | 3/2002 |
| KR | 2004-0016570 | 2/2004 |
| KR | 100754400 B1 | 8/2007 |
| KR | 20080088683 A | 10/2008 |
| TW | 567388 | 12/2003 |
| TW | 594155 | 6/2004 |
| TW | 200510868 | 3/2005 |
| TW | 200540476 | 12/2005 |
| TW | M299644 | 10/2006 |
| TW | 200717099 | 5/2007 |
| TW | 200730885 | 8/2007 |
| TW | 200730960 | 8/2007 |
| TW | 200743825 | 12/2007 |
| TW | 200825468 | 6/2008 |
| WO | WO-9406871 A1 | 3/1994 |
| WO | WO-9406979 A1 | 3/1994 |
| WO | WO 95/01584 | 1/1995 |
| WO | WO-9514256 A1 | 5/1995 |
| WO | WO 95/15582 A1 | 6/1995 |
| WO | WO 95/30924 | 11/1995 |
| WO | WO 96/08833 | 3/1996 |
| WO | WO-9701240 A1 | 1/1997 |
| WO | WO 97/17628 | 5/1997 |
| WO | WO 97/46908 | 12/1997 |
| WO | WO-9814804 A1 | 4/1998 |
| WO | WO 98/19201 | 5/1998 |
| WO | WO-9832047 A1 | 7/1998 |
| WO | WO-9835182 A1 | 8/1998 |
| WO | WO-9843129 A1 | 10/1998 |
| WO | WO-9852094 A1 | 11/1998 |
| WO | WO 99/63394 | 12/1999 |
| WO | WO 99/64785 A | 12/1999 |
| WO | WO 99/67680 | 12/1999 |
| WO | WO 00/11502 | 3/2000 |
| WO | WO 00/50807 | 8/2000 |
| WO | WO-0050808 A1 | 8/2000 |
| WO | WO-0106816 A1 | 1/2001 |
| WO | WO 01/29148 | 4/2001 |
| WO | WO-0150444 A1 | 7/2001 |
| WO | WO-0153113 A1 | 7/2001 |
| WO | WO 01/57434 | 8/2001 |
| WO | WO-0159362 A2 | 8/2001 |
| WO | WO 01/81994 | 11/2001 |
| WO | WO 01/84228 | 11/2001 |
| WO | WO 01/84229 | 11/2001 |
| WO | WO-0206858 A2 | 1/2002 |
| WO | WO-0224570 A1 | 3/2002 |
| WO | WO-0225359 A2 | 3/2002 |
| WO | WO 02/35145 A1 | 5/2002 |
| WO | WO 02/071132 | 9/2002 |
| WO | WO-02086582 A1 | 10/2002 |
| WO | WO-02097324 A1 | 12/2002 |
| WO | WO 03/007049 | 1/2003 |
| WO | WO 03/032058 | 4/2003 |
| WO | WO-03038509 A2 | 5/2003 |
| WO | WO 03/056876 | 7/2003 |
| WO | WO-03062912 A1 | 7/2003 |
| WO | WO 03/075207 | 9/2003 |
| WO | WO 03/105198 | 12/2003 |
| WO | WO 2004/006003 | 1/2004 |
| WO | WO-2004003643 A1 | 1/2004 |
| WO | WO-2004012004 A1 | 2/2004 |
| WO | WO-2004015489 A1 | 2/2004 |
| WO | WO-2004027514 A2 | 4/2004 |
| WO | WO-2004036270 A1 | 4/2004 |
| WO | WO-2004088372 A1 | 10/2004 |
| WO | WO 2004/114418 A1 | 12/2004 |
| WO | WO-2005001892 A2 | 1/2005 |
| WO | WO-2005011012 A1 | 2/2005 |
| WO | WO-2005057261 A2 | 6/2005 |
| WO | WO 2005/073622 A1 | 8/2005 |
| WO | WO-2005088367 A1 | 9/2005 |
| WO | WO-2005111669 A1 | 11/2005 |
| WO | WO-2006008702 A2 | 1/2006 |
| WO | WO 2006/035698 A1 | 4/2006 |
| WO | WO-2006036451 A1 | 4/2006 |
| WO | WO-2006036496 | 4/2006 |
| WO | WO-2007036422 | 4/2007 |
| WO | WO-2007045875 A1 | 4/2007 |
| WO | WO-2007053438 A1 | 5/2007 |
| WO | WO 2007/064133 | 6/2007 |
| WO | WO 2007/073203 A1 | 6/2007 |
| WO | WO-2007072998 A1 | 6/2007 |
| WO | WO-2007094558 A1 | 8/2007 |
| WO | WO-2007142978 A2 | 12/2007 |
| WO | 2008045311 | 4/2008 |
| WO | WO 2008/038754 | 4/2008 |
| WO | WO 2008/045200 | 4/2008 |
| WO | WO 2008/045207 A2 | 4/2008 |
| WO | WO 2008/45207 A3 | 4/2008 |
| WO | WO 2008/045218 | 4/2008 |
| WO | WO 2008/045224 | 4/2008 |
| WO | WO-2008045312 A1 | 4/2008 |
| WO | WO-2008045362 A2 | 4/2008 |
| WO | WO-2008045363 | 4/2008 |
| WO | WO-2008045364 A2 | 4/2008 |
| WO | WO-2008045462 | 4/2008 |
| WO | WO-2008045463 | 4/2008 |
| WO | WO-2008047274 A2 | 4/2008 |
| WO | WO 2008/062363 A2 | 5/2008 |
| WO | WO-2008122915 A2 | 10/2008 |
| WO | WO-2008145096 A1 | 12/2008 |
| WO | WO 2009/011922 A1 | 1/2009 |
| WO | WO-20100068160 | 6/2010 |
| WO | WO 2010/138763 | 10/2010 |
| WO | WO 2010/138761 | 12/2010 |
| WO | WO 2010/138765 | 12/2010 |

OTHER PUBLICATIONS

Conner, "Hybrid Color Display Using Optical Interference Filter Array," SID Digest, pp. 577-580 (1993).
Fan et al. "Channel Drop Filters in Photonic Crystals", Optics Express, vol. 3, No. 1, pp. 4-11, 1998.
Giles et al. "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al. "Vertically Coupled Microring Rosonator Channel Dropping Filter", IEEE Photonics Technology Letters, vol. 11, No. 2, pp. 215-217, 1999.
Magel, "Integrated Optic Devices Using Micromachined Metal Membranes", SPIE vol. 2686, 0-8194-2060-3, pp. 54-63, 1996.
Mehregany et al., "MEMS applications in Optical Systems," IEEE/LEOS 1996 Summer Topical Meetings, pp. 75-76, Aug. 1996.
Miles, M.W., "Interferometric Modulation MOEMS as an enabling technology for high-performance reflective displays," Proceedings of the SPIE, vol. 4985, pp. 131-139, Jan. 28, 2003.
Oliner, "Radiating Elements and Mutual Coupling," Microwave Scanning Antennas, vol. 2, pp. 131-157 and pp. 190-194, 1966.
Zhou et al. "Waveguide Panel Display Using Electromechanical Spatial Modulators" SID Digest, vol. XXIX, 1998.
International Preliminary Report on Patentability in PCT/US2010/036473 dated May 12, 2011.
International Search Report and Written Opinion in PCT/US2010/036471, dated Nov. 4, 2010.
International Preliminary Report on Patentability in PCT/US2010/036471 dated May 12, 2011.
International Search Report and Written Opinion in PCT/US2010/036477 dated Nov. 4, 2010.
International Preliminary Report on Patentability in PCT/US2010/036477 dated May 12, 2011.
Anonymously, (May 15, 2006). "Spreaders in light-guide optics", IP.com No. IPCOM000013631,4.
Di Feng et al. "Novel integrated light-guide plates for liquid crystal display backlight", Journal of optics A: Pure and Applied optics, 7 (2005) 111-117.

(56) References Cited

OTHER PUBLICATIONS

Tai, C.Y. et al. "A Transparent Frontlighting System for Reflective-Type Displays," 1995 SID International Symposium Digest of Technical Papers, vol. 26, pp. 375-378, May 23, 1995.

Yan et al. "Edge-Lighting Light Guide Plate Based on Micro-Prism for Liquid Crystal Display," Journal of Display Technology, vol. 5, No. 9, pp. 355-357, Sep. 2009.

Yu et al. "Design Optimization and Stamper Fabrication of Light Guiding Plates Using Silicon Based Micro-Features," IEEE Symposium on DTIP of MEMS/MOEMS, Rome, Apr. 1-3, 2009.

International Search Report and Written Opinion dated Nov. 4, 2010 for PCT Application No. PCT/US2010/036473.

Official Communication in European Patent Application No. 10727232.0, dated Feb. 11, 2013.

Official Communication in Japanes Patent Application No. 2012-513269, dated Mar. 12, 2013.

Official Communication in Chinese Patent Application No. 201080023827.4, dated May 22, 2013.

Official Communication in Chinese Patent Application No. 201080023828.9, dated Apr. 19, 2013.

Official Communication in Chinese Patent Application No. 201080023869.8, dated Mar. 4, 2013.

Official Communication in European Patent Application No. 10727233.8, dated Feb. 14, 2013.

Official Communication in Japanese Patent Application No. 2012-513267, dated Jul. 30, 2013.

Official Communication in Japanese Patent Application No. 2012-513270, dated Mar. 19, 2013.

Official Communication in Japanese Patent Application No. 2012-513270, dated Sep. 10, 2013.

Aratani K. et al., "Surface Micromachined Tuneable Interferometer Array," Sensors and Actuators A, Elsevier Sequoia S.A., Lausanne, CH, A, 1993, 43(1/3), 17-23.

Austrian Search Report for U.S. Appl. No. 11/064,143 (IRDM.067A) dated Aug. 12, 2005.

Bass, "Fundamentals Techniques and Design," Handbook of Optics, Second Edition,1995, vol. 1, 2.29-2.36.

Billard C, "Tunable Capacitor," 5th Annual Review of LETI, 2003, p. 7.

Brosnihan, et al., "Optical Mems—A Fabrication Process For MEMS Optical Switches With Integrated On-Chip Electronics," 12th International Conference on TRANSDUCERS, Solid-State Sensors, Actuators and Microsystems, 2003, vol. 2, pp. 1638-1642.

Cacharelis, et al., "A Reflective-Mode PDLC Light Valve Display Technology," Proceedings of European Solid State Device Research Conference (ESSDERC), 1997, pp. 596-599.

Dokmeci, et al., "Two-Axis Single-Crytal Silicon Micromirror Arrays," Journal of Microelectromechanical Systems, Dec. 2004, 13(6), 1006-1017.

Feenstra, et al., "Electrowetting displays," Liquavista BV, Jan. 2006, 16 pages.

Hohlfeld, et al., "Micro-Machined Tunable Optical Filters With Optimized Band-Pass Spectrum," 12th International Conference on Transducers, Solid-State Sensors, Actuators and Microsystems, 2003, vol. 2, 1494-1497.

Jerman et al., "A Miniature Fabry-Perot Interferometer with a Corrugated Silicon Diaphragm Support", IEEE Electron Devices Society, pp. 140-144, 1990.

Jerman, et al., "Miniature Fabry-Perot Interferometers Micromachined in Silicon for use in Optical Fiber WDM Systems," Transducers, Proceedings on the International Conference on Solid State Sensors and Actuators, 1991, vol. ConF. 6, San Francisco, 372-375.

Jothimuthu P., et al., "Photodefinable PDMS thin films for Microfabrication Applications", Journal of Micromechanics and Microengineering 19.4 (2009): 045024. (Published Mar. 26, 2009), 9 pages.

Kowarz, et al., "Conformal Grating Electromechanical System (Gems) for High-Speed Digital Light Modulation," Proceedings of the IEEE 15th Annual International Conference on Micro Electro Mechanical Systems, Mems 2002, pp. 568-573.

Lezec, "Submicrometer Dimple Array Based Interference Color Field Displays and Sensors," Nano Letters, 2006, 7(2), 329-333.

Londergan, et al., "Advanced processes for MEMS-based displays," Proceedings of the Asia Display, 2007, SID, 1, 107-112, Longhurst R.S., "Geometrical and Physical Optics", Chapter IX: Multiple Beam Interferometry, pp. 153-157, 1963.

Maier et al., 1996 1 .3" ActiveMatrix liquid crystal spatial light modulator with 508 dpi resolution, SPIE vol. 2754, pp. 171-179.

"Material PDMS (polydimethylsiloxane)," Webpage, http://www.mit.edu/--6.777/matproos/pdms.htm, Printed Dec. 9, 2010, available Jan. 2005, 2 pages.

Miles M., et al., "Digital Paper (TM) for reflective displays", Journal of the Society for Information Display, Society for Information Display, vol. 11 (1), pp. 209-215, 2003, XP002358929, ISSN: 1071-0922.

Miles M.W., "A MEMS Based Interferometric Modulator (IMOD) for Display Applications". Proceedings of Sensors Expo, Oct. 21, 1997 © 1997 Hemler's Publishing, Inc., pp. 281-284 XP009058455.

Miles M.W., "A New Reflective FPD Technology using Interferometric Modulation," Journal of the SID, 1997, vol. 5(4), 379-382.

Moro, W., "Microlithography", Moscow: Mir, 1990, 1238 pages.

Nakagawa et al., "Wide-Field-of-View Narrow-Band Spectral Filters Based on Photonic Crystal Nanocavities", Optical Society of America, Optics Letters, vol. 27, No. 3, pp. 191-193, Feb. 1, 2002.

Neal T.D. et al., "Surface Plasmon Enhanced Emission From Dye Doped Polymer Layers," Optics Express Opt. Soc. America, USA, Jul. 11, 2005, vol. 13(14), 5522-5527.

Nieminen, et al., "Design of a Temperature-Stable RF MEMS Capacitor," Institute of Electrical and Electronics Engineers (IEEE) Journal of Microelectromechanical Systems, 2004, vol. 13(5), 705-714.

Pape, et al., "Characteristics of the Deformable Mirror Device for Optical Information Processing," Optical Engineering, Nov.-Dec. 1983, 22(6), 675-681.

Petschick, et.al., "Fabry-Perot-Interferometer," available at http://pl.physik.tuberlin.de/groups/pg279/protokolless02/04_fpi.pdf, pp. 50-60, May 14, 2002.

Qualcomm MEMS Technologies, Inc., May 2008, Interferometric Modulator (IMOD), Technology Overview, White Paper, 14 pages.

Shestopal, A.N., "Reference book on welding and adhesion bonding of plastic materials", Kiev: Tekhnika, 1986, 192 pages.

Solid surface energy data (SFE) for common polymers, Webpage, http://www.surface-tension.de/solid-surface-enerciv.htm, Printed Dec. 9, 2010, updated Nov. 20, 2007, 2 pages.

Surface Energy and Wetting, Webpage, http://www.adhesives.orq/StructuralDesidn/SurfaceEnergyandWettinq.aspx, Printed Dec. 9, 2010, 2 pages.

Taii Y. et al., "A Transparent Sheet Display By Plastic MEMS," Journal of the SID, 2006, vol. 14 (8), 735-741.

Tolansky, "Multiple-Beam Interference in Multiple-Beam Interferometry of Surfaces and Films," Chap II Oxford at the Clarendon Press, 1948, pp. 8-11.

Wang, et al., "Design and Fabrication of a Novel TWO-Dimension MEMS-Based Tunable Capacitor," IEEE International Conference on Communications, Circuits and Systems and West Sino Expositions, 2002, vol. 2, 1766-1769.

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

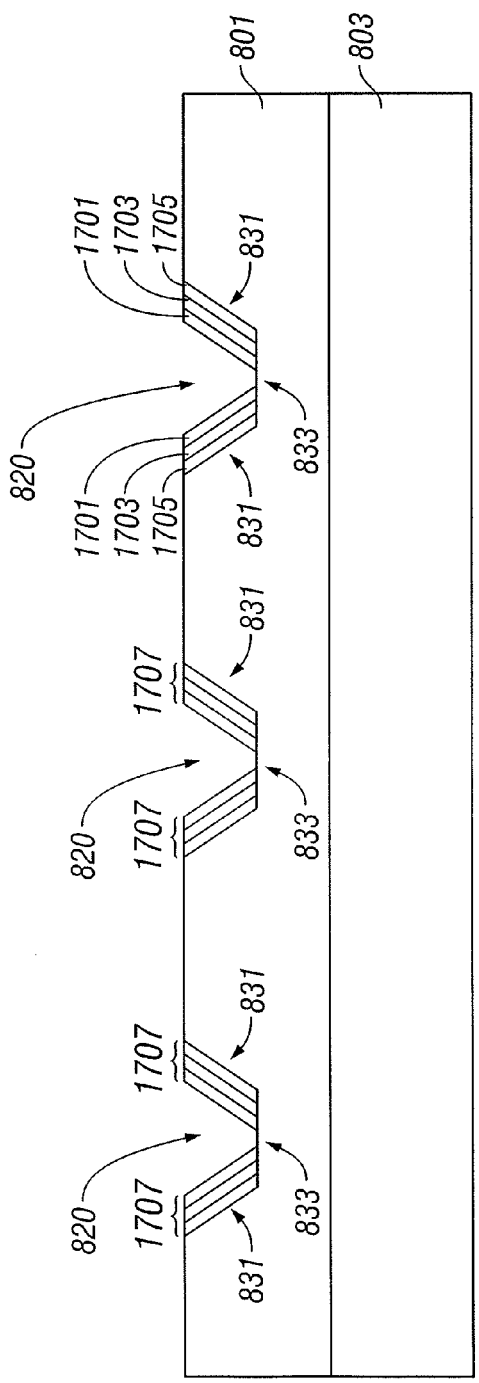
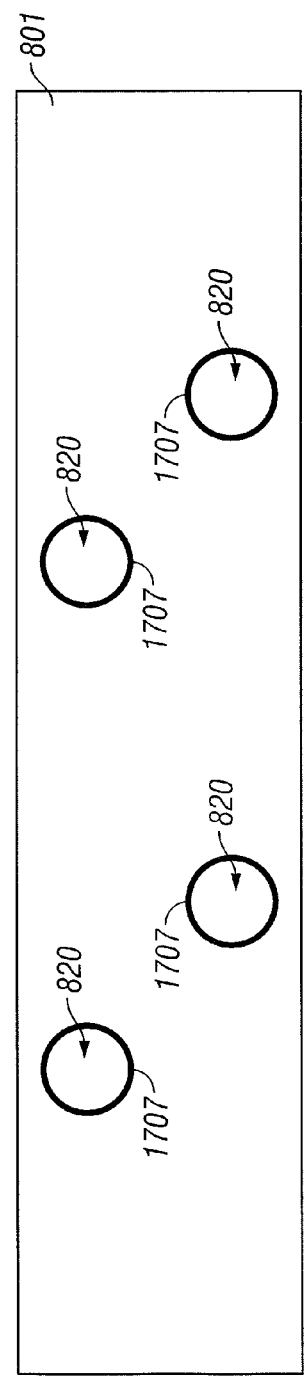
FIG. 17A
FIG. 17B

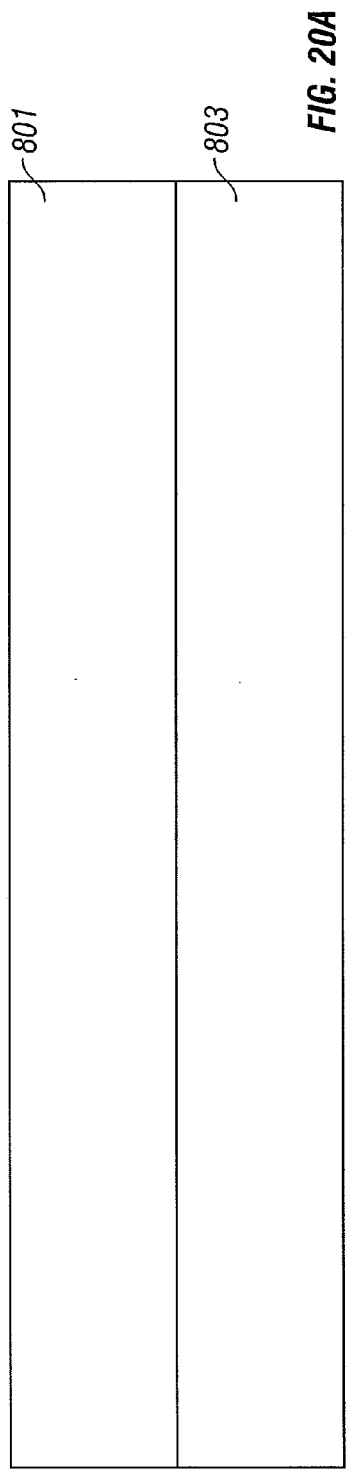
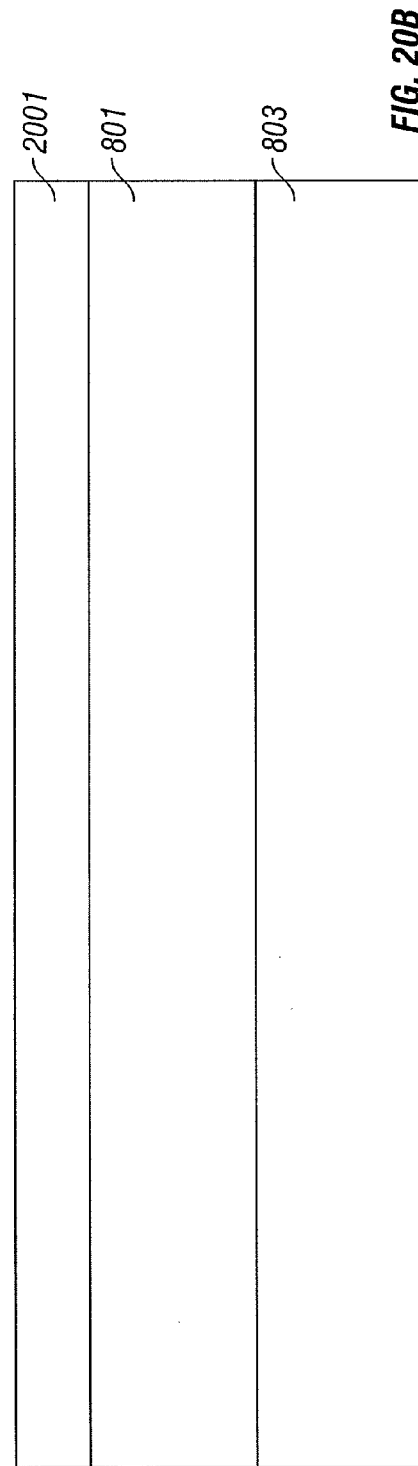
FIG. 20A
FIG. 20B

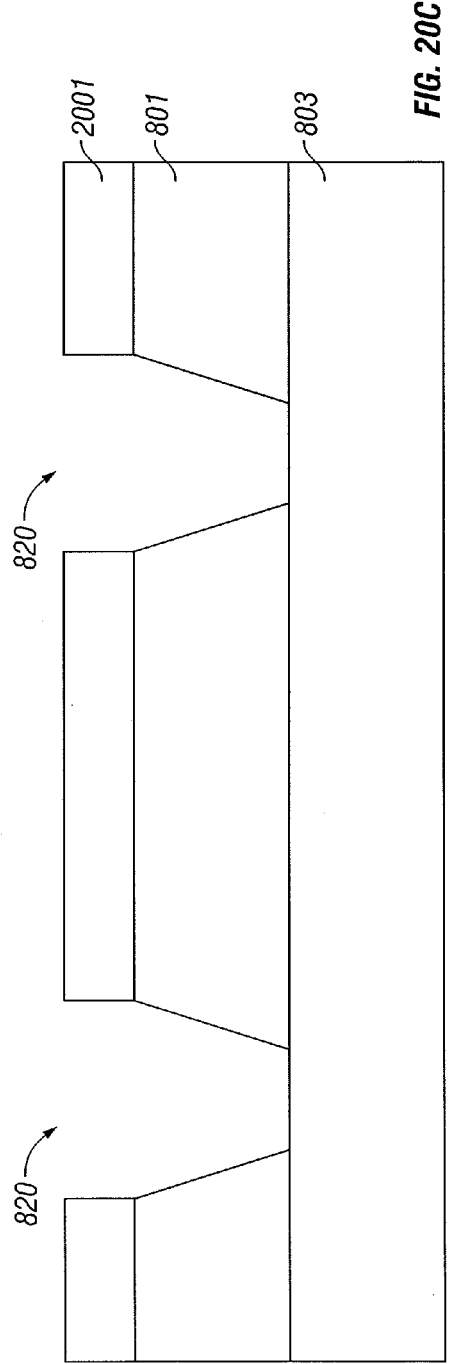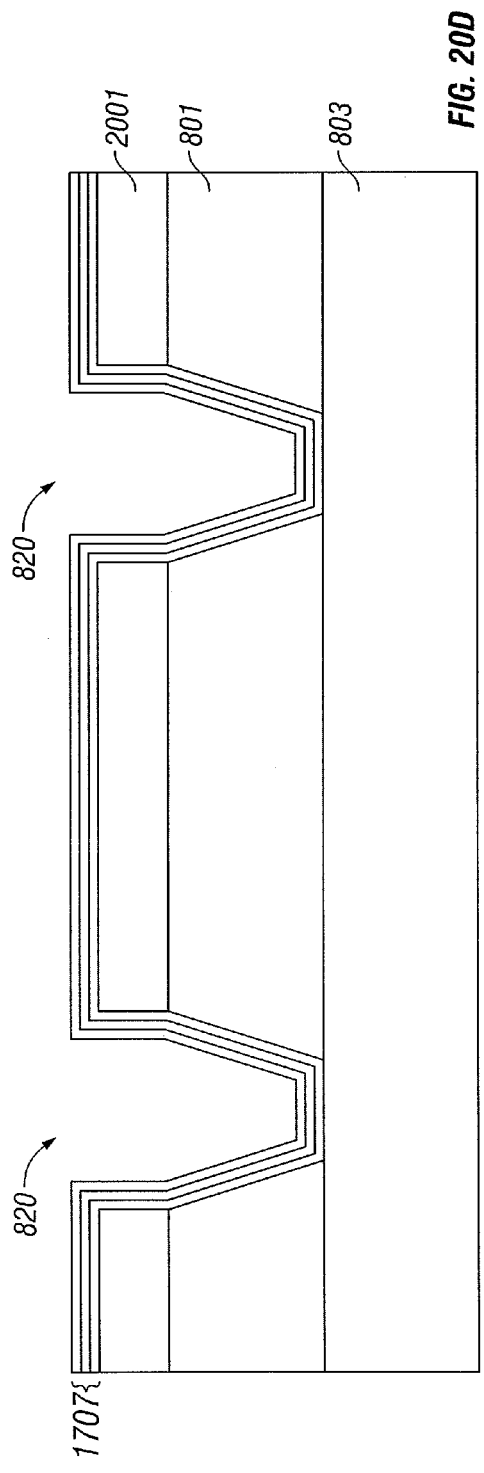

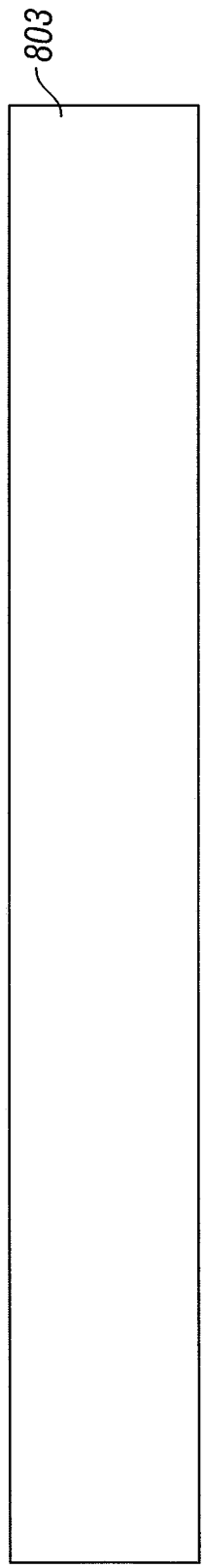

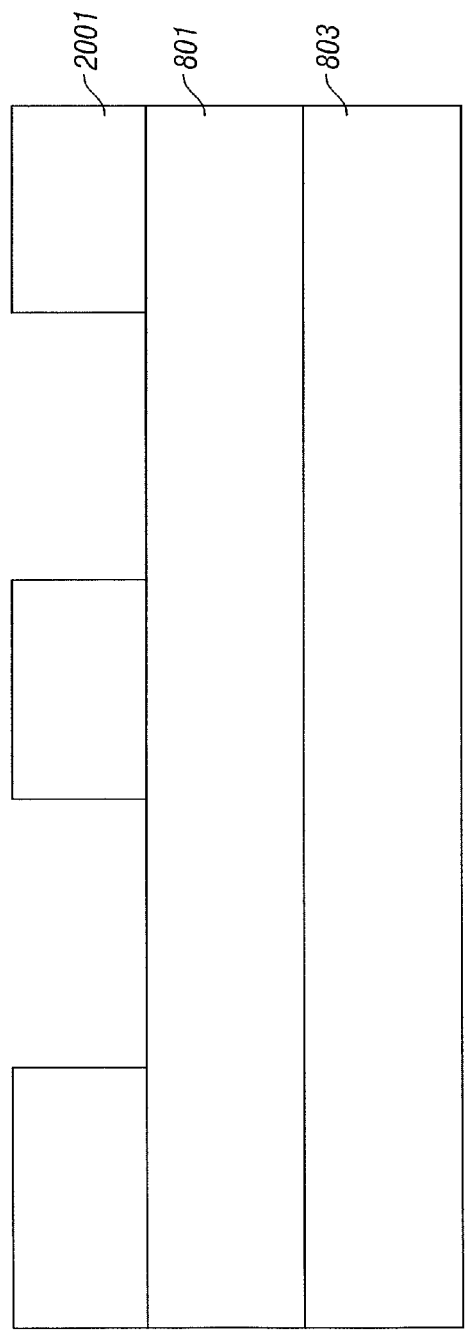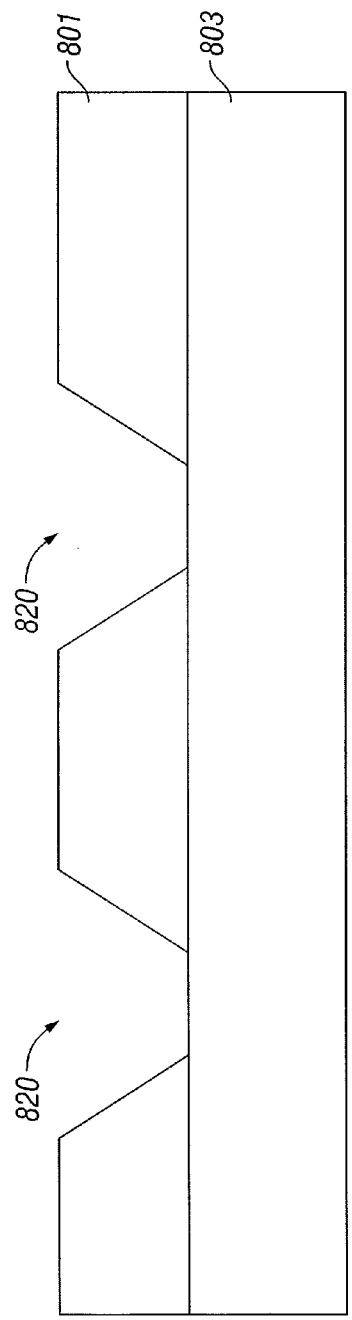

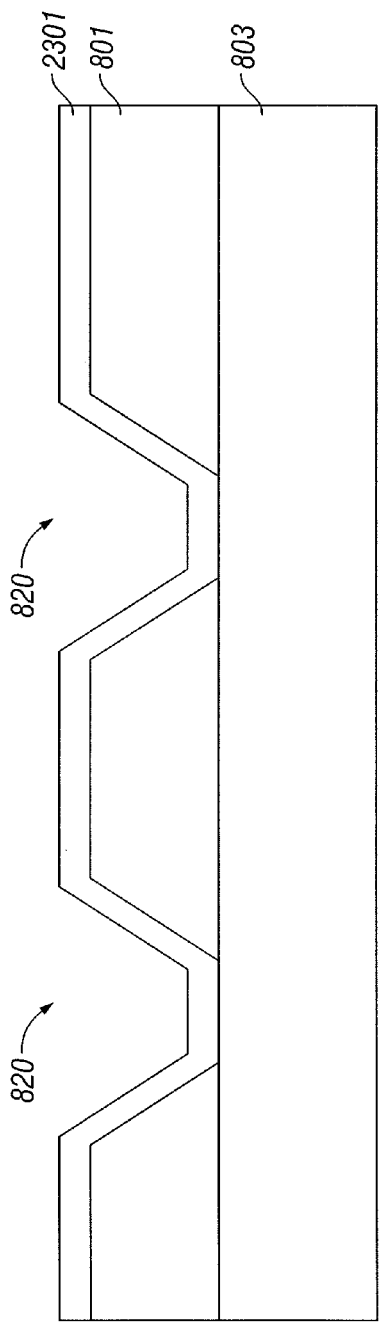
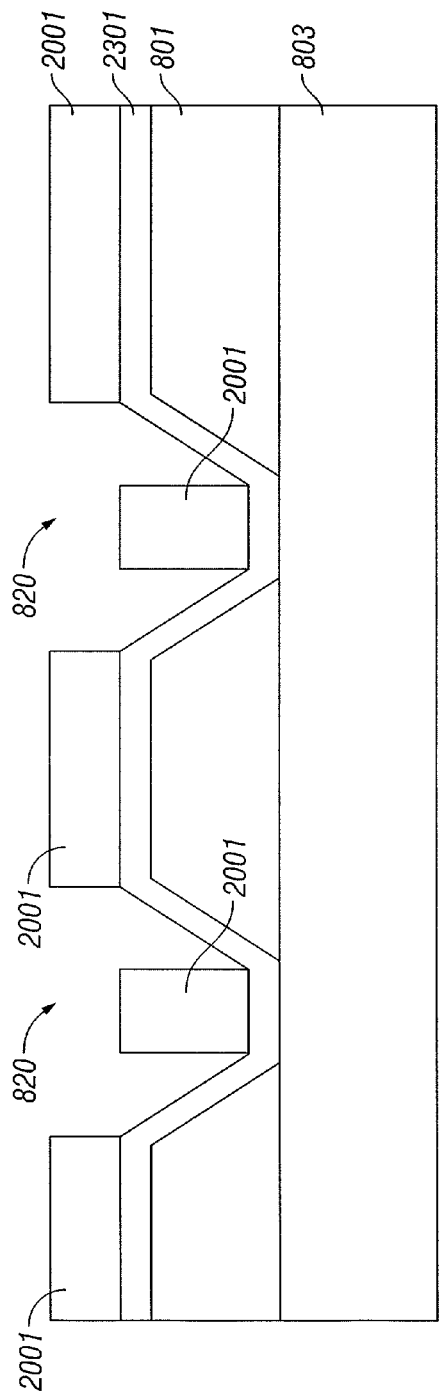
FIG. 23E
FIG. 23F

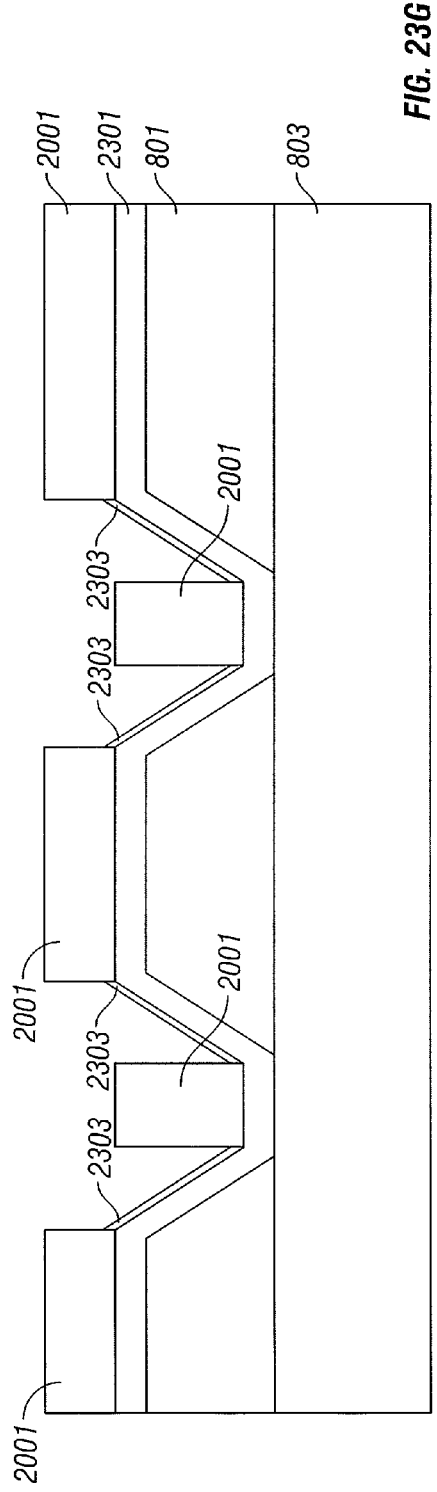

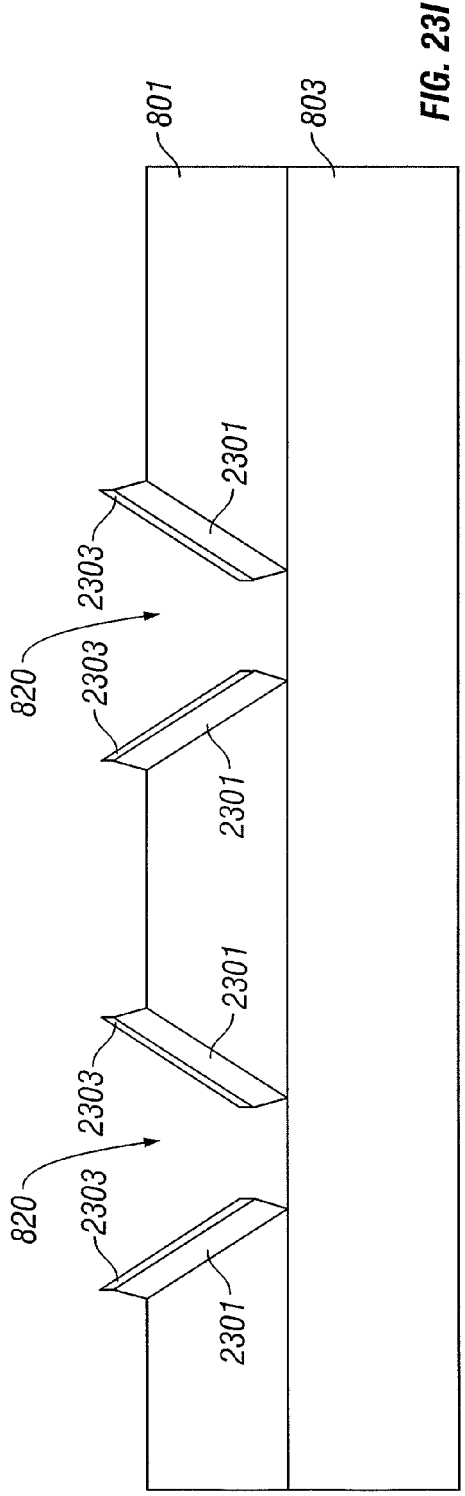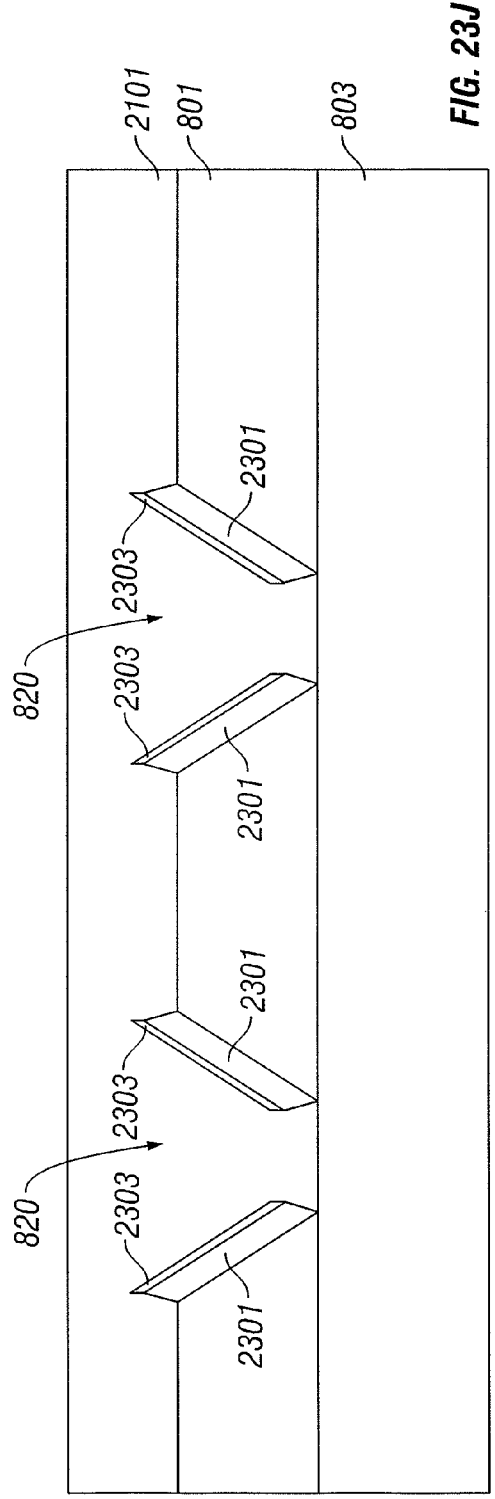

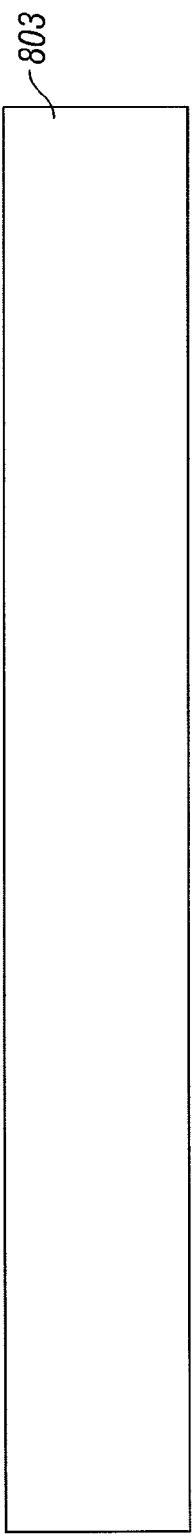
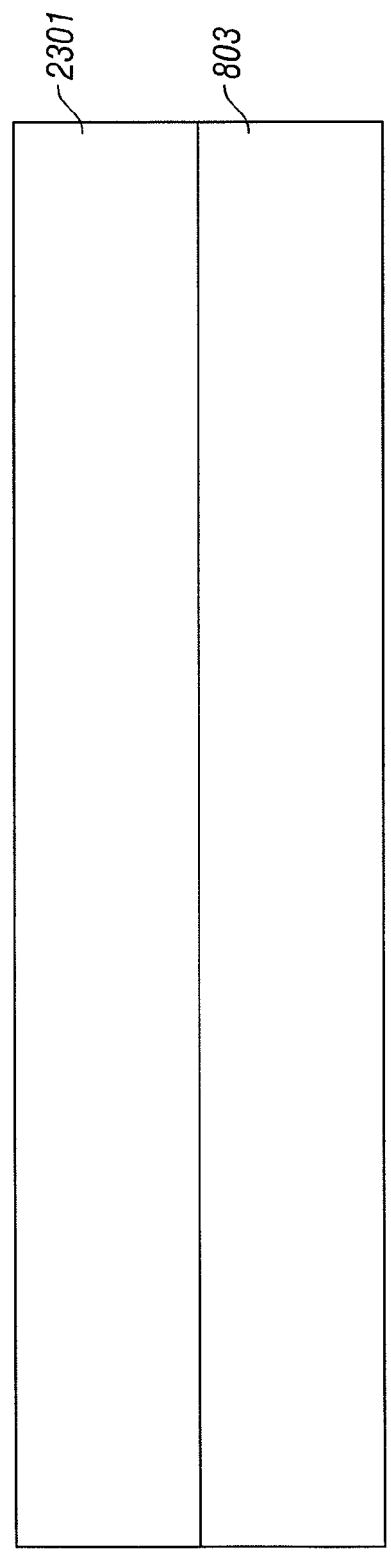

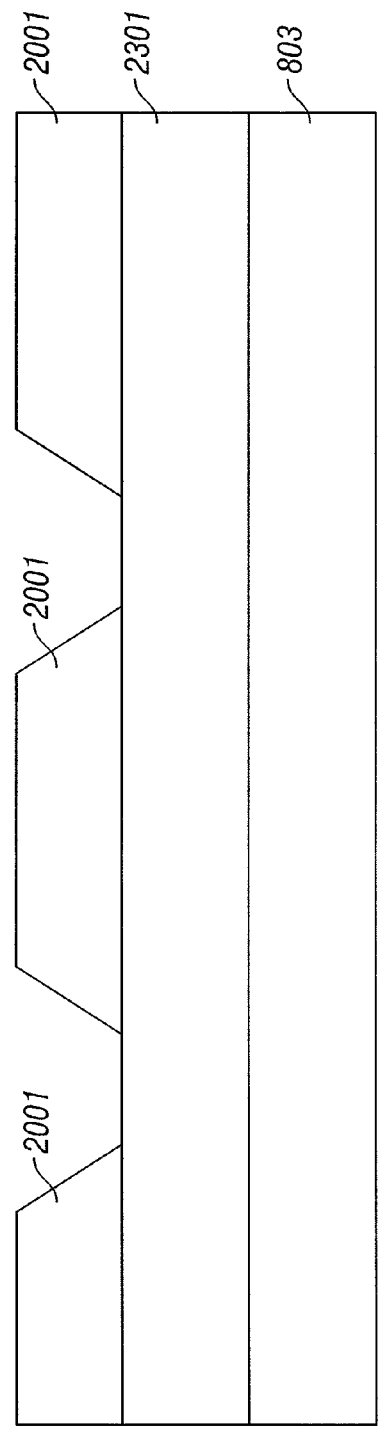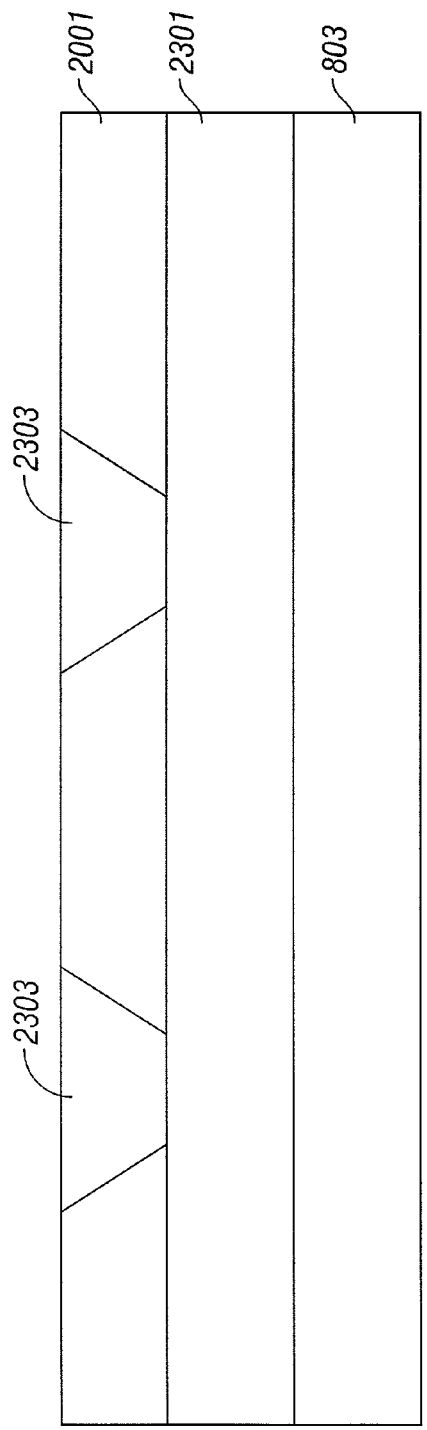

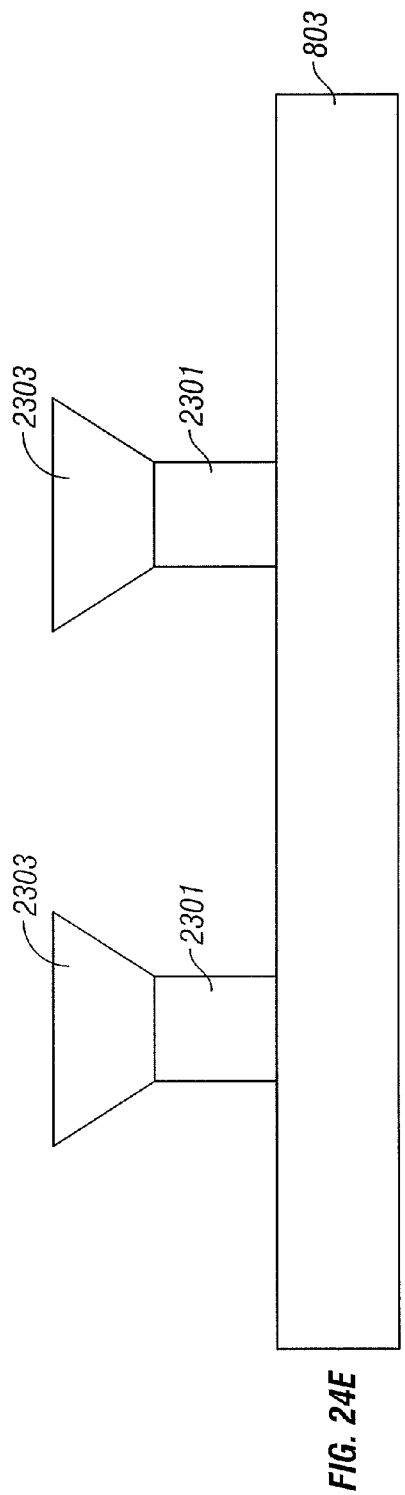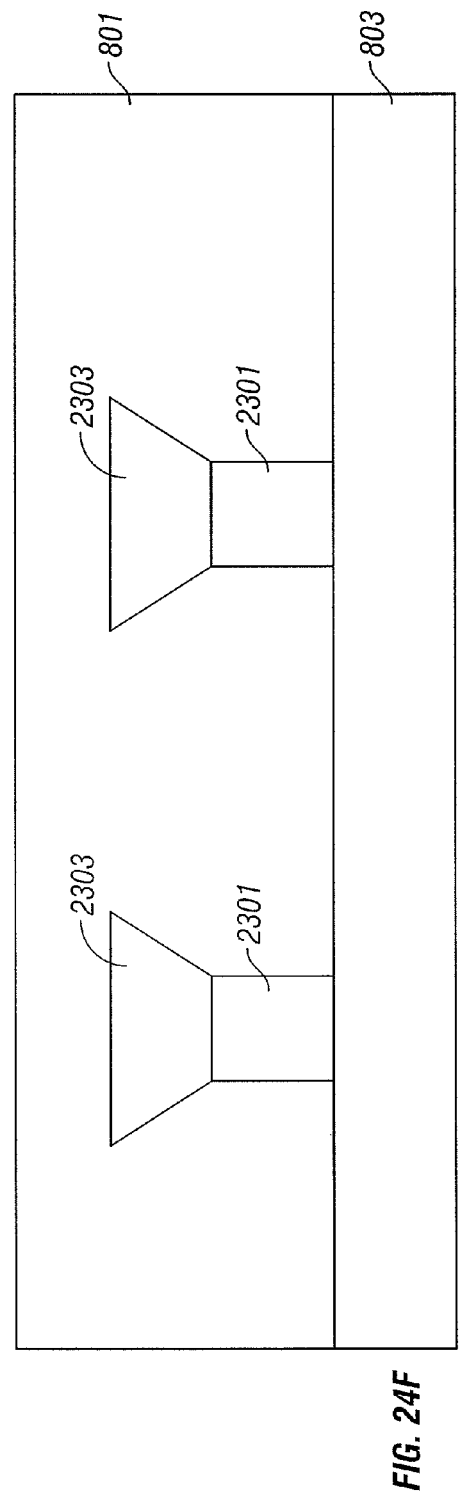

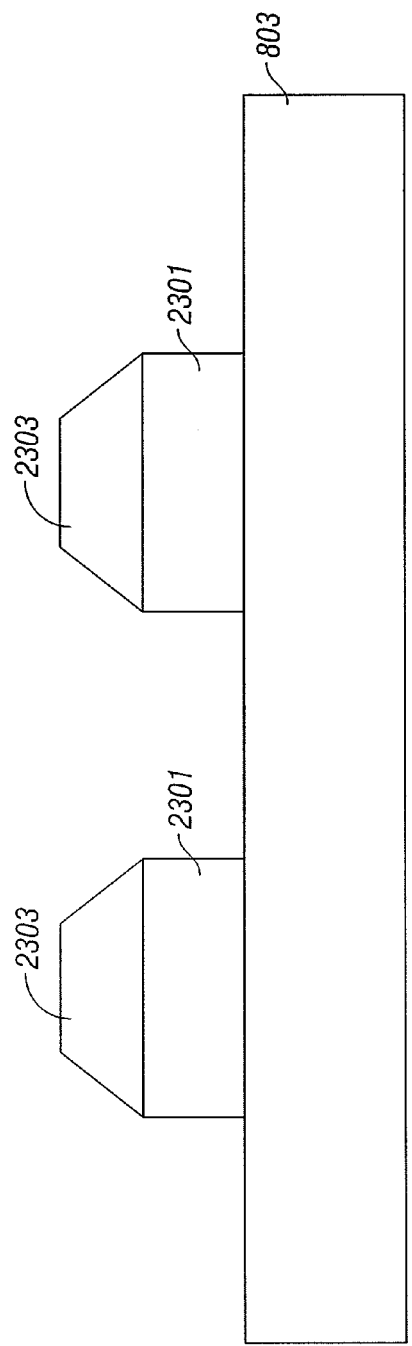
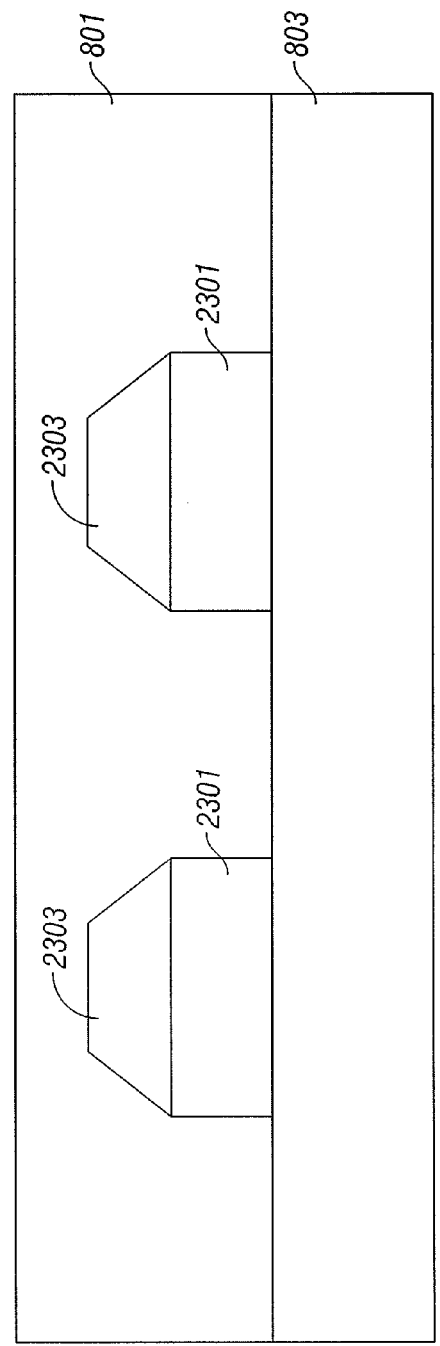
FIG. 25E
FIG. 25F

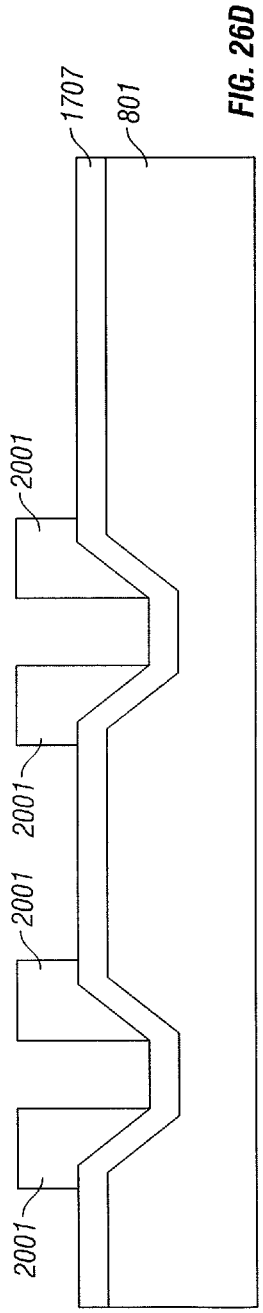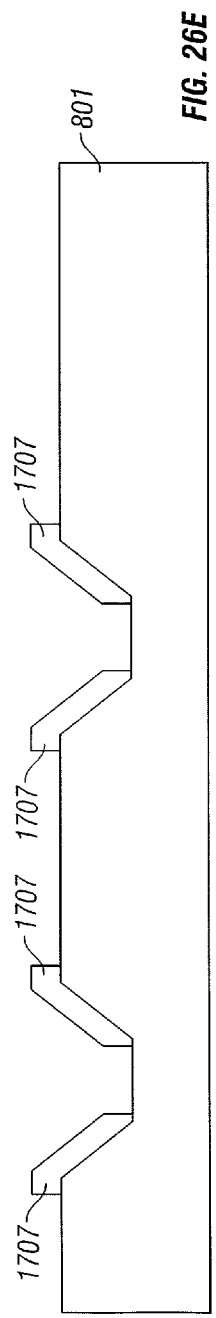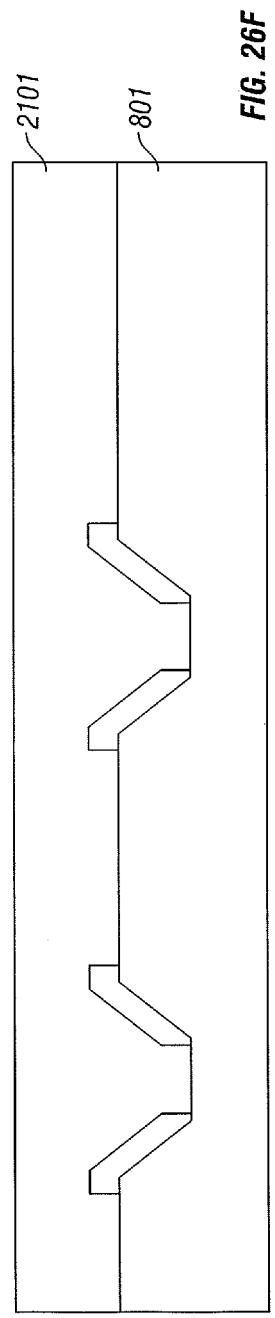

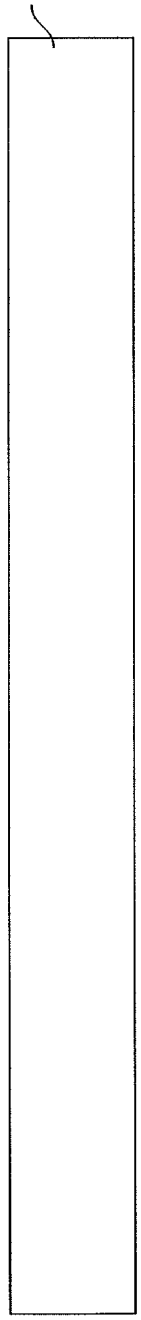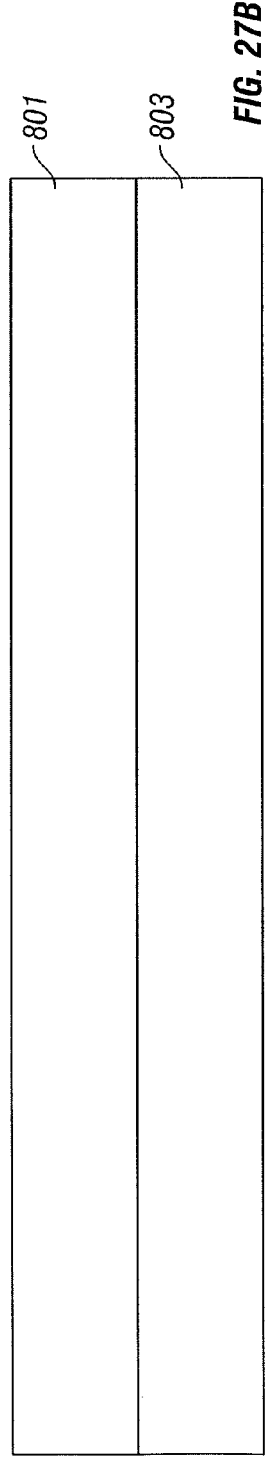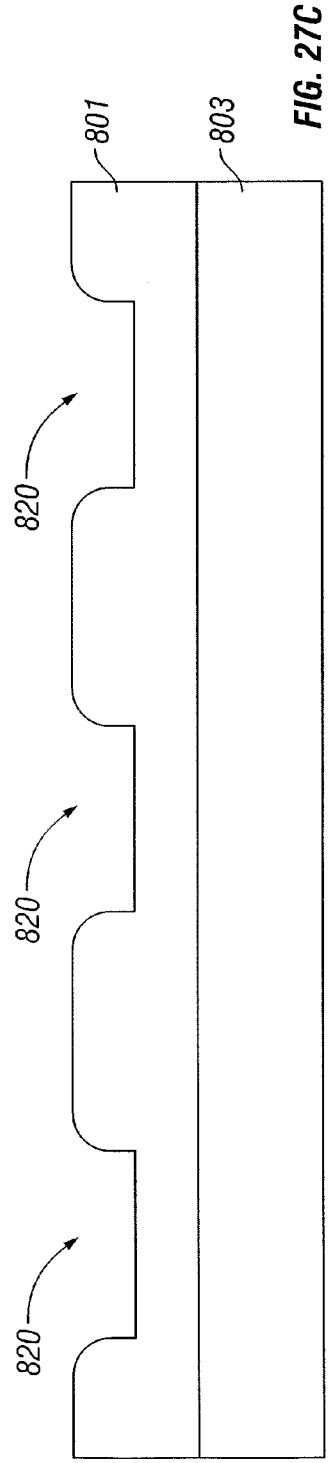

ILLUMINATION DEVICES AND METHODS OF FABRICATION THEREOF

CROSS-REFERENCE TO RELATED APPLICATIONS

This application claims the benefit of U.S. Provisional Application No. 61/182,594 filed on May 29, 2009, titled "ILLUMINATION DEVICES AND METHODS OF FABRICATION THEREOF," and U.S. Provisional Application No. 61/292,783 filed on Jan. 6, 2010, titled "ILLUMINATION DEVICES AND METHODS OF FABRICATION THEREOF," both of which are hereby expressly incorporated by reference in their entireties.

BACKGROUND

1. Field

The field of the invention relates to electromechanical systems.

2. Description of the Related Art

Electromechanical systems include devices having electrical and mechanical elements, actuators, transducers, sensors, optical components (e.g., mirrors), and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers or that add layers to form electrical and electromechanical devices. One type of electromechanical systems device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages over other display devices.

Various embodiments described herein comprise an illumination device including a substrate layer and a turning layer including light turning features coated with reflective layers configured to turn light propagating within the substrate toward a display.

In one embodiment, an illumination apparatus comprises a light source, a light guide having a generally planar first surface, a generally planar second surface opposite the first surface, a first end and a second end, and a length therebetween, wherein the light guide is positioned to receive light from the light source into the light guide first end, and wherein the light guide is configured such that light from the light source provided into the first end of the light guide propagates generally towards the second end, and a plurality of light turning features. Each light turning feature can have a turning surface configured to receive at least a portion of the light which is propagating generally towards the second end of the light guide and reflect at least a portion of the received light out of the first surface of the light guide, each light turning feature comprising an interferometric stack formed on at least a portion of the turning surface.

Other aspects can be included in the embodiments described herein. For example, each light turning feature can comprise a depression formed in the first surface of second surface of the light guide. The light guide can be disposed with respect to a plurality of spatial light modulators such that light reflected out of the light guide first surface illuminates the plurality of spatial light modulators. The interferometric stack can comprise a reflective layer disposed on the turning surface, a spacer layer disposed on the reflective layer, and a partially reflective absorber layer disposed on the spacer layer. The reflective layer can comprise aluminum, the absorber can comprise chromium, and the spacer can comprise silicon oxide.

In some embodiments, the illumination apparatus comprises a turning film having a generally planar first portion and a generally planar second portion, wherein the second portion is disposed between the first portion and the light guide. The turning film can comprise the plurality of light turning features. The light turning features can be disposed in a uniform pattern or in a non-uniform pattern on the turning film. The first portion and the second portion of the turning film can include at least a portion of a light turning feature. At least one light turning feature can run through both the first portion and the second portion. The turning film can comprise at least one light turning feature in the first portion and at least one light turning feature in the second portion. The at least one light turning feature in the first portion can be laterally offset from the light turning feature in the second portion. The turning film can have first and second ends and the first and/or second ends can be curved. The light turning features can have different depths or shapes from one another. The light turning features can be disposed in uniform or non-uniform patterns on the first surface or second surface. The light turning features can be curved, frustum-shaped, cone-shaped, and/or rotationally symmetrical.

Some embodiments of the illumination apparatus further comprise an array of light modulating elements positioned to receive light reflected out of the first surface of the light guide, a processor that is configured to communicate with the array of light modulating elements, said processor being configured to process image data, and a memory device that is configured to communicate with said processor. The apparatus can further comprise a driver circuit configured to send at least one signal to the light modulating array and a controller configured to send at least a portion of the image data to said driver circuit. The apparatus can also include an image source module configured to send the image data to the processor and the image source module can include at least one of a receiver, transceiver, and transmitter. The apparatus can also include an input device configured to receive input data and to communicate said data to said processor.

In one embodiment, an illumination device comprises means for providing light, means for guiding light, wherein the light guiding means has a planar first surface, a first end and a second end, and a length therebetween, wherein the light guiding means is configured such that light from the light providing means provided into the light guiding means first end propagates generally towards the light guiding means second end, and a plurality of means for turning light, each means for turning light having a turning surface configured to receive light propagating towards the second end of the light guiding means and reflect at least a portion of the received light out of the light guiding means first surface, each means for turning light comprising an interferometric stack formed on the turning surface. The light providing means can be a light emitting diode. The light guiding means can be a light guide. The light turning means can be frustum-shaped light turning features.

In yet another embodiment, an illumination apparatus includes a light source, a light guide having a generally planar first surface, a first end and a second end, and a length therebetween, the light guide positioned to receive light from the light source into the light guide first end, and the light guide configured such that light from the light source provided into the first end of the light guide propagates generally towards the second end, and a plurality of light turning features, each light turning feature having a turning surface configured to receive at least a portion of the light which is propagating generally towards the second end of the light guide and reflect at least a portion of the received light out of the planar first surface of the light guide, each light turning feature comprising a reflective layer disposed over at least a portion of each turning surface, and a plurality of optical masks, each mask formed on a reflective layer. The optical masks can include dark coatings or an absorber layer that forms an interferometric stack with the reflective layer.

In one embodiment, a method of manufacturing an illumination apparatus includes providing a light guide, forming a turning film on the light guide, forming a plurality of light turning features on the turning film, each light turning feature comprising a light turning surface, and forming an interferometric stack on each light turning surface. Forming the interferometric stack can include electroplating at least one layer of the interferometric stack or etching the light turning film to form light turning features and depositing the layers of the stack on each light turning surface.

BRIEF DESCRIPTION OF THE DRAWINGS

FIG. 17A is a cross-section of an embodiment of an illumination device that depicts light turning features having multi-coated edges.

FIG. 17B is a top plan view of an embodiment of an illumination device.

FIGS. 20A-20E are schematic cross-sectional views illustrating steps in a process of manufacturing an illumination device.

FIG. 22A-22E are schematic cross-sectional views illustrating steps in a process of manufacturing an illumination device.

FIG. 23A-23J are schematic cross-sectional views illustrating steps in a process of manufacturing an illumination device.

FIG. 24A-24F are schematic cross-sectional views illustrating steps in a process of manufacturing an illumination device.

FIG. 25A-25G are schematic cross-sectional views illustrating steps in a process of manufacturing an illumination device.

FIG. 26A-26F are schematic cross-sectional views illustrating steps in a process of manufacturing an illumination device.

FIG. 27A-27C are schematic cross-sectional views illustrating steps in a process of manufacturing an illumination device.

DETAILED DESCRIPTION OF PREFERRED EMBODIMENTS

Figure 1:
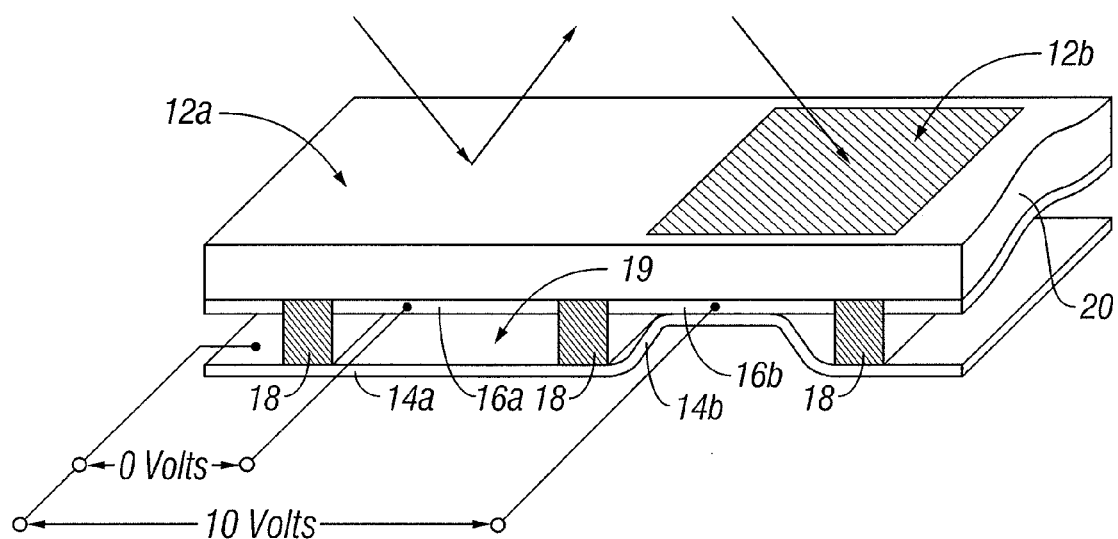
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments. However, the teachings herein can be applied in a multitude of different ways. In this description, reference is made to the drawings wherein like parts are generally designated with like numerals throughout. In certain illustrated embodiments, like numerals are used to designate generally corresponding parts; however, it will be understood that such designated parts can vary from embodiment to embodiment, for example as described herein. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Illumination devices can be used to provide light for reflective displays when ambient light is insufficient. In some embodiments, an illumination device comprises a light source and a light guide that receives the light from the light source. Often the light source may be positioned or offset relative to the display, and in such a position it may not provide sufficient or uniform light directly to the reflective display. Accordingly, an illumination device can also include light turning features that re-direct light from the light source towards the display, and such turning features can be included in a turning film positioned on the light guide. In some embodiments, turning features have reflective coatings configured to (better) reflect light propagating within the light guide and/or turning film towards the reflective display. The reflective coatings could appear shiny or bright, but they can be masked to a viewer by forming a dark coating (e.g., black mask) over the reflective coating to absorb light such that the turning features appear dark or black, resulting in improving contrast of the display. The black mask can include the reflective layer, and an absorber layer, and be configured as a "static" interferometric modulator configured to appear dark or black. The light guide and the turning film may be made from an inorganic material. To facilitate light propagating between the turning film and the light guide, the turning film may have an index of refraction that matched to the light guide. Embodiments disclosed herein relate to different configurations of illumination devices that include one or more reflective coatings on turning features. Additional embodiments disclosed herein relate to processes of forming illumination devices that include an inorganic light guide and/or inorganic turning film.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
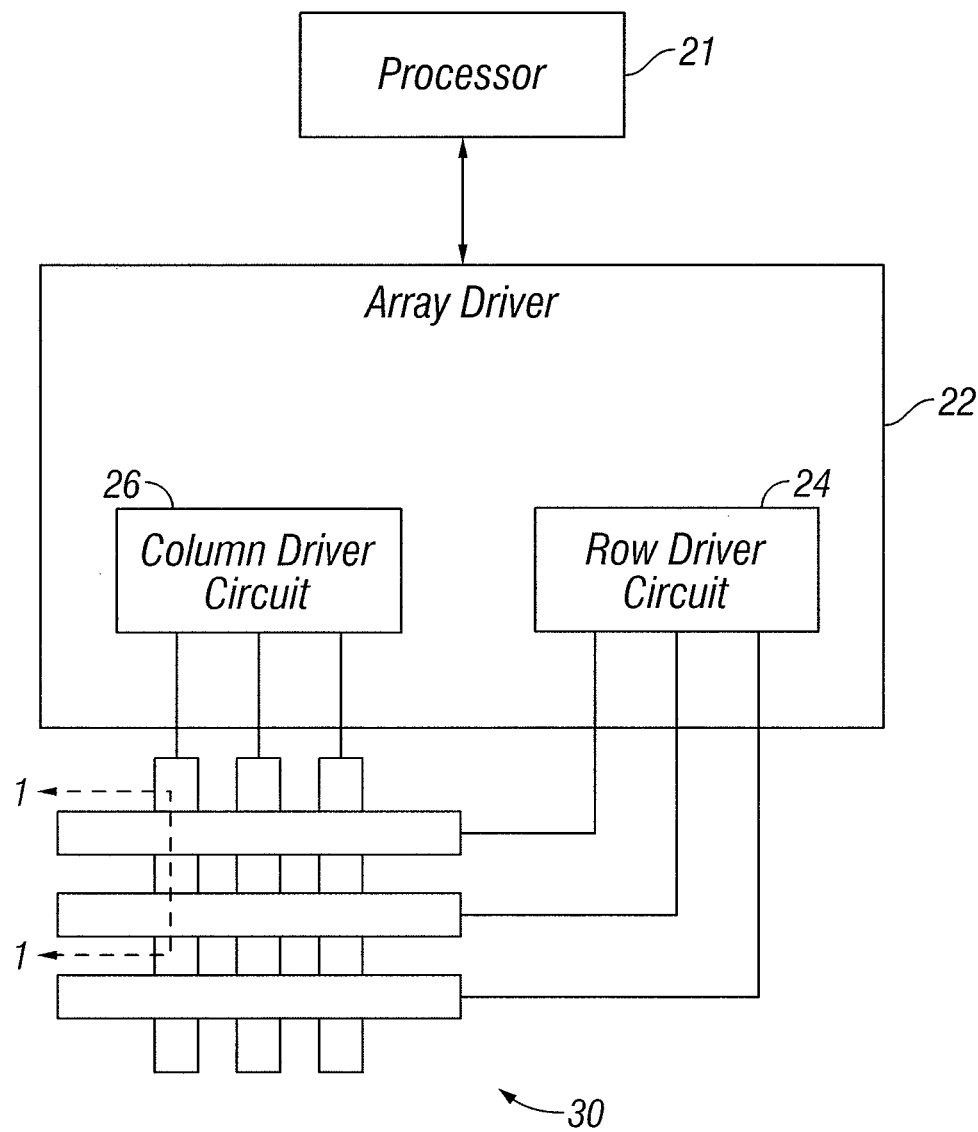
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross-section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
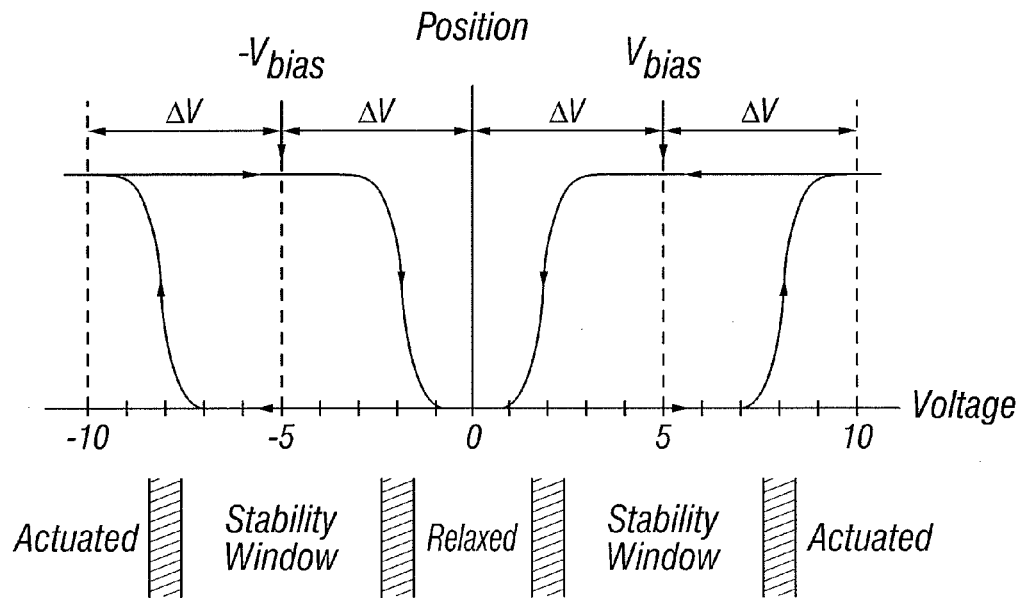
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
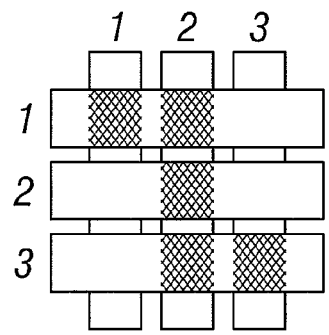
FIGS. 5A and 5B illustrate one exemplary timing diagram for row and column signals that may be used to write a frame of display data to the 3×3 interferometric modulator display of FIG. 2.
Figure 5B:
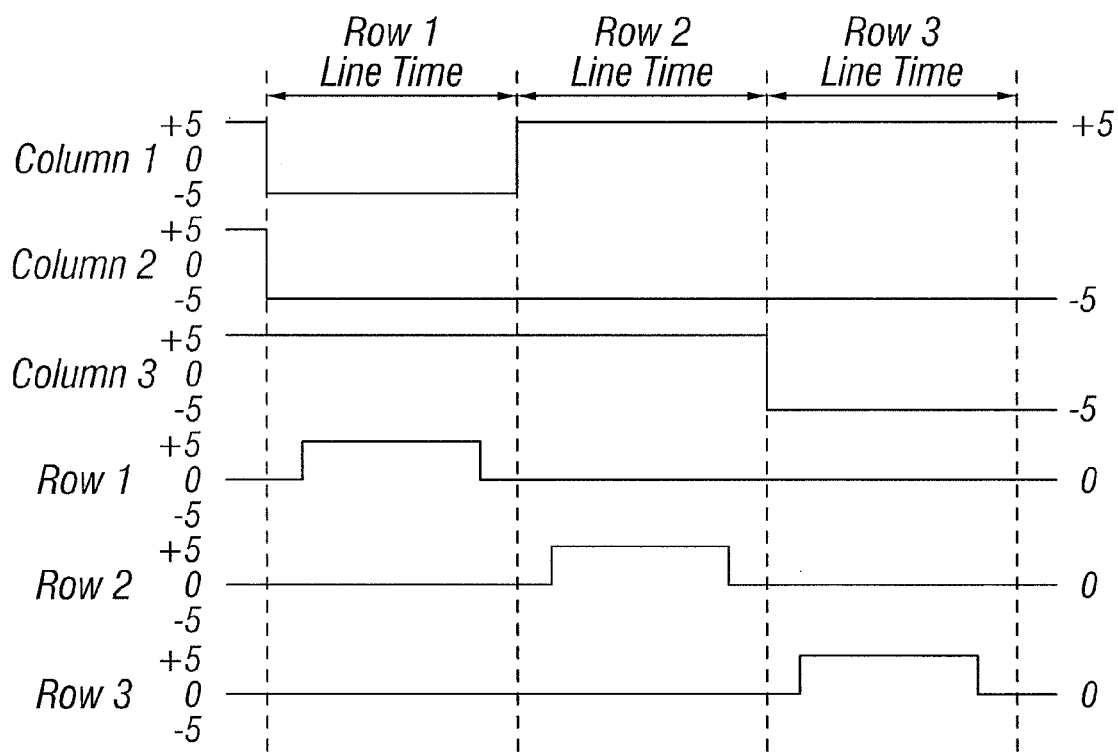

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
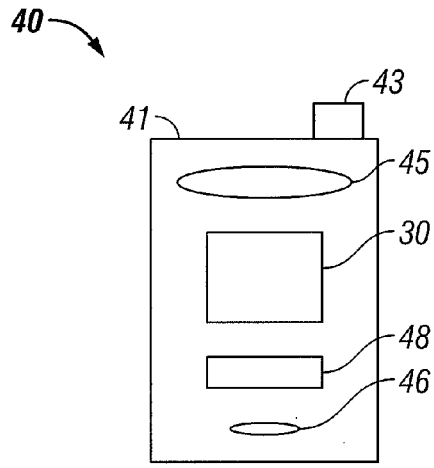
FIGS. 6A and 6B are system block diagrams illustrating an embodiment of a visual display device comprising a plurality of interferometric modulators.
Figure 6B:
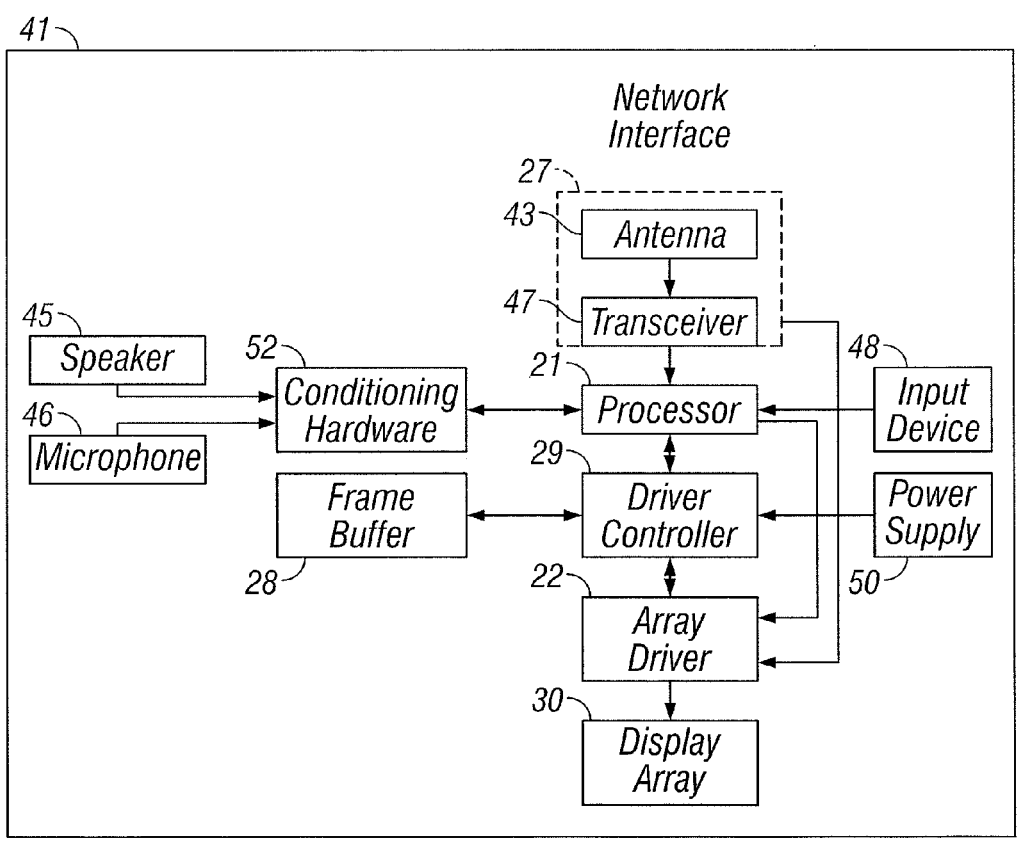

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
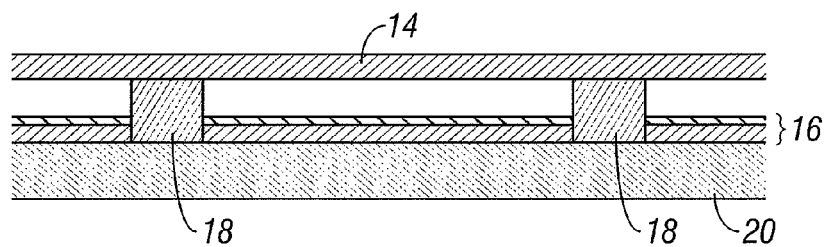
FIG. 7A is a cross-section of the device of FIG. 1.
Figure 7B:
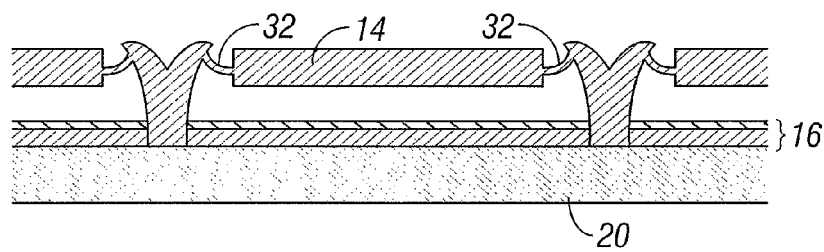
FIG. 7B is a cross-section of an alternative embodiment of an interferometric modulator.
Figure 7C:
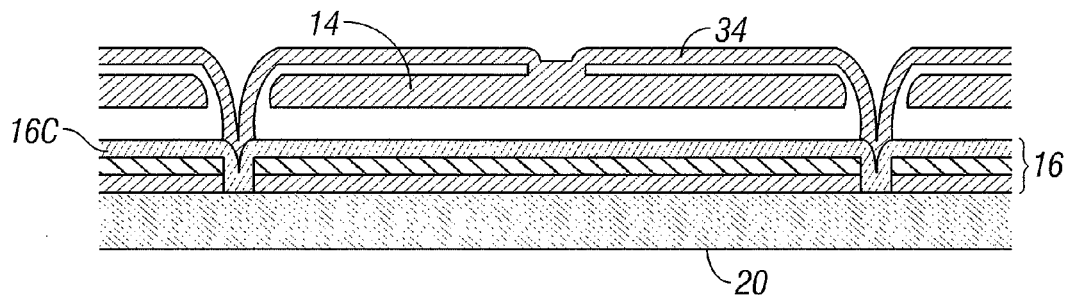
FIG. 7C is a cross-section of another alternative embodiment of an interferometric modulator.
Figure 7D:
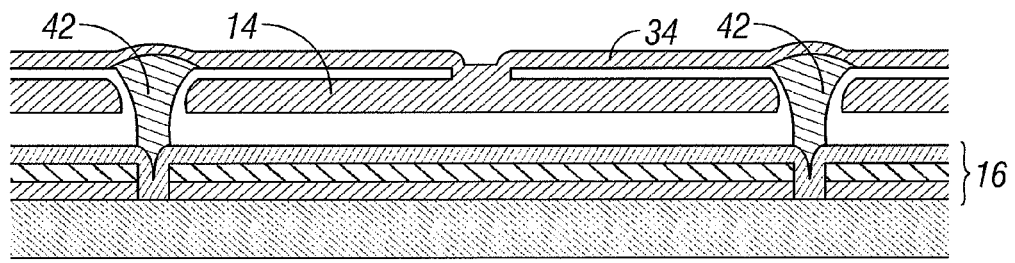
FIG. 7D is a cross-section of yet another alternative embodiment of an interferometric modulator.
Figure 7E:
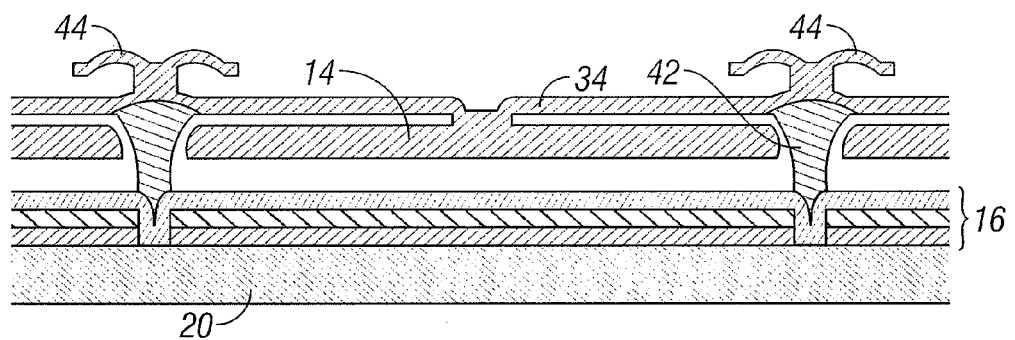
FIG. 7E is a cross-section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross-section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Interferometric modulators are reflective elements that can be configured to reflect ambient lighting in daylight or well-lit environments to produce a display. When ambient light may not be sufficient, a light source can provide the required illumination, either directly or through a light guide that provides a propagation path from the light source to the display elements. In some embodiments, an illumination device provides light from a light source to the display elements. The illumination device can include a light guide and light turning features, which may be disposed in or on a turning film disposed on the light guide. In some embodiments the illumination device also includes a light source. The light guide can be a planar optical device disposed over and parallel to the display such that incident light passes through the light guide to the display, and light reflected from the display also passes through the light guide. In certain embodiments, the light source includes an optical device (for example, a light bar) that is configured to receive light from a point source (e.g., a light emitting diode) and provides light as a line source. Light entering the light bar may propagate along some or all of the length of the bar and exit out of a surface or edge of the light bar over a portion or all of the length of the light bar. Light exiting the light bar may enter an edge of a light guide and/or a turning film, and then propagate within the light guide and/or turning film such that a portion of the light propagates in a direction across at least a portion of the display at a low-graze angle relative to the surface of the light guide aligned with the display such that the light is reflected within the light guide by total internal reflection ("TIR"). In various embodiments, turning features in the light guide and/or turning film direct the light towards the display elements at an angle sufficient so that at least some of the light passes through the light guide to the reflective display. In any of the embodiments described herein, the turning features may include one or more coatings (or layers). The coatings can be configured to increase reflectivity of a turning feature and/or function as a black mask to improve contrast of the display as seen by a viewer. In certain embodiments, the coatings on the turning features may be configured as an interferometric stack having a reflective layer that re-directs light propagating within the light guide and/or turning film, a partially reflective absorber layer disposed between the reflective layer and the direction exposed to ambient light, and a layer disposed between the reflective layer and the absorber layer which defines an optical resonant cavity by its thickness.

Figure 8:
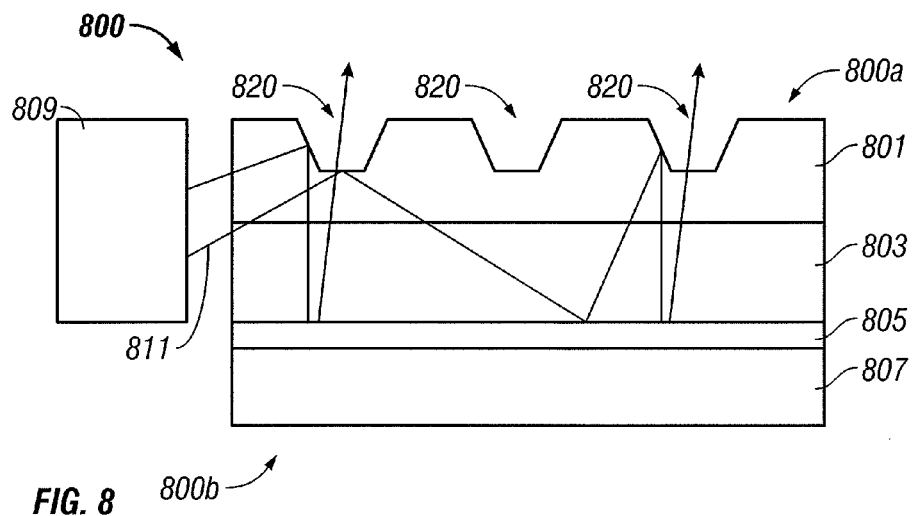
FIG. 8 is a cross-section of an embodiment of a display device having an illumination device and a reflective display.

FIG. 8 illustrates a cross-sectional view of one embodiment of a display device 800 that includes an illumination device configured to provide front light illumination to a reflective display 807. The display device 800 includes a turning film 801 shown in FIG. 8 as forming a first side 800*a* of the device 800. The turning film 801 is disposed on a light guide 803. In this embodiment, a reflective display 807 is disposed underneath the light guide 803 and defines a second side 800*b* of the display device 800. According to some embodiments, an optical isolation layer 805 may optionally be disposed between the reflective display 807 and the light guide 803. A light source 809 may be disposed near the light guide 803 and turning film 801 and configured to input light into at least one edge or surface of either, or both, the turning film 801 and the light guide 803, illustrated in FIG. 8 as providing light into both the turning film 810 and the light guide 803. The light source 809 may comprise any suitable light source, for example, an incandescent bulb, a light bar, a light emitting diode ("LED"), a fluorescent lamp, an LED light bar, an array of LEDs, and/or another light source.

In some embodiments, the reflective display 807 comprises a plurality of reflective elements, for example, interferometric modulators, MEMS devices, NEMS devices, reflective spatial light modulators, electromechanical devices, liquid crystal structures, and/or any other suitable reflective display. The reflective elements may be configured in an array. In some embodiments, the reflective display 807 includes a first planar side that is configured to modulate light incident thereon and a second planar side disposed opposite to the first planar side. The size of the reflective display 807 can vary depending upon the application. For example, in some embodiments, the reflective display 807 is sized to fit within a notebook computer casing. In other embodiments, the reflective display 807 is sized to fit within or form part of a mobile phone or similar mobile device.

In some embodiments, the turning film 801 and light guide 803 can comprise any substantially optically transmissive material that allows light to propagate along the length thereof. For example, the turning film 801 and the light guide 803 may each comprise one or more of the following materials: acrylics, acrylate copolymers, UV-curable resins, polycarbonates, cycloolefin polymers, polymers, organic materials, inorganic materials, silicates, alumina, sapphire, glasses, polyethylene terephthalate ("PET"), polyethylene terephthalate glycol ("PET-G"), silicon oxy-nitride, and/or other optically transparent materials. In some embodiments, the turning film 801 and the light guide 803 comprise the same material and in other embodiments, the turning film and the light guide 803 comprise different materials. In some embodiments, the indices of refraction of the turning film 801 and the light guide 803 may be close or equal to one another such that light may propagate successively through the two layers without being substantially reflected or refracted at the interface between the two layers. In one embodiment, the light guide 803 and the turning film 801 each have an index of refraction of about 1.52. According to other embodiments, the indices of refraction of the light guide 803 and/or the turning film 801 can range from about 1.45 to about 2.05. The light guide 803 and turning film 801 may be held together by an adhesive, which may have an index of refraction similar or equal to the index of refraction of one or both of the light guide and turning film. In some embodiments, the reflective display 807 is laminated to the light guide 803 using a refractive-index matched pressure-sensitive adhesive ("PSA") or similar adhesive.

Both the light guide 803 and the turning film 801 can include one or more turning features 820. In some embodiments, the light guide 803 and the turning film 801 each comprise a single layer. In other embodiments, the light guide 803 and/or the turning film 801 comprise more than one layer. The light guide 803 and the turning film 801 can have differing thicknesses and/or other dimensions. In example embodiments, the turning film 801 can have a thickness of between about 40 and about 100 microns, and the light guide 803 can have a thickness of between about 40 and about 200 microns. Uniformity of brightness across the display device 800 and efficiency of the display device may be affected by the thickness of the light guide 803 and of the turning film 801.

In some embodiments, the turning film 801 can include one or more turning features 820 disposed on or along the first side 800a of the display device 800. In other embodiments, one or more turning features 820 may be disposed on the side of the turning film 801 and/or light guide 803 nearest to the reflective display 807. The turning features 820 depicted throughout the attached figures are schematic and exaggerated in size and spacing therebetween for clarity of illustration. The turning features 820 can comprise one or more angled and/or curved surfaces configured to refract (or reflect) at least some of the light which is traveling through the light guide (e.g., at an oblique angle) away from the display 807 at the interface between the angled or curved surface of the feature 820 and the air, and redirect that light towards the reflective display 807. In certain embodiments, the turning features can comprise a plurality of surface features or volume features. In some embodiments, the turning features 820 comprise one or more diffractive optical elements, grooves, depressions, and/or pits. In certain embodiments, the turning features 820 comprise holograms or holographic features. The holograms may include holographic volume or surface features. The size, shape, quantity, and pattern of the turning features 820 may vary. In some embodiments, the turning features 820 may be disposed along the length and width of the turning film 801. In some embodiments, turning features 820 are disposed on about 5% of the area of the first side 800a of the turning film 801.

In some embodiments, the turning features 820 are configured to receive light propagating along the length of the turning film 801 and turn the light through a large angle, for example, between about 70-90°. The turning features 820 can have one or more edges shaped such that they can reflect light incident on the edges from certain directions via total internal reflection ("TIR") and cause the light to be turned toward the reflective display 807 at a normal or near-normal angle of incidence (with respect to the display). The turning features 820 illustrated and described herein may include a reflective coating which is selected and/or configured to increase light reflection properties (for example, reflective coatings as described in reference to FIGS. 17A, 18, 19C, 20D, 20E, 21H, and others). The turning features 820 may be molded, etched, or machined in the turning film 801. In some embodiments, the turning features described herein may be molded, etched, or machined directly in the light guide 803 and a separate turning film 801 is not included, such that the light guide itself forms a turning film. In some embodiments, both the light guide 803 and the turning film 801 include turning features 820. Methods for forming turning features are described herein below in reference to FIGS. 19A-D, 20A-F, 21.

Still referring to FIG. 8, in one embodiment, light 811 emitted from the light source 809 enters the light guide 803 and/or the turning film 801 along one or more edges or surfaces of the light guide and/or the turning film. A portion of light 811 propagates within the light guide 803 and turning film 801 at shallow angles (e.g., not near-perpendicular to the reflective display 807) and may generally remain within the light guide 803 and turning film 801 by TIR. When light 811 impinges on turning features 820, it may be turned at a perpendicular or near-perpendicular angle toward the display 807 allowing the light 811 to break TIR and illuminate the display 807. Light 811 that illuminates the reflective display 811 may be reflected towards the first side 800a and out of the display device 800 towards a viewer. To maximize the brightness and efficiency of the display 807, the light turning features 820 can be configured to reflect light at an angle normal to the display or close thereto. Light 811 that does not at first reflect off of one of the turning features 820 may continue to propagate through the light guide 803 and turning film 801 and subsequently reflect off another of the turning features 820 and be redirected towards the display 807, for example at a location further from the light source 809.

In some embodiments, one or more optical isolation layers 805 may be disposed between the light guide 803 and the reflective display 807 to improve the optical performance of the display 800. An optical isolation layer 805 may be disposed between the light guide 803 and an array of interferometric modulators to prevent light propagating through the light guide 803 at shallow angles from reaching the array, because such light would also be reflected from the display at a shallow angle and may not reach a viewer. According to some embodiments, the optical isolation layer 805 has an index of refraction substantially lower than the light guide 803 such that light traveling through the light guide 803 and striking the optical isolation layer 805 at an oblique or low grazing angle, for example, light traveling at a lower angle than the critical angle (which may be, for example, greater than 50° or 60°, will be reflected back into the light guide 803 and turning film 801. The optical isolation layer 805 can include, for example, silicon dioxide, fluorinated silicon dioxide, or another material with a suitable index of refraction.

Figure 9A:
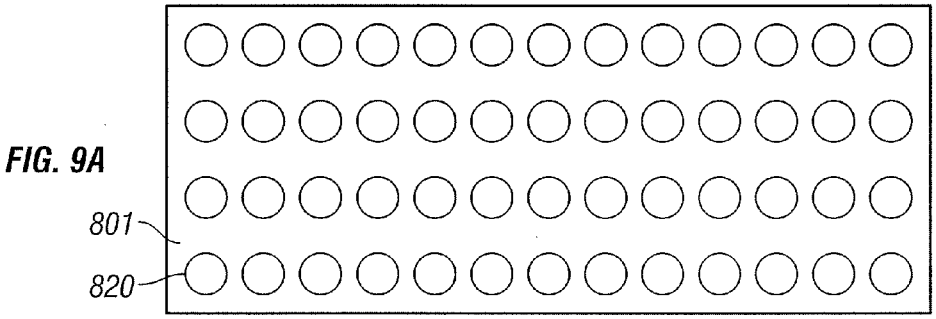
FIG. 9A is a top plan view of an embodiment of a display device having turning features disposed in a uniform pattern on a turning film.
Figure 9B:
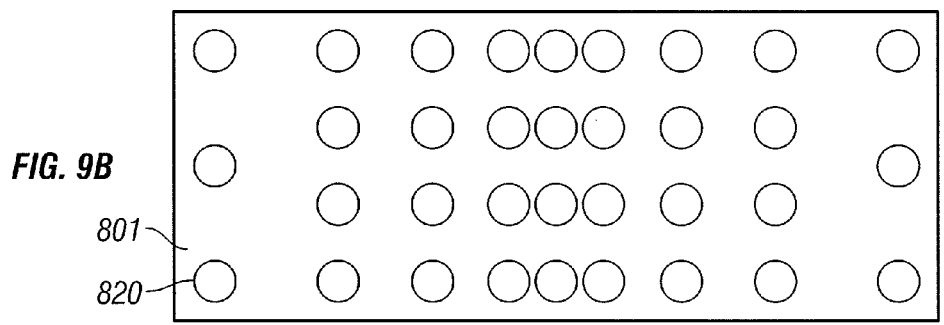
FIG. 9B is a top plan view of an embodiment of a display device having turning features disposed in a non-uniform pattern on a turning film.
Figure 9C:
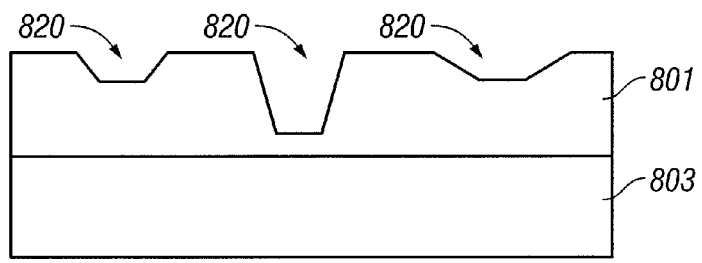
FIG. 9C is a cross-section of an embodiment of an illumination device having a turning film and a substrate.
Figure 9D:
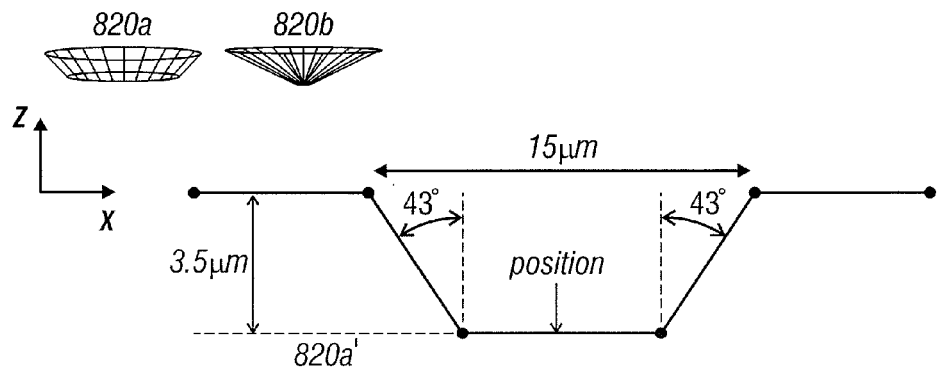
FIG. 9D illustrates certain dimensions of one embodiment of a turning feature rotationally.
Figure 10:
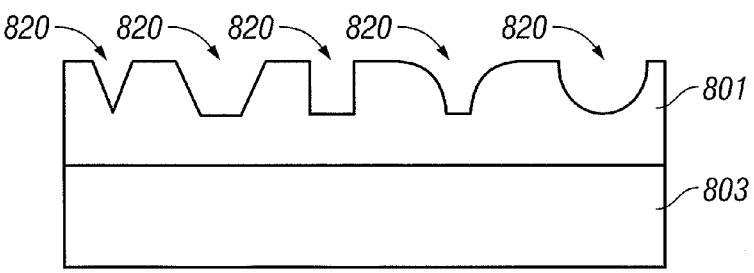
FIG. 10 is a cross-section of an embodiment of an illumination device illustrating several embodiments of light turning features.

As shown in FIGS. 9A-10, the size, shape, pattern, and quantity of the turning features 820 can vary. The quantity of turning features 820 can vary from one turning film 801 to another and the density of turning features 820 can vary from one portion of a turning film 801 to another portion of the turning film. For example, FIG. 9A illustrates an embodiment having turning features 820 disposed across a turning film 801 in a uniform pattern. In another example, FIG. 9B illustrates an embodiment where the density of turning features 820 is higher towards the middle or center of the turning film 801 than near the edges of the turning film 801. The quantity and pattern of turning features 820 can affect the total illumination efficiency of a display device and/or the uniformity of light extraction across a display device. An illumination efficiency of a display device can be determined, for example, by comparing the amount of light provided by a light source with the amount of light reflected from the reflective display 807. Additionally, the quantity and pattern of turning features 820 on a given turning film 801 may depend upon the size and/or shape of the turning features. In some embodiments, the turning features 820 comprise between about 2% and 10% of the total top surface area of a turning film 801 and/or light guide 803. In one embodiment, the turning features 820 comprise about 5% of the total top surface area of a turning film 801. In some embodiments, turning features 820 are disposed about 100 microns from one another on a turning film 801. In some embodiments, each turning feature 820 on a turning film 801 can be substantially the same size and shape. In other embodiments, the turning features 820 on a turning film 801 may vary in size and/or shape. In some embodiments, a turning film 801 comprises a plurality of turning features 820 each having a generally different cross-sectional shape. In some embodiments, a turning film 801 comprises a plurality of turning features 820 each having a generally similar cross-sectional shape. In some embodiments, a turning film 801 comprises a first group of turning features 820 each having a generally similar cross-sectional shape and a second group of turning features 820 each having a generally similar cross-sectional shape wherein the first group of features 820 are differently shaped than the second group of turning features. In some embodiments, a turning feature 820 may have a generally polygonal cross-sectional shape, for example, square, rectangular, trapezoidal, triangular, hexagonal, octagonal, or some other polygonal shape. In other embodiments, a turning feature 820 may have a generally curvilinear cross-sectional shape. In some embodiments, a turning feature 820 has an irregular cross-sectional shape. The cross-sectional shape of a turning feature 820 may be symmetric or asymmetric. In some embodiments, the shape formed by the surface of a turning feature may resemble a cone, a frustum of a cone, a pyramid, a frustum of a pyramid, a prism, a polyhedron, or another three-dimensional shape. The shape of the turning features 820 viewed from the top may vary. In some embodiments, the shape of the turning features 820 viewed from the top may be polygonal, curvilinear, irregular, generally polygonal, generally curvilinear, square, triangular, rectangular, circular, round, or another shape.

As shown in FIG. 9C, the turning features 820 in a turning film 801 (or in a light guide) can be configured to vary in depth and width. In one embodiment, turning features 820 on a turning film 801 each have a similar depth measured from the top of the turning film 801 to the bottom of the turning features 820. In other embodiments, a turning film 801 comprises a plurality of turning features 820 which may be of different depths. Similarly, the volume of each turning feature 820 can vary from turning film 801 to turning film 801 or from turning feature 820 to turning feature 820 on a common turning film. In some embodiments, the volume, depth, or width of turning features 820 on a given turning film 801 may vary depending on the distance from the turning feature to the light source. For example, in some embodiments, the number of turning features 820 increases from the light input edge of the turning film 801 towards the center of the turning film 801 to facilitate uniform light extraction. In some embodiments, the width of each turning feature 820 is between about one micron and about six microns. In some embodiment, the width of each turning feature 820 is about two microns. The size and shape of each turning feature 820 can be varied by using different patterns, etching agents, process recipes, and/or different lithography and deposition conditions of the turning film 801 and/or light guide 803. In one embodiment, a first set of turning features 820 may be formed using a first timed etch and a differently shaped and/or sized set of turning features 820 may be formed using a second timed etch.

FIG. 9D illustrates additional examples of turning features 820a, 820b which are rotationally symmetrical. The turning features 820a, 820b may comprise indentations in the material comprising the light guide and/or turning film. As illustrated, in some embodiments, feature 820b may take on a conical shape having an apex. In other embodiments, the cone may be truncated, removing the apex and creating a frustoconical shape, so as to create the structure 820a. 820a' shows a cross-sectional view of one exemplary implementation of the feature 820a. Example dimensions of 15 µm of width and 3.5 µm of depth are indicated in the cross-sectional view shown in FIG. 9D, but other sizes and shapes are also possible. A wide variety of other alternative configurations are also possible. FIG. 10 shows an embodiment comprising a plurality of variously-shaped turning features 820. For example, components (e.g., layers) may be added, removed, or rearranged. Also, although the terms film and layers have been used herein, such terms as used herein include film stacks and multilayered structures. Such film stacks and multilayered structures can be adhered to other structures using adhesive, or can be formed on other structures using deposition or in other manners.

Figure 11:
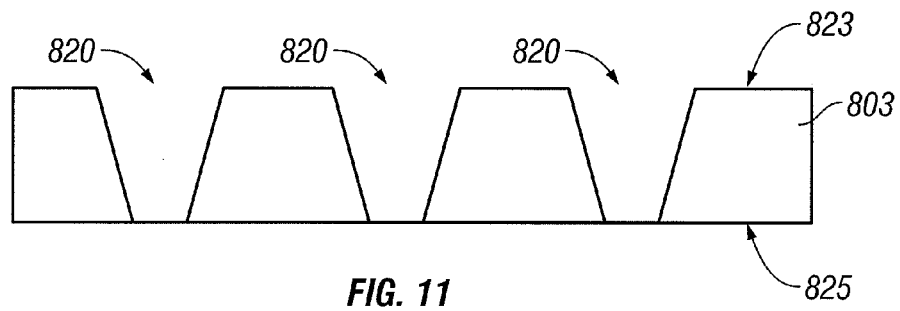
FIG. 11 is a cross-section of an embodiment of an illumination device including a substrate with light turning features.
Figure 12:
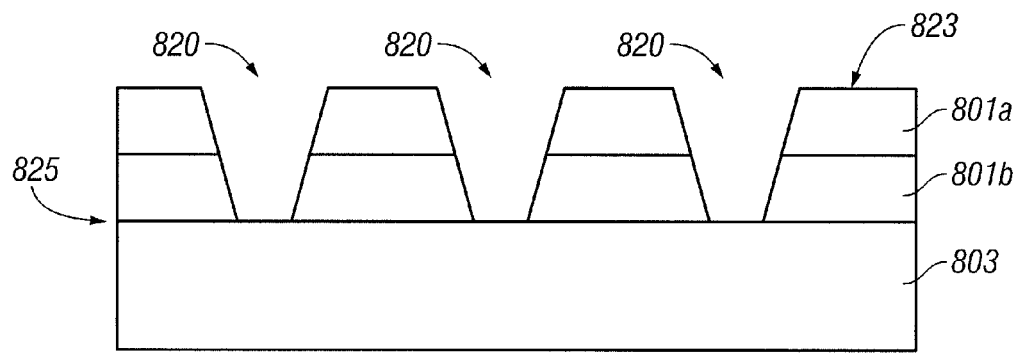
FIG. 12 is a cross-section of an embodiment of an illumination device having two turning films.

FIGS. 11 and 12 illustrate cross-sectional views of a light guide 803 (FIG. 11) and a turning film 801 (FIG. 12) that include one or more light turning features 820. In some embodiments, the light turning features 820 include one or more edges that extend from a top side or surface 823 to a bottom side or surface 825 of the turning film 801 or light guide 803. Such a configuration can also be referred to as "running through" the turning film 801 and/or light guide 803. For example, in FIG. 11, light turning features 820 are shown running through a light guide 803. The light turning features 820 may have similar cross-sectional shapes or different cross-sectional shapes. The light turning features 820 may be formed using different etching agents and techniques, for example, timed etching. In some embodiments, the light turning features 820 may be formed by standard wet or dry etching processes. In certain embodiments, the light turning features 820 may be formed by sand blast processes.

In FIG. 12, light turning features 820 are shown running through a turning film that includes two layers 801a, 801b. The two turning film layers 801a, 801b are disposed on light guide 803, but the turning features 820 do not extend into the light guide 803 from the turning film layers 801a, 801b. In some embodiments, the turning features 820 may be formed through a single or multilayer turning film 801 into a light guide 803. In one embodiment, turning features 820 can may be formed through a single or multilayer turning film 801 and extend through a single or multilayer light guide 803.

Figure 13:
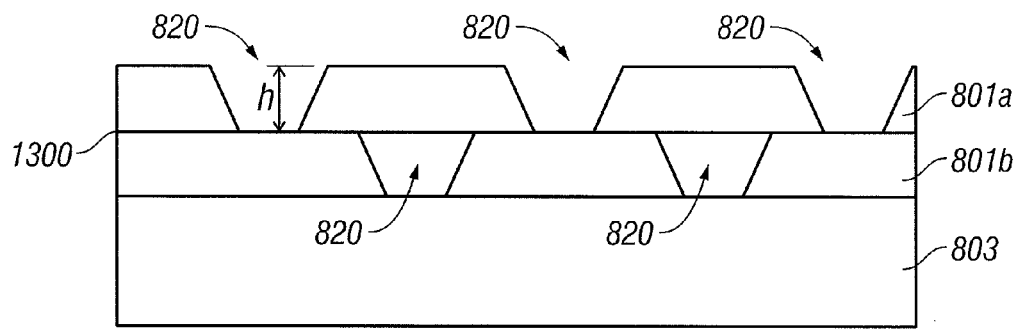
FIG. 13 is a cross-section of an embodiment of an illumination device having two turning films, each turning film having light turning features, where at least some of the light turning features in each turning film are disposed vertically offset from those in the other turning film.

In some embodiments, a turning film may include a plurality of layers 801a, 801b each including turning one or more turning features 820. Referring to FIG. 13, a turning film includes a first layer 801a and a second layer 801b. The first layer 801a is disposed on the second layer 801b such that the second layer 801b is disposed between the light guide 803 and the first layer 801a. The first layer 801a and the second layer 801b may each include separate turning features 820. The turning features 820 may be offset from one another (e.g., laterally offset relative to the length or width of the film turning layers) such that a turning feature 820 in the first layer 801a is not disposed directly above another turning feature 820 in the second layer 801b. In other embodiments, the turning features 820 in the first layer 801a may overlap one or more turning features 820 in the second layer 801b. In some embodiments, the turning features 820 in the first layer 801a have a height "h" (FIG. 13) such that the turning features run through the first layer but do not extend into the second layer 801b. Similarly, the turning features 820 in the second layer 801b may run through the second layer but do not extend into the first layer 801a. In other embodiments, one or more turning features 820 may be disposed in both the first layer 801a and the second layer 801b as illustrated in FIG. 12. In some embodiments, the turning features 820 vary in shape, size, pattern, quantity, and/or volume from layer to layer or within a single layer. For example, in one embodiment, the turning features 820 in a first layer 801a are each substantially the same size but vary in cross-sectional shape and the turning features 820 in a second layer 801b are each differently sized and differently shaped from one another and the turning features 820 in the first layer 801a.

Figure 14:
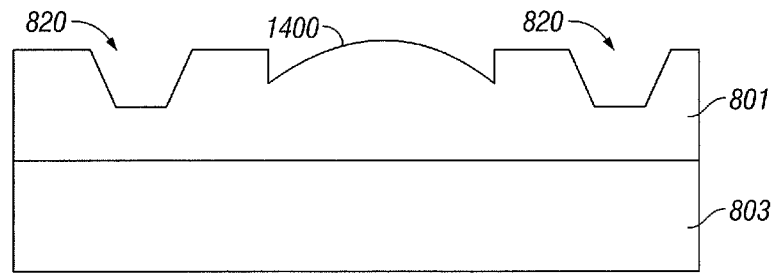
FIG. 14 is a cross-section of an embodiment of an illumination device having light turning features configured in the shape of a truncated cone and a lens.

In some embodiments, a turning film 801 and/or light guide 803 can include additional features in addition to turning features 820. FIG. 14 illustrates a turning film 801 that includes a plurality of turning features 820 having a first configuration. The turning film 801 includes an additional optical device, edge 1400, which may be configured in different shapes and sizes to optimize performance and provide multiple operational advantages. One or more of edges 1400 may be included in addition to turning features 820. The structure of additional edges 1400 can vary depending upon application. In some embodiments, edge 1400 is configured as a Fresnel lens. In some embodiments, an additional edge includes a micro lens.

Figure 15:
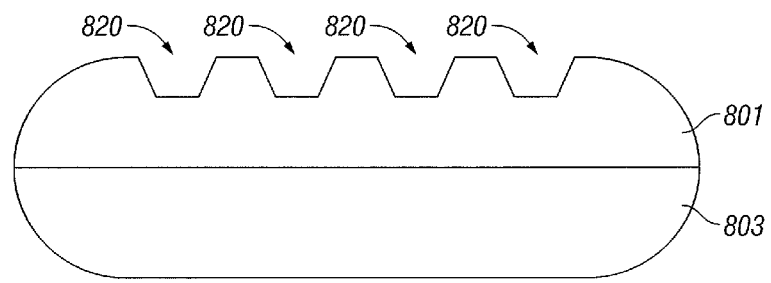
FIG. 15 is a cross-section of an embodiment of another illumination device illustrating a turning film and a light guide with curved edges.

In some embodiments, the shape of one or more edges or sides of the light guide 803 and/or turning film 801 can be configured to affect the introduction of light from a light source into the turning film 801 and/or light guide 803. FIG. 15 illustrates an embodiment of a light guide 803 and a turning film 801 where the two layers have beveled or curved edges that are not perpendicular to the faces of the light guide 803 or turning film 801. In some embodiments, such beveled or curved sides or edges of the turning film 801 and/or light guide 803 may be employed to reduce or eliminate bright spots near the edges where light is introduced by a light source, and to increase the uniformity of light extraction across the display. Similarly, in some embodiments, providing unpolished edges or sides on the light guide 803 and/or turning film 801 can serve to eliminate bright spots of light extraction by acting as a diffuser and reflector. In some embodiments, such beveled edges can be covered by a reflector when appropriate to recycle light propagating within the turning film 801 and/or light guide 803.

Figure 16:
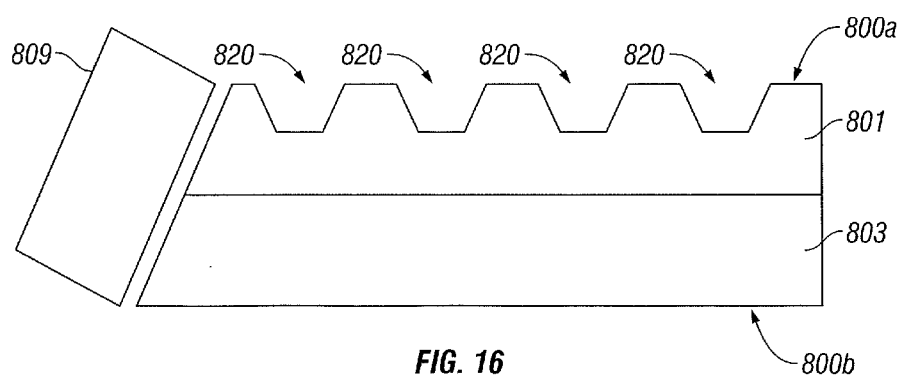
FIG. 16 is a cross-section of an illumination device illustrating an embodiment that includes a light source providing light through an angled edge of a turning film and/or a light guide.

Turning now to FIG. 16, in some embodiments, one or more edges or surfaces of the light guide 803 and/or turning film 801 may be angled relative to the first side 800a and/or second side 800b of the display device. In some embodiments, the edges of the turning film 801 and the light guide 803 may be disposed at an angle of about 45° relative to the first side 800a and second side 800b. In other embodiments, the edges of the turning film 801 and the light guide 803 may be disposed at an angle of between about 0° and about 90° relative to the first side 800a and second side 800b. In some embodiments, a light source 809 may be configured to introduce light at an angle about normal to the angled edges of the turning film 801 and the light guide 803 in order to increase the efficiency of the display device. In some embodiments, when light is introduced into the light guide 803 and/or turning film 801 at an angle, the light propagates within the light guide 803 and turning film 801 at shallow angles and more light is turned by the light turning features 820.

As discussed above, in some embodiments, turning features may turn light at the air/turning feature interface via TIR and direct the light towards one or more directions (e.g., towards a reflective display). For any of the embodiments described herein, a turning feature may include a reflective coating configured to provide desirable optical characteristics. The coating can include one or more layers. One of the layers may be an additional coating configured to increase the reflectivity of a turning feature. The reflective coating may be metallic. In some embodiments, some of the plurality of turning features may include a reflective coating and others may not. In certain embodiments, a portion (or portions) of a turning feature may be covered with a reflective coating and another portion (or portions) of the turning feature may not be covered with a reflective coating. Using a reflective coating can improve the efficiency of a display device because the reflective coatings can be configured to reflect substantially all of the light that encounters the coatings and redirect that light toward the display. Additionally, in some applications, it may be desirable to add or build additional layers or features on top of one or more turning features. In some embodiments, one or more cover layers, for example, anti-glare layers, anti-reflection layers, anti-scratch layers, anti-smudge layers, diffuser layers, color filtering layers, lenses, or other layers, may be added on top of one or more turning features. In some embodiments, conductive electrode plates may be added on top of a turning film including turning features. In one embodiment, a touch sensor may be added over one or more turning features. In embodiments where turning features rely solely on the air/feature interface to turn light, having additional layers on the turning features may complicate the desired optical functionality because adhesives or laminates may cover or partially cover one or more turning features and affect TIR characteristics of the light turning feature. However, when reflective coatings are disposed over turning features, one or more additional layers can be added over the turning features without affecting the light turning properties of the turning features because they no longer rely on the TIR properties of a material-air interface.

Using reflective coatings on turning features can diminish the contrast of the display if no additional coatings are disposed between the reflective coatings and a viewer. Accordingly, additional layers may be deposited over the reflective coating to prevent reflection of light from the reflective coating towards a viewer. In one embodiment, additional layers may be deposited over the reflective coating to form a static interferometric stack that appears dark or black to a viewer in order to improve the contrast of the display device while reflecting light incident on the reflective coating side of the stack towards a reflective display. In some embodiments, a static interferometric stack may include a reflector layer deposited on the turning film or light guide, an absorber layer, and an optical resonant cavity defined by the reflector layer and the absorber layer. In some embodiments, the reflector layer is a partial reflector. In some embodiments, reflective coatings are covered by one or more dark or black coatings to form a black mask which prevents reflection of light towards a viewer from the reflective coating.

FIG. 17A illustrates a turning film 801 that includes turning features 820 (note: FIG. 17A and the other figures herein are not drawn to scale). An interferometric stack 1707 is formed over portions of certain surfaces of each turning feature 820. An interferometric stack 1707 includes a reflective layer 1705 disposed on one or more portions of the turning feature 820 surface. The interferometric stack 1707 also includes an optically resonant layer 1703 formed on top of the reflective layer 1705, and an absorber layer 1701 disposed over the optically resonant layer 1703. The interferometric stacks 1707 can be configured to interferometrically reflect selected wavelengths of light. This reflected light is incident on the absorber layer 1701. The absorber layer 1701 and the interferometric stacks 1707 are configured such that the absorber layer 1701 absorbs light of the reflected wavelength such that the stack 1707 appears black or dark, which can increase the contrast of the display. In the embodiment illustrated in FIG. 17A, the reflective layer 1705 is formed on the tapered sidewalls 831 of each turning feature 820 but not the bottom 833. In some embodiments, the reflective layer 1705 may be formed on portions of the tapered sidewalls 831 and/or certain lower portions or the bottoms 833.

In some embodiments, the reflector layer 1705 includes a single layer and in other embodiments the reflector layer 1705 includes multiple layers of material. In various embodiments, the thicknesses of the absorber 1701 and reflective layers 1705 may be selected to control relative amounts of reflectance and transmittance of light. In some embodiments, both the absorber 1701 and reflective 1705 layers may comprise metal, and both can be configured to be partially transmissive. According to certain embodiments, the amount of light substantially reflected or transmitted through the reflective layer 1705 can be affected by varying the thickness and the composition of the reflective layer 1705, whereas the apparent color of reflection is largely determined by the interference effect governed by the size or thickness of the optically resonant layer 1703 and the material properties of the absorber layer 1701 that determine the difference in optical path length. In some embodiments, modulating the bottom reflective layer 1705 thickness can modulate the intensity of the reflected color versus the overall reflectivity of the interferometric stack 1707.

In some embodiments, the optically resonant layer 1703 is defined by a solid layer, for example, an optically transparent dielectric layer, or plurality of layers. In other embodiments, the optically transparent layer 1703 is defined by an air gap or combination of optically transparent solid material layer(s) and an air gap. In some embodiments, the thickness of the optically resonant layer 1704 may be selected to maximize or minimize the reflection of one or more specific colors of the light incident on the absorber 1701 side of the stack 1707. In various embodiments, the color or colors reflected by the optically resonant layer 1703 may be changed by changing the thickness of the layer.

The absorber layer 1701 can comprise various materials, for example, molybdenum (Mo), titanium (Ti), tungsten (W), chromium (Cr), etc., as well as alloys, for example, MoCr. The absorber 1701 can be between about 20 and about 300 Å thick. In one embodiment, the absorber 1701 is about 80 Å thick. The reflective layer 1705 may, for example, comprise a metal layer, for example, aluminum (Al), nickel (Ni), silver (Ag), molybdenum (Mo), gold (Au), and chromium (Cr). The reflective layer 1701 can be between about 100 Å and about 700 Å thick. In one embodiment, the reflective layer 1701 is about 300 Å thick. The optically resonant layer 1703 can comprise various optically resonant materials, for example, air, silicon oxy-nitride ($SiO_xN$), silicon dioxide ($SiO_2$), aluminum oxide ($Al_2O_3$), titanium dioxide ($TiO_2$), magnesium fluoride ($MgF_2$), chromium (III) oxide ($Cr_3O_2$), silicon nitride ($Si_3N_4$), transparent conductive oxides (TCOs), indium tin oxide (ITO), and zinc oxide (ZnO). In some embodiments, any dielectric with an index of refraction (n) between 1 and 3 can be used to form a suitable spacer layer. In some embodiments, the optically resonant layer 1703 is between about 500 Å and about 1500 Å thick. In one embodiment, the optically resonant layer 1703 is about 800 Å thick.

An interferometric stack 1707 as shown in FIG. 17 can be configured to selectively produce a desired reflection output using optical interference. As discussed above, in some embodiments, this reflected output may be "modulated" by selection of the thickness and optical properties of the layers that form the stack 1707. The color observed by a viewer viewing the absorber layer 1701 side of the stack will correspond to the frequencies which are substantially reflected out of the interferometric stack 1707 and which are not substantially absorbed or destructively interfered by one or more layers in the stack 1707. As shown in FIG. 17B, the interferometric stacks 1707 depicted in FIG. 17A can be configured to appear dark or black to a viewer viewing the absorber layer 1701 side of the turning film 801. In some embodiments, configuring the coated portions of the turning features 820 to appear dark or black improves the contrast of the display device while providing other benefits discussed above (e.g., improved light turning functionality and easily building layers on top of the turning features 820 without disrupting the turning functionality). Additionally, selectively coating only portions of the turning features 820, for example, the sidewalls, with interferometric stack layers can limit the total area of the turning film 801 that appears dark to a viewer due to interferometric disruption.

Figure 18:
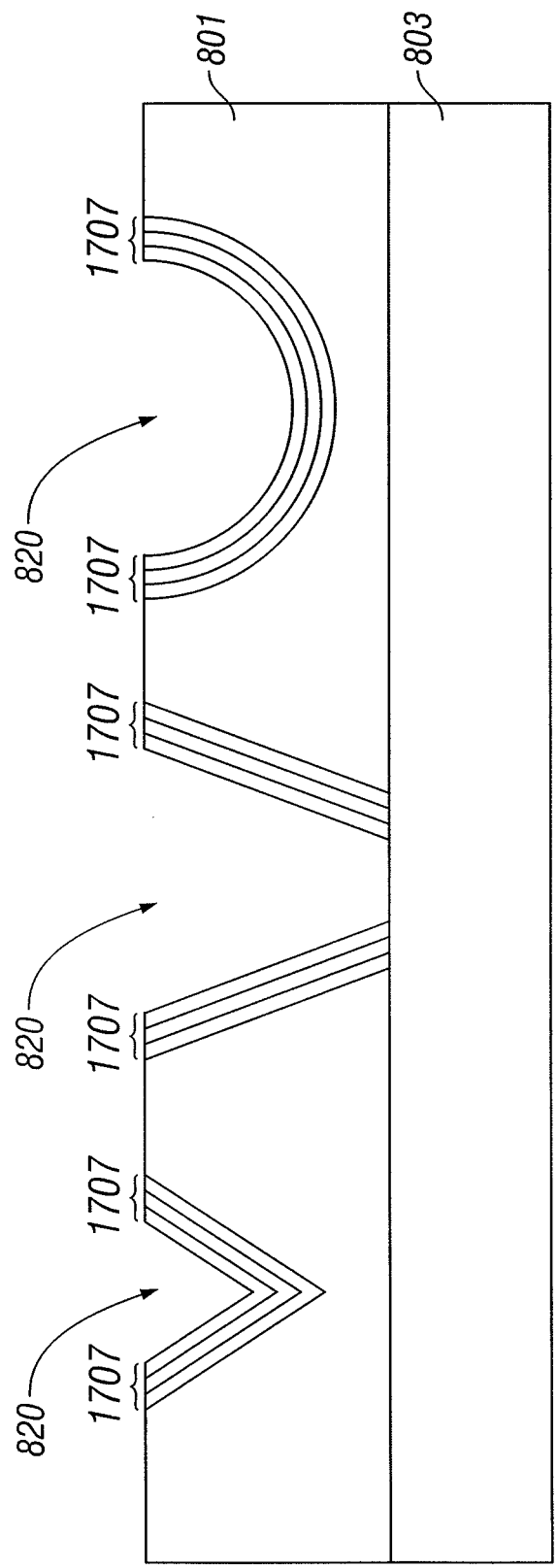
FIG. 18 is a cross-section of an embodiment of an illumination device illustrating several examples of light turning features with multi-coated edges.

Turning now to FIG. 18, an embodiment of a turning film 801 is depicted including various turning features 820. Each turning feature 820 differs in size and cross-sectional shape. Additionally, each turning feature includes an interferometric stack 1707 covering at least a portion of the turning feature 820 surface. As discussed above, turning features 820 that include interferometric stacks 1707 can vary in size, shape, quantity, and pattern depending on the application. For example, in some embodiments, some turning features 820 on a turning film 801 can be covered at least partially by an interferometric stack 1707 and other turning features 820 on the film 801 may not be covered by an interferometric stack. In other embodiments, each turning feature 820 can vary in shape and/or size but each turning feature 820 may be covered at least partially by an interferometric stack 1707. In some embodiments, each turning feature 820 can be covered at least partially by an interferometric stack 1707 but the coverage may vary from one turning feature 820 to another.

Figure 19A:
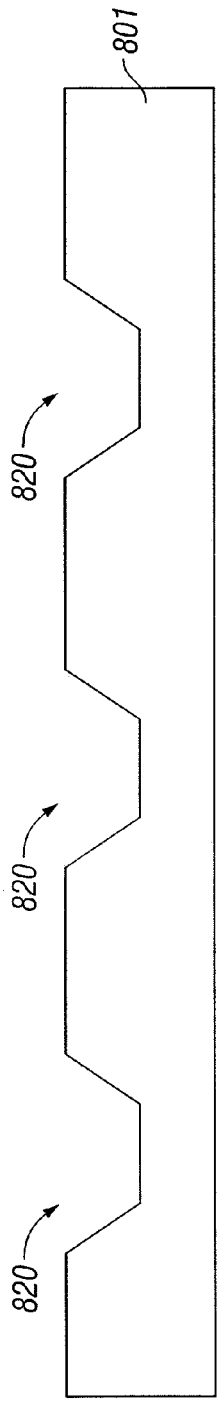
FIG. 19A is a cross-section of a turning film during a step of one example of a process for forming interferometric stacks on a light turning feature.
Figure 19B:
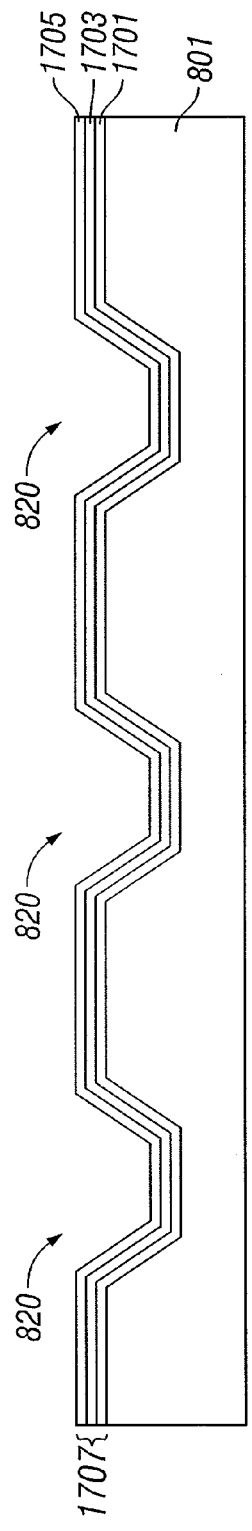
FIG. 19B is a cross-section of the turning film of FIG. 19A in an intermediate process step.
Figure 19C:
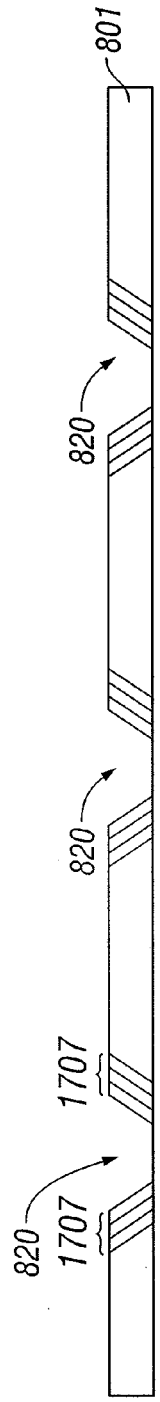
FIG. 19C is a cross-section of an embodiment of the turning film of FIG. 19C resulting from further processing.

Turning now to FIGS. 19A-19C, one method of forming interferometric stacks 1707 over turning features 820 is depicted in three steps. FIG. 19A shows an embodiment of a turning film 801 including turning features 820 formed thereon. The turning features 820 may be etched, molded, machined, or otherwise formed in or on the turning layer 801 using known methods. In some embodiments, the turning film 801 can include multiple layers. In one embodiment, the turning features 820 are formed directly on a light guide or on a turning film 801 that comprises a light guide. FIG. 19B shows an embodiment of a turning film 801 with an interferometric stack 1707 deposited on the turning feature 820 side of the turning film 801. As discussed above, the interferometric stack 1707 may contain a plurality of layers configured to produce a desired reflection output using optical interference. In one embodiment, the interferometric stack includes a reflective layer 1701 deposited on the turning feature 820 side of the turning film 801, an optically resonant layer 1703 deposited on the reflective layer 1701, and an absorber layer 1707 deposited on the optically resonant cavity layer.

Methods of depositing the layers of an interferometric stack 1707 are known to those of skill in the art and include, for example, physical vapor deposition, chemical vapor deposition, electro-chemical vapor deposition, plasma-enhanced chemical vapor deposition, and/or other deposition techniques. As shown in FIG. 19B, a single interferometric stack 1707 covers the entire turning feature 820 surface of the turning film 801. In some embodiments, the interferometric stack 1707 is configured to appear dark or black to a viewer and thus, the entire turning film 801 shown in FIG. 19B would appear dark or black to viewer looking at the turning feature side of the turning film. In some embodiments, it is important to limit the coverage of the interferometric stack 1707 to one or more portions of the turning film 801 surface. In one embodiment, one or more interferometric stacks 1707 are disposed near or over only the turning features 820. The turning film 801 in FIG. 19B can be processed further to limit the coverage of the interferometric stack 1707.

FIG. 19C shows an embodiment of the turning film 801 depicted in FIGS. 19A and 19B with interferometric stacks 1707 disposed only over portions of the turning features 820. In some embodiments, the turning film 801 depicted in FIG. 19C can be formed by polishing the turning feature side of the turning film 801 depicted in FIG. 19B and thinning the opposite side. The turning feature side of the turning film 801 may be polished until the interferometric stack 1707 is removed from surfaces other than the turning features 820. Similarly, the opposite side of the turning film 801 may be optionally thinned until the interferometric stack 1707 is removed from a portion of the turning features 820, for example, a bottom portion. In one embodiment, the turning film 801 depicted in FIG. 19B may be polished and/or thinned such that the interferometric stack 1707 is divided into separate interferometric stacks that cover only a portion or portions of the turning features 820 resulting in a turning film 801 similar to the turning film schematically depicted in FIG. 19C.

Figure 19D:
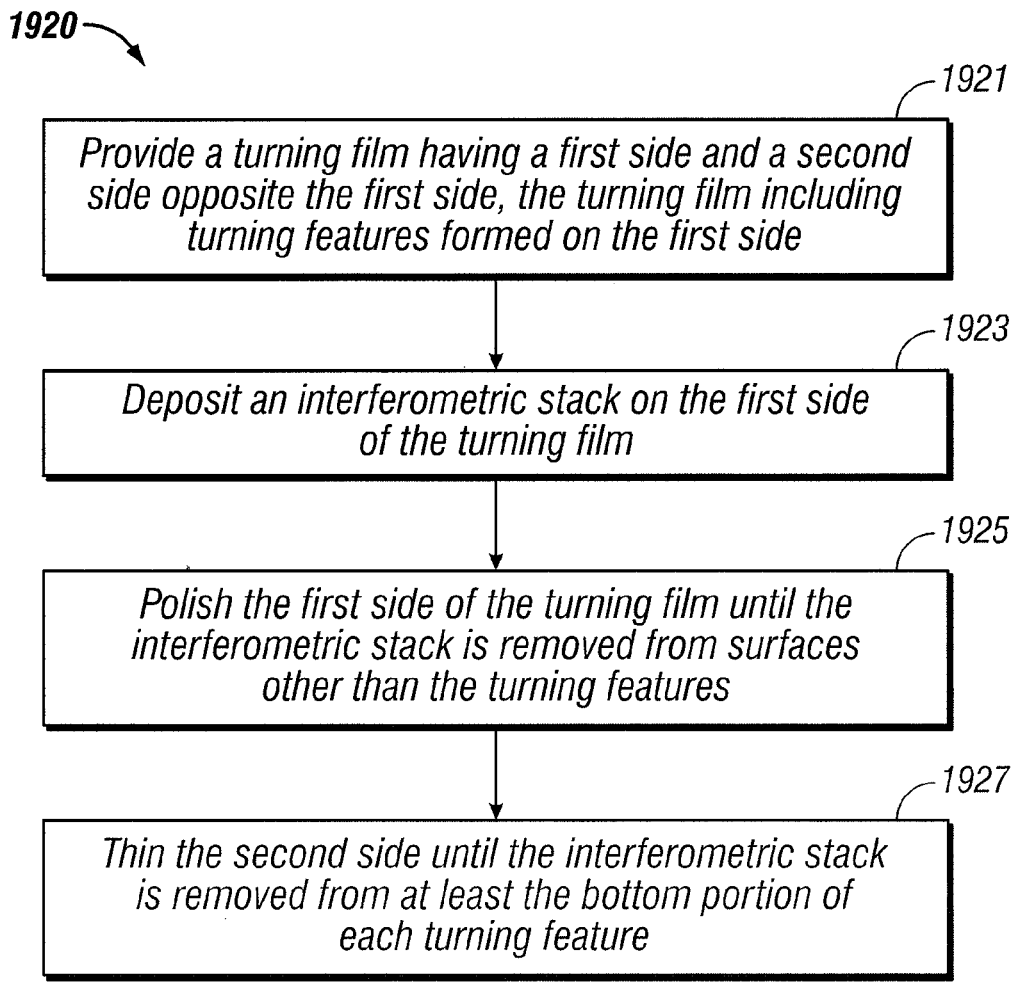
FIG. 19D is a block diagram schematically illustrating one embodiment of a method of making the turning film of FIG. 19C.

FIG. 19D is a block diagram depicting a method 1920 of manufacturing the turning film shown in FIG. 19C, according to one embodiment. Method 1920 includes providing a turning film having a first side and a second side opposite the first side, the turning film including turning features formed on the first side as illustrated in block 1921, depositing an interferometric stack on the first side of the turning film as illustrated in block 1923, polishing the first side of the turning film until the interferometric stack is removed from surfaces other than the turning features as illustrated in block 1925, and thinning the second side until the interferometric stack is removed from at least the bottom portion of each turning features as illustrated in block 1927.

Figure 20E:
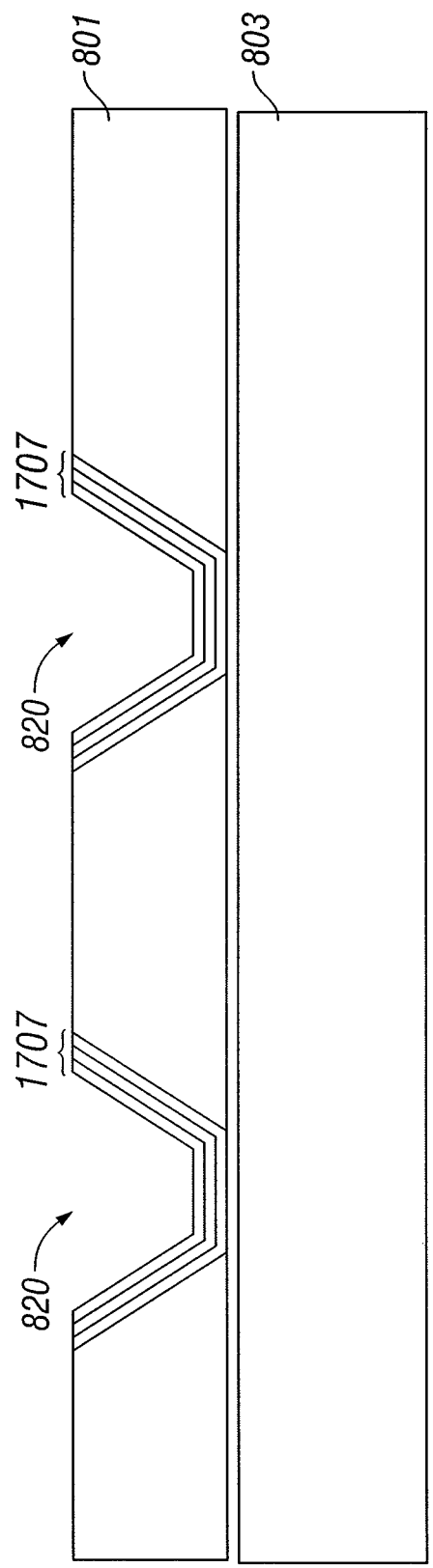

FIGS. 20A-20E illustrate an embodiment of another method of forming interferometric stacks 1707 over turning features 820. FIG. 20A shows an embodiment of a light guide 803 and a turning film 801 disposed on the light guide 803. In some embodiments, a dissolvable layer 2001, for example, a photoresist coating or layer, can be formed or deposited over the turning film 801 as shown in FIG. 20B. In some embodiments, a plurality of light turning features 820 can then be formed in the dissolvable layer 2001 and the turning film 801 as shown in FIG. 20C. According to certain embodiments, the turning features 820 can have varying shapes and sizes. In some embodiments, the turning features 820 are formed by etching or embossing. In some embodiments, the turning features 820 run through the turning film 801 to the light guide 803. In other embodiments, the turning features 820 are shallower and do not run through the turning film 801.

Turning now to FIG. 20D, an interferometric stack 1707 is formed over the dissolvable layer 2001, the exposed portions of the turning film 801, and the exposed portions of the light guide 803 shown in FIG. 20C, such that the interferometric stack 1707 covers the turning feature 820 side of the light guide 803 and turning film 801 stack. According to some embodiments, the interferometric stack 1707 includes an aluminum layer, a silicon dioxide layer, and a molybdenum-chromium alloy. In some embodiments, portions of the deposited interferometric stack 1707 are removed from the turning feature side of the turning film 801 by stripping or dissolving the dissolvable layer 2001. FIG. 20E shows an embodiment of the light guide 803 and turning film 801 depicted in FIG. 20D with the portions of the interferometric stack 1707 removed from portions of the turning film 801. In some embodiments, the turning film 801 and light guide 803 shown in FIG. 20E can be used to efficiently turn light towards a reflective display while still allowing a viewer to see the reflection from the display through the two layers. In some embodiments, additional layers, for example, a cover, can be added to the turning film 801 with adhesives or by lamination without sacrificing the light turning performance of the light turning features 820.

Figure 20F:
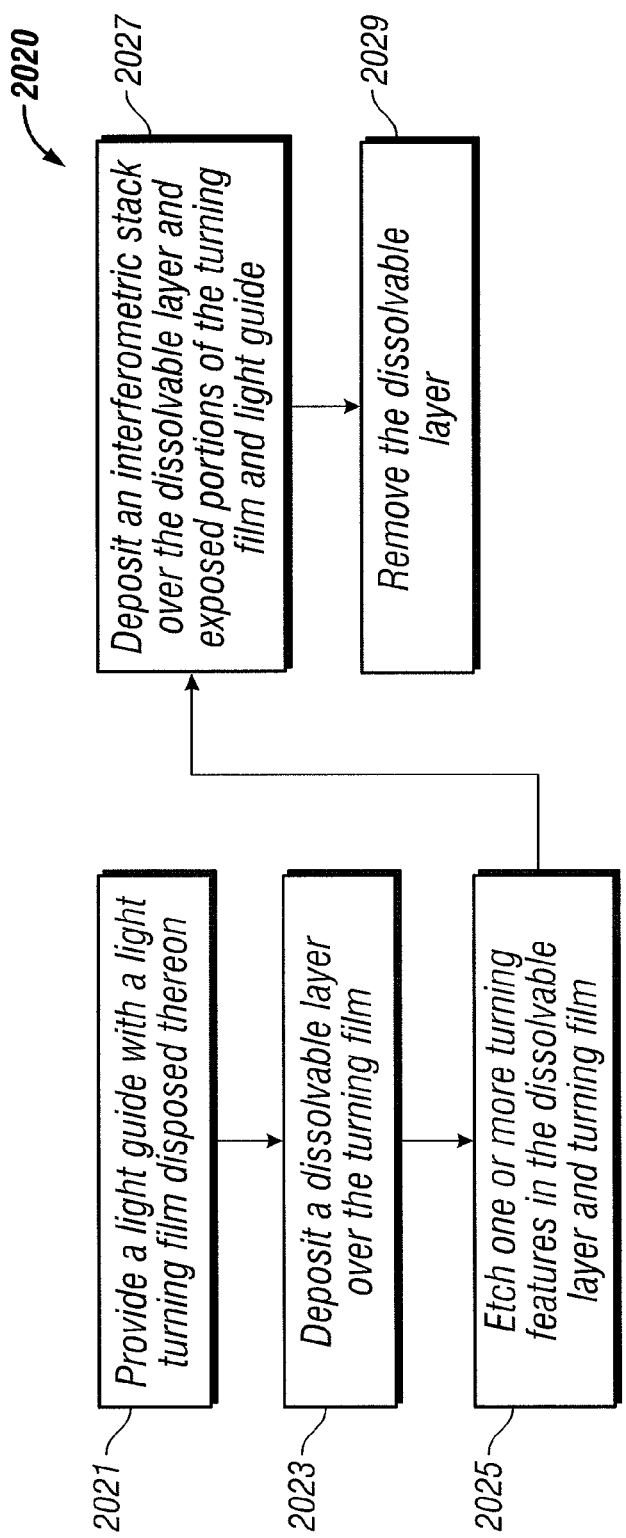
FIG. 20F is a block diagram schematically illustrating one embodiment of a method of making the illumination device of FIG. 20E.

FIG. 20F is a block diagram depicting a method 2020 of manufacturing the illumination device shown in FIG. 20E, according to one embodiment. Method 2020 includes the steps of providing a light guide with a light turning film disposed thereon as illustrated in block 2021, depositing a dissolvable layer over the turning film as illustrated in block 2023, etching one or more turning features in the dissolvable layer and turning film as illustrated in block 2025, depositing an interferometric stack over the dissolvable layer and exposed portions of the turning film and light guide as illustrated in block 2027, and removing the dissolvable layer as illustrated in block 2029.

FIGS. 21A-21H illustrate an embodiment of a method of forming interferometric stacks 1707 over different portions of turning features 820. As shown in FIGS. 20A-20C, according to one embodiment, the process begins by providing a light guide 803, depositing a turning film 801 onto the light guide 803, and then depositing a dissolvable layer 2001 over certain portions of the turning film 801. In some embodiments, the light guide 803 and the turning film can comprise any optically transparent material. In one embodiment, the dissolvable layer 2001 comprises a light-sensitive material, for example, a photoresist. In some embodiments, a dissolvable layer 2001a is deposited across an entire side or surface of the turning film 801 and then portions of the photoresist layer are removed by etching. According to certain embodiments, the dissolvable layer 2001a is selectively deposited on portions of the turning film 801.

Figure 21A:
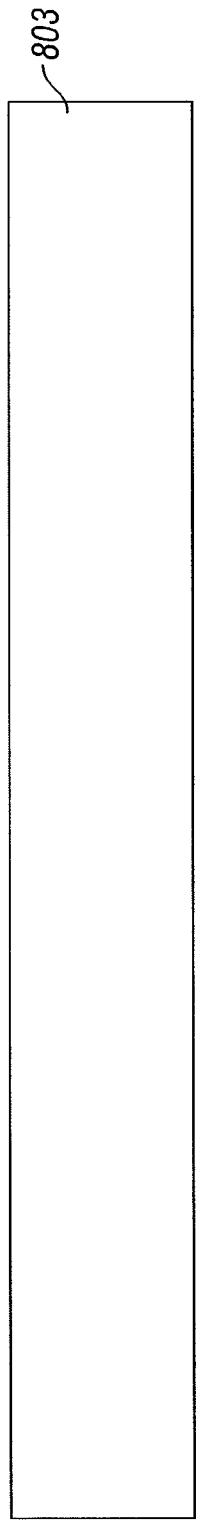
FIGS. 21A-21H are schematic cross-sectional views illustrating steps in a process of manufacturing an illumination device.
Figure 21B:
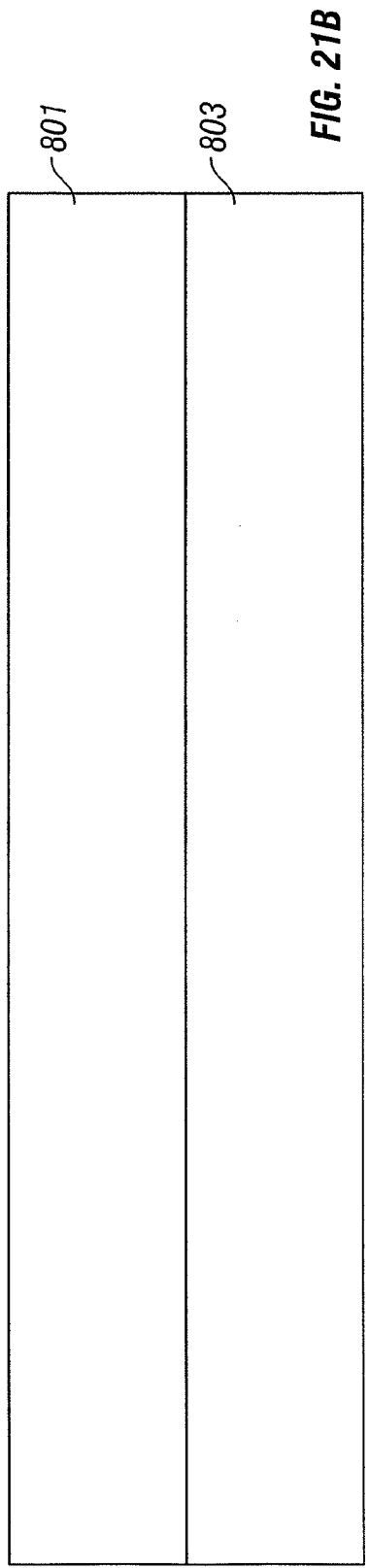
Figure 21C:
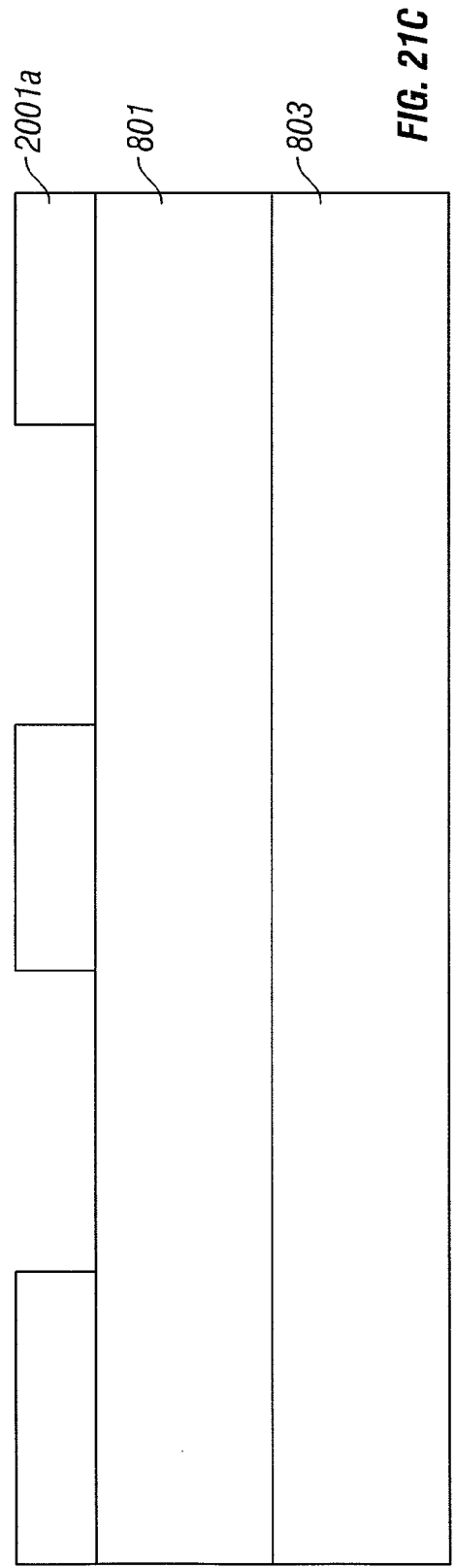
Figure 21D:
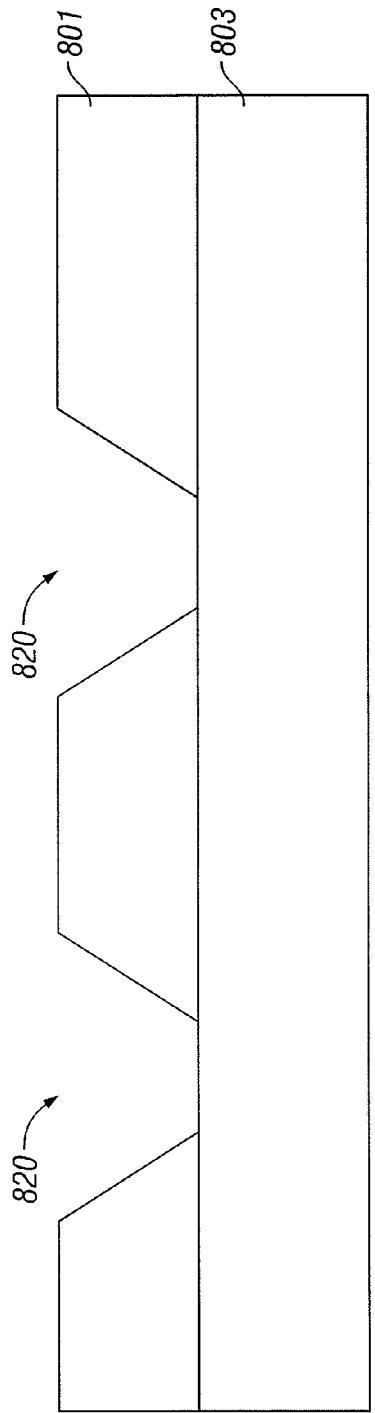
Figure 21E:
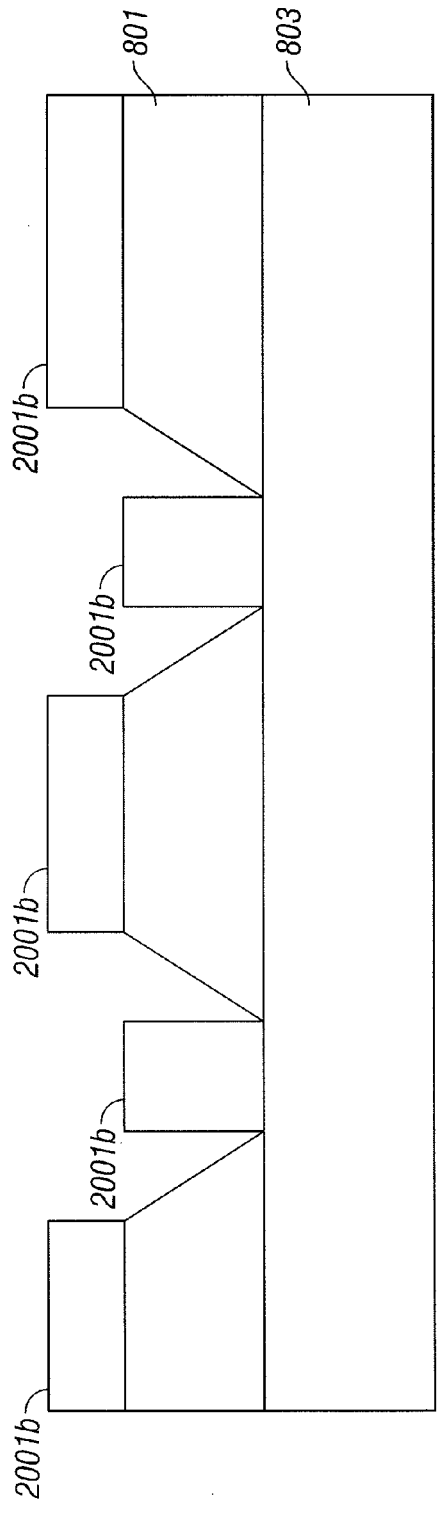

Turning now to FIG. 21D-21E, in some embodiments, turning features 820 may be formed in the turning film 801 in portions of the turning film 801 that are not covered by the dissolvable layer 2001a. In certain embodiments, the turning features 820 are formed by various etching processes including dry etch processes and/or wet etch processes. As discussed above, the turning features 820 can vary at least in size, shape, quantity, and/or pattern. In some embodiments, after the turning features 820 are formed in the turning film 801, the dissolvable layer 2001a is stripped or dissolved and another dissolvable layer 2001b is added to certain portions of the turning film 801 and/or the light guide 803. In some embodiments, the dissolvable layer 2001b may be a photoresist layer that is patterned over certain portions of the turning film 801 and the light guide 803 by a spin-coat, expose, and develop process. In some embodiments, a photoresist layer can be deposited using known methods to leave a resist pattern that serves as a physical mask to cover surfaces that are desired to be protected from subsequent etching, implantation, lift-off, and/or deposition steps. As shown in FIG. 21E, portions of the turning features 820 are exposed and other portions of the turning features 820, light guide 803, and turning film 801 are covered by the dissolvable layer 2001b.

Figure 21F:
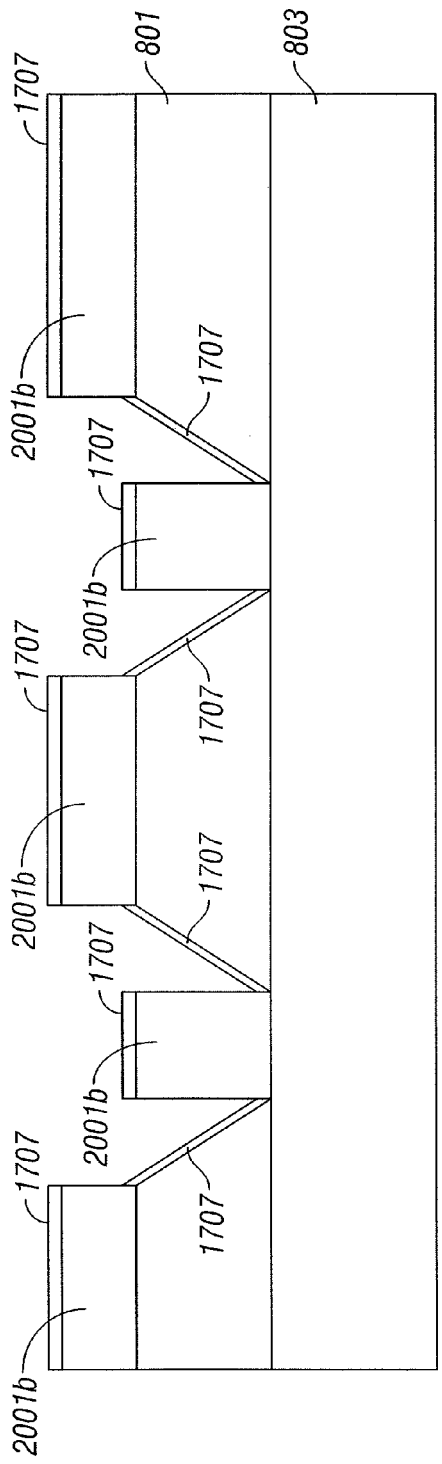
Figure 21G:
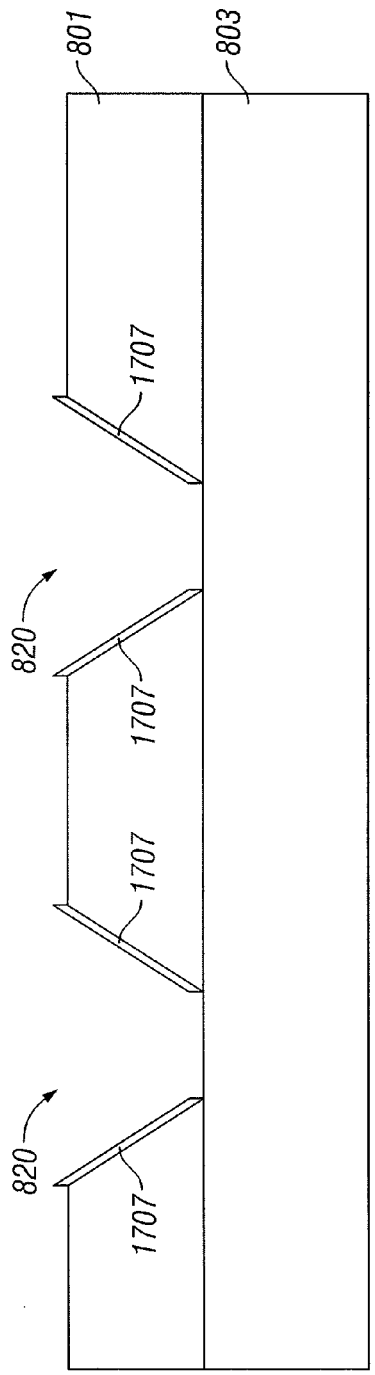
Figure 21H:
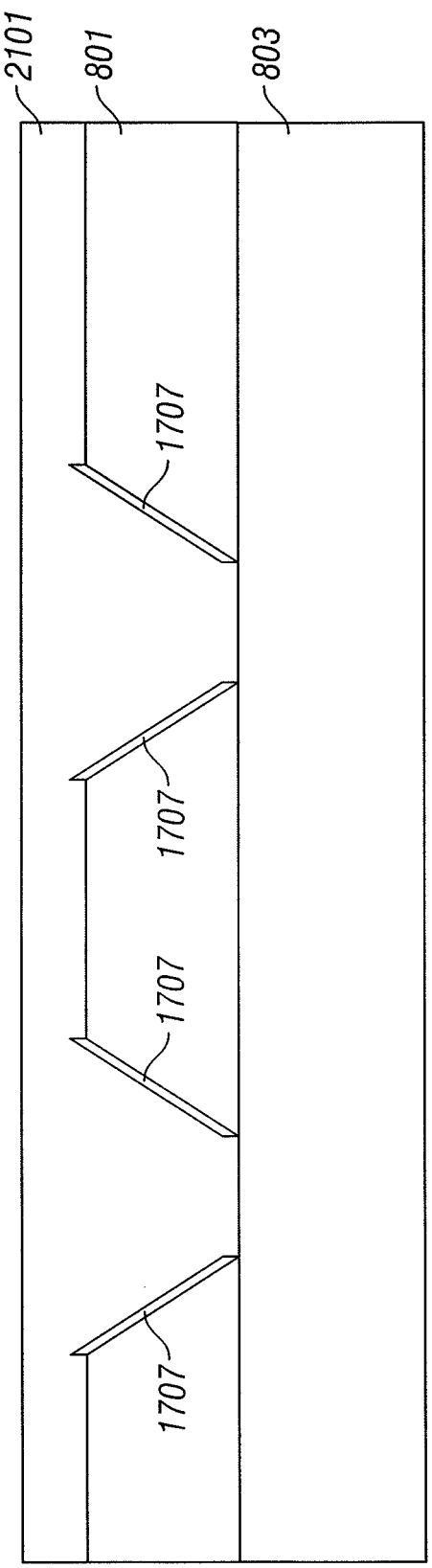
Figure 21I:
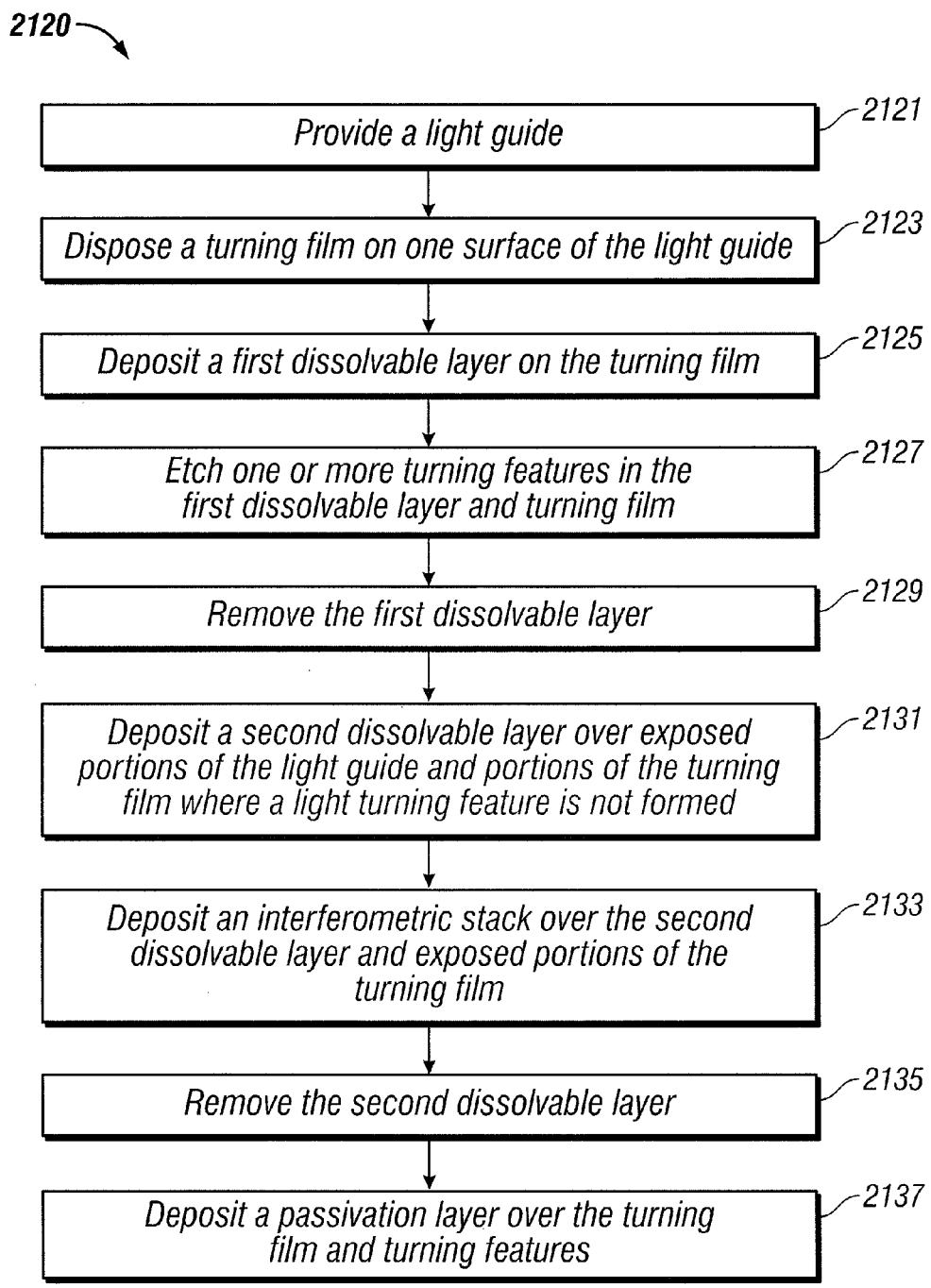
FIG. 21I is a block diagram schematically illustrating one embodiment of a method of making the illumination device of FIG. 21H.

As shown in FIGS. 21F-21H, in some embodiments, an interferometric stack 1707 can be deposited layer by layer over a dissolvable layer 2001b and the exposed portions of the turning film 801. In one embodiment, the interferometric stack 1707 includes a reflective layer, an optically resonant layer, and an absorber layer. In some embodiments, a reflective layer and black coating layer may be deposited over the dissolvable layer 2001b and the exposed portions of the turning film 801. In some embodiments, once the interferometric stack 1707 has been deposited, the dissolvable layer 2001b may be removed or lifted-off from the turning film 801 and the light guide 803. When the dissolvable layer 2001b is lifted-off, the layers deposited onto the dissolvable layer 2001b can also be removed. As shown in FIG. 21G, in some embodiments, interferometric stacks 1707 may remain over certain portions of turning features 1707 and/or the turning film 801 and light guide 803 after the dissolvable layer 2001 is removed. Limiting interferometric stack 1707 coverage to certain portions of the turning features 820 and/or turning film 801 can be used to balance contrast concerns with the light turning benefits provided by a reflective layer included as part of the interferometric stacks 1707. In some embodiments, interferometric stacks 1707 are deposited over the side-walls of the turning features 820 and are configured to appear as black or dark rings to a viewer. In other embodiments, interferometric stacks 1707 are deposited over the entire surfaces of the turning features 820 and appear as black or dark circles or dots to a viewer.

In some embodiments, a passivation layer 2101 can be added over a turning film 801 that includes interferometric stack 1707 coated turning features 820. FIG. 21H shows an embodiment where a passivation layer 2101 has been added over the embodiment shown in FIG. 21G. In some embodiments, the passivation layer 2101 can include silicon dioxide, silicon oxy-nitride, aluminum oxide, and/or any optically transparent material. In some embodiments, the passivation layer 2101 includes more than one layer. In some embodiments, the passivation layer 2101 includes an anti-glare layer, an anti-reflection layer, an anti-scratch layer, an anti-smudge layer, a diffuser layer, a color filtering layer, and/or a lens. In some embodiments, additional layers can be added over the passivation layer 2101. In some embodiments, the passivation layer 2101 can comprise an adhesive or material used to couple an additional layer (not shown) with the turning film 801.

FIG. 21J is a block diagram depicting a method 2120 of manufacturing the illumination device shown in FIG. 21H, according to one embodiment. Method 2120 includes the steps of providing a light guide at block 2121, disposing a turning film on one surface of the light guide at block 2123, depositing a first dissolvable layer on the turning film at block 2125, etching one or more turning features in the first dissolvable layer and turning film at block 2127, removing the first dissolvable layer at block 2129, depositing a second dissolvable layer over exposed portions of the light guide and portions of the turning film where a light turning feature is not formed at block 2131, depositing an interferometric stack over the second dissolvable layer and exposed portions of the turning film at block 2133, removing the second dissolvable layer at block 2135, and depositing a passivation layer over the turning film and turning features at block 2137.

Figure 22B:
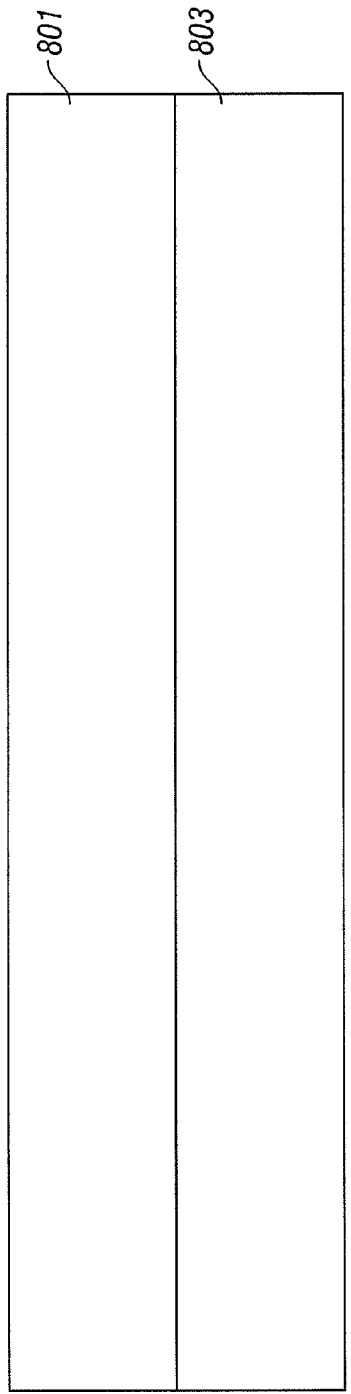
Figure 22C:
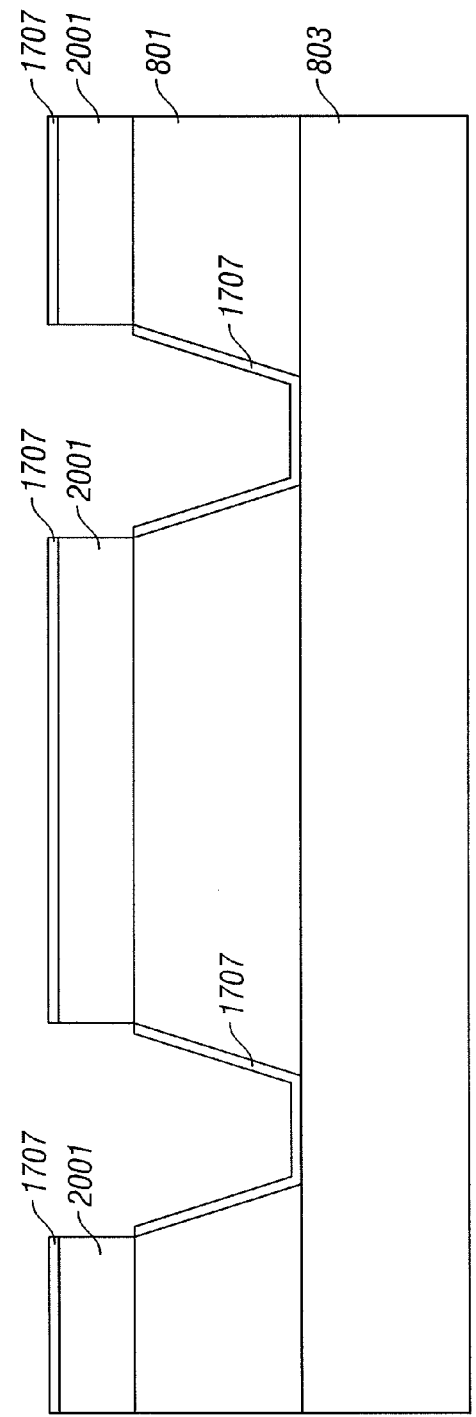
Figure 22D:
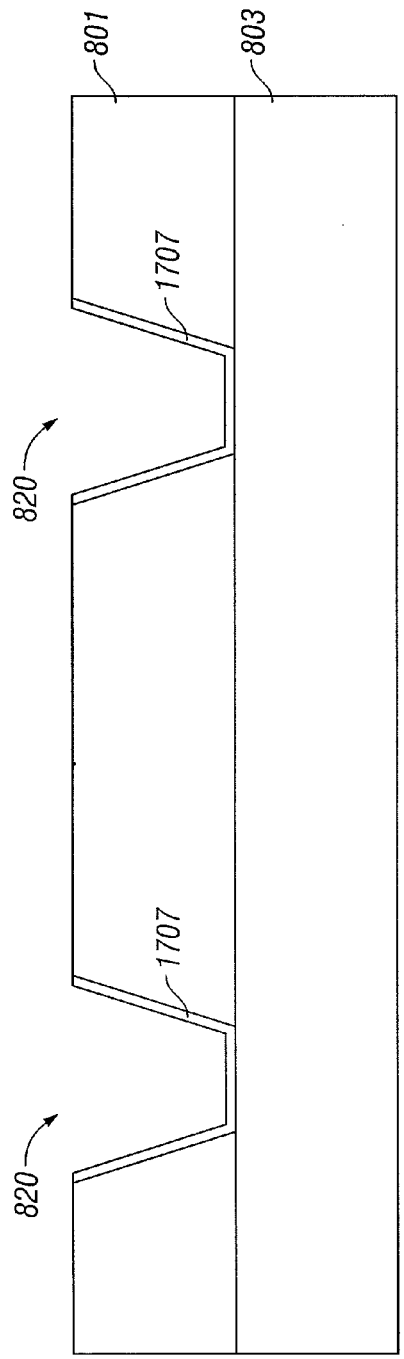

FIGS. 22A-22E illustrate another embodiment of a method of forming interferometric stacks 1707 over turning features 820. The method depicted in FIGS. 22A-22E is similar to the method depicted in FIGS. 21A-21H except that a dissolvable layer 2001 is not deposited within the turning features 820. As shown in FIG. 22C, an interferometric stack 1707 is then deposited directly onto the entire surface of each turning feature 820 and also onto the dissolvable layer 2001. In some embodiments, the dissolvable layer 2001 is then lifted-off or removed resulting in the embodiment shown in FIG. 22D. Because the interferometric stack 1707 in FIG. 22D covers the entire surface of each turning feature 820, the turning features appear as black or dark shapes to a viewer instead of rings. As discussed above, in some embodiments, interferometric stacks 1707 can be added to the same portions of each turning feature 820 or different portions. Additionally, in some embodiments, turning features 820 can vary in size, shape, quantity, and pattern and the coverage of these turning features 820 by interferometric stacks 1707 can also vary. For example, in one embodiment, a first turning feature 820 may not be covered by an interferometric stack 1707, a second turning feature 820 may be completely covered by an interferometric stack 1707, and a third turning feature 820 may be covered partially by one or more interferometric stacks 1707. As discussed above, in some embodiments, a reflective layer and one or more dark coating layers may be deposited over turning features or portions of turning features.

Figure 22E:
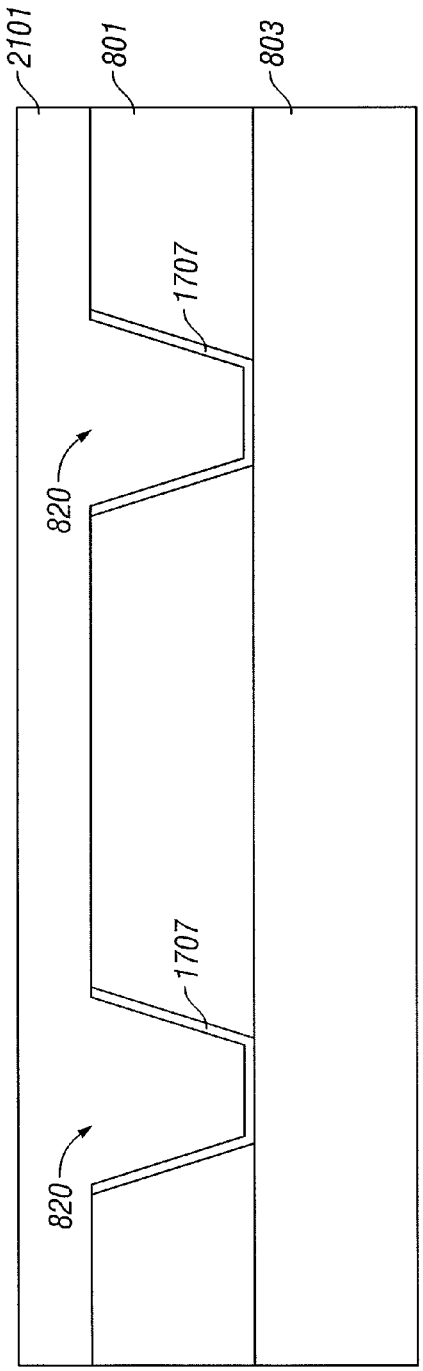
Figure 22F:
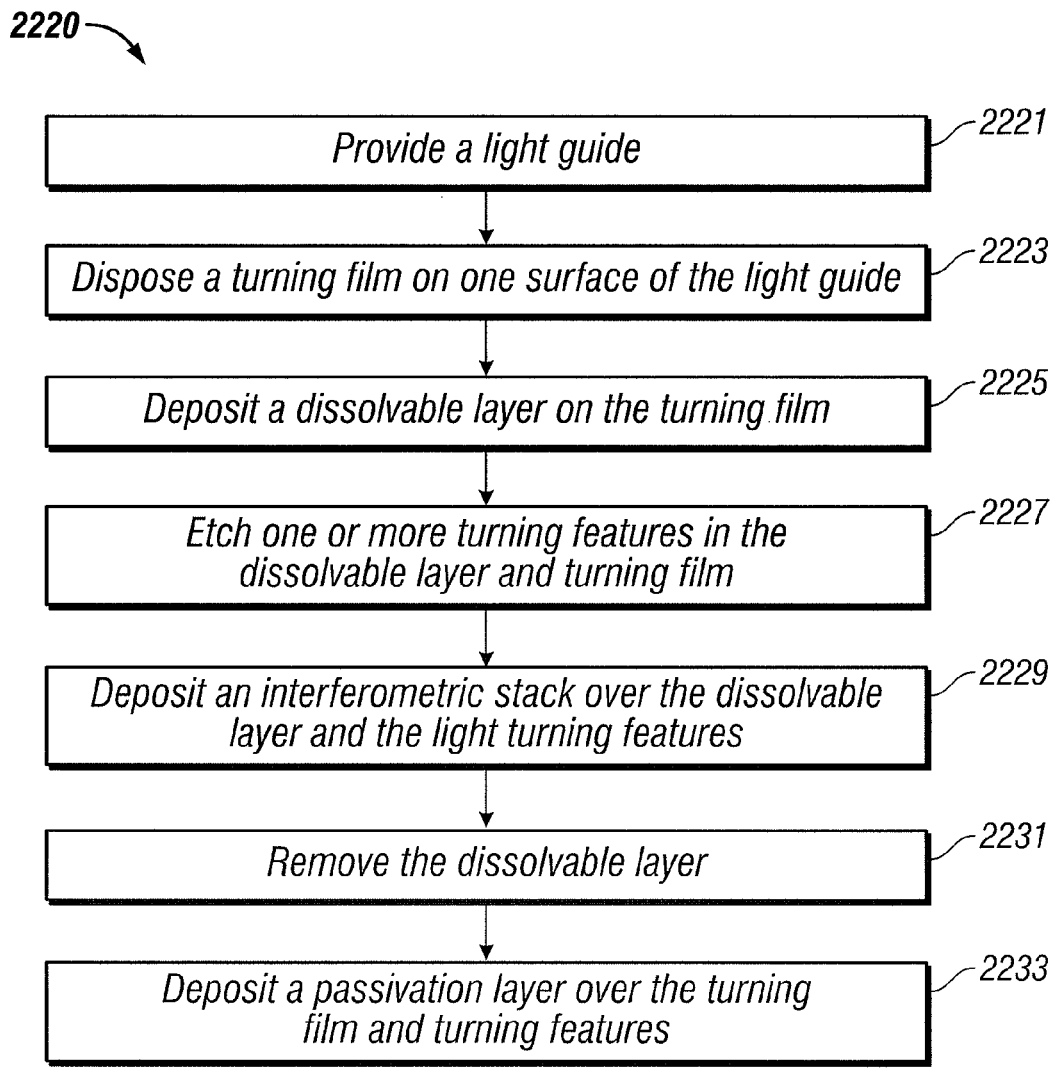
FIG. 22F is a block diagram schematically illustrating one embodiment of a method of making the illumination device of FIG. 22E.

FIG. 22F is a block diagram depicting a method 2220 of manufacturing the illumination device shown in FIG. 22E, according to one embodiment. Method 2220 includes the steps of providing a light guide at block 2221, disposing a turning film on one surface of the light guide at block 2223, depositing a dissolvable layer on the turning film at block 2225, etching one or more turning features in the dissolvable layer and turning film at block 2227, depositing an interferometric stack over the dissolvable layer and the light turning features at block 2229, removing the dissolvable layer at block 2231, and depositing a passivation layer over the turning film and turning features at block 2233.

Figure 23A:
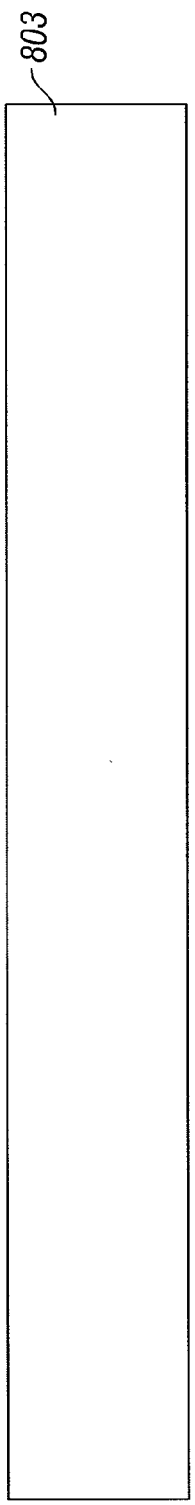
Figure 23B:
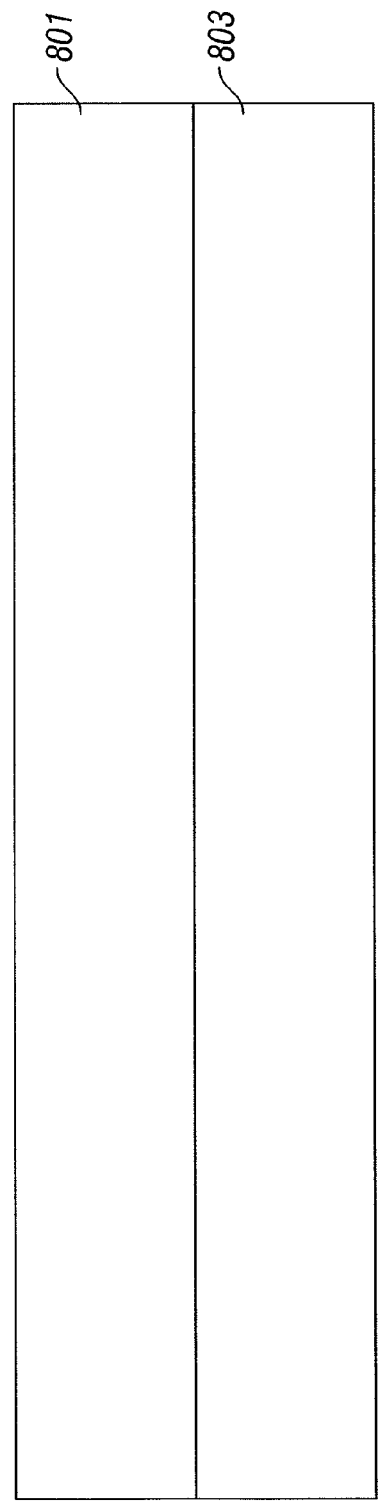

Turning now to FIGS. 23A-23J, an embodiment of a method of forming a reflective coating over turning features 820 is shown. As shown in FIGS. 23A-23D, in some embodiments, the process begins by adding a turning film 801 to a light guide 803, applying a dissolvable layer 2001 in a particular pattern over the turning film 801, etching turning features 820 into the turning film 801, and stripping the dissolvable layer 2001 from the turning film 801. Turning to FIG. 23E, in one embodiment, an electroplating process may start by applying a seed layer 2301 over the turning film 801 and the surfaces of the turning features 820. The seed layer may comprise any suitable material, for example, copper or silver. In some embodiments, a stick layer (not shown) may optionally be added over the turning film 801 and the turning features 820. Examples of suitable stick layers include tantalum, titanium, and molybdenum. In some embodiments, once the seed layer 2301 is added over the turning film 801 and the turning features 820, a dissolvable layer 2001 may be added over the turning film 801 and the portions of the turning features 820. In one embodiment, the dissolvable layer 2001 includes a photoresist layer that is spin-coated, exposed, and developed. In some embodiments, the dissolvable layer 2001 may be applied in a pattern to expose all, or certain portions, of the turning features 820. In one embodiment, the dissolvable layer 2001 is patterned to leave the sidewalls of one or more turning features 820 exposed.

Turning now to FIGS. 23G and 23H, in certain embodiments, portions of the seed layer 2301 that are not covered by the dissolvable layer 2001 are electroplated and the dissolvable layer 2001 is stripped or removed from the turning film 801 and the turning features 820. In some embodiments, portions of the seed layer 2301 may then be etched or removed with another process resulting in the turning film 801 and light guide stack 803 shown in FIG. 23I. In some embodiments, portions of the seed layer 2301 that are not over turning features 820 may be removed by etching or another process. In certain embodiments, portions of the seed layer 2301 that have not been electroplated are removed by etching. In some embodiments, portions of the seed layer 2301 that were electroplated may be removed using various methods known in the art. In some embodiments, once portions of the seed layer 2301 have been removed, a passivation layer 2101 can optionally be applied over the turning film 801 and turning features 820 as schematically depicted in FIG. 23J. Because the turning features 820 rely on a reflective coating applied to at least a portion of the turning features 820 surfaces to turn light instead of total internal reflection, an air pocket over the turning features 820 does not necessarily have to be maintained.

Figure 23K:
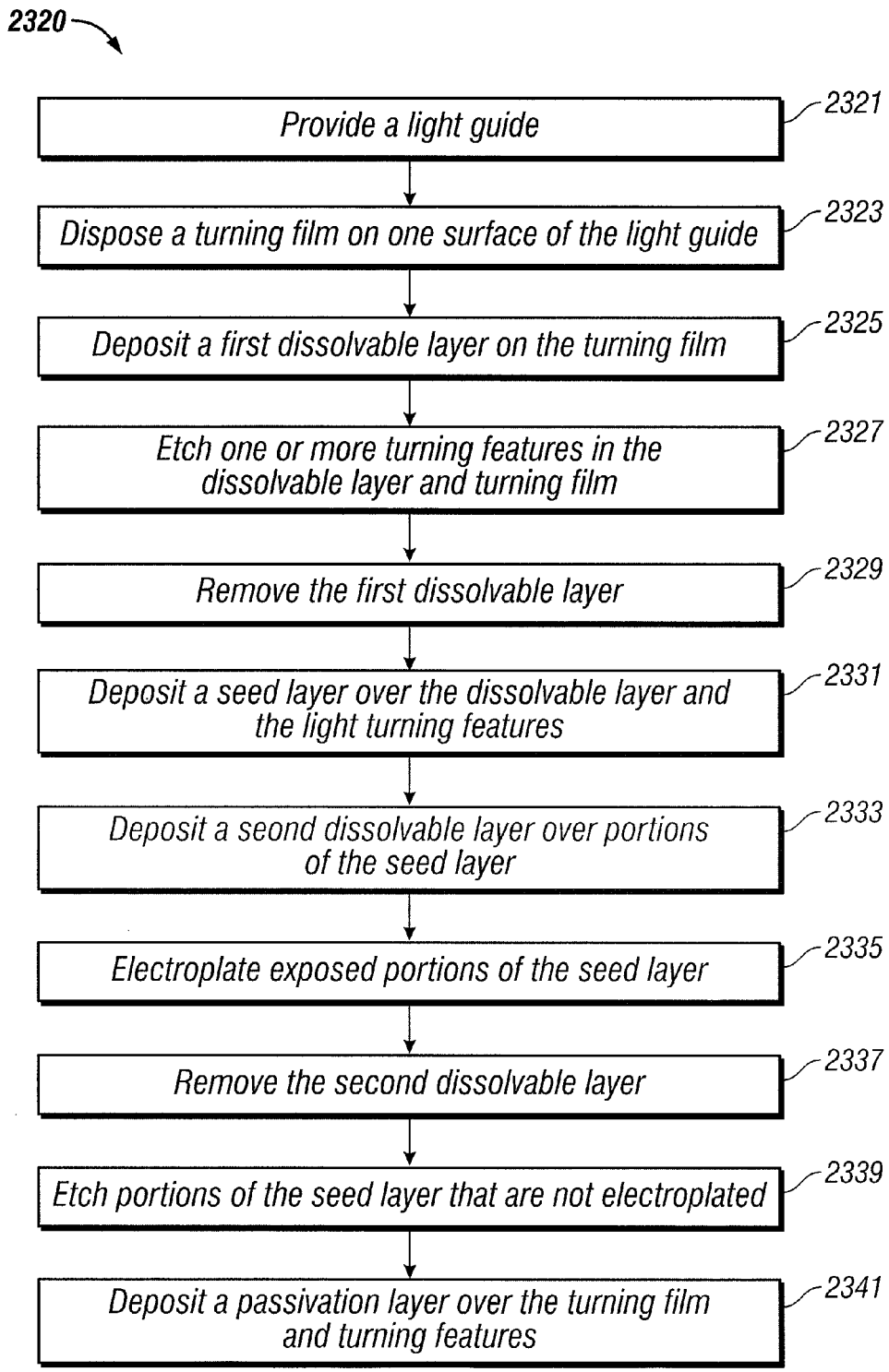
FIG. 23K is a block diagram schematically illustrating one embodiment of a method of making the illumination device of FIG. 23J.

FIG. 23K is a block diagram depicting a method 2320 of manufacturing the illumination device shown in FIG. 23J, according to one embodiment. Method 2320 includes the steps of providing a light guide at block 2321, disposing a turning film on one surface of the light guide at block 2323, depositing a first dissolvable layer on the turning film at block 2325, etching one or more turning features in the first dissolvable layer and turning film at block 2327, removing the first dissolvable layer at block 2329, depositing a seed layer over the dissolvable layer and the light turning features at block 2331, depositing a second dissolvable layer over portions of the seed layer at block 2333, electroplating exposed portions of the seed layer at block 2335, removing the second dissolvable layer at block 2337, etching portions of the seed layer that are not electroplated at block 2339, and depositing a passivation layer over the turning film and turning features at block 2341.

FIGS. 24A-24F depict an embodiment of a method of forming turning features 820 with a reflective coating on the side of a light guide 803 opposite a reflective display. In some embodiments, a reflective display may include the light guide 803 and thus, the light guide 803 can be used both for light turning and as part of the reflective display assembly. In some embodiments, the process begins in FIGS. 24A and 24B by depositing a seed layer 2301 onto a light guide 803. The light guide 803 may comprise any suitable material, for example, inorganic materials and/or organic materials. In some embodiments, the seed layer 2301 may comprise any suitable material, for example, tantalum, titanium, and molybdenum. As shown in FIG. 24C, in one embodiment, a dissolvable layer 2001 may be added over the seed layer 2301 in a pattern leaving certain portions of the seed layer 2301 exposed. Turning to FIG. 24D, in some embodiments, the exposed portions of the seed layer 2301 may be electroplated using known methods, resulting in an electroplate layer 2303 disposed over at least a portion of the seed layer 2301. In some embodiments, the dissolvable layer 2001 may then be removed and portions of the seed layer 2301 that were not electroplated may be etched or otherwise removed resulting in the light guide 803, seed layer 2301, and electroplate 2303 stack depicted in FIG. 24E. In some embodiments, the dissolvable layer 2001 comprises a photoresist and the photoresist is removed using known methods.

Turning to FIG. 24F, a turning film 801 can then be added over the light guide 803 surrounding the seed layer 2301 portions and electroplate portions 2303. In some embodiments, the light guide 803 may comprise material that is index matched to the light guide 803. In some embodiments, the light guide 803 and the turning film 803 have about the same index of refraction. In some embodiments, the light guide 803 and the turning film 801 each have an index of refraction between about 1.45 and 2.05. In some embodiments, the light turning film 801 comprises the same material(s) as the light guide 803. In some embodiments, the surface or side of the turning film 801 opposite the light guide 803 may be substantially planar. In some embodiments, additional layers (not shown), for example, a cover layer, may be added over the turning film 801. One advantage of the embodiment shown in FIGS. 24A-24F is that it allows the use of only a single dissolvable layer 2001 mask instead of multiple dissolvable layer 2001 masks.

Figure 24G:
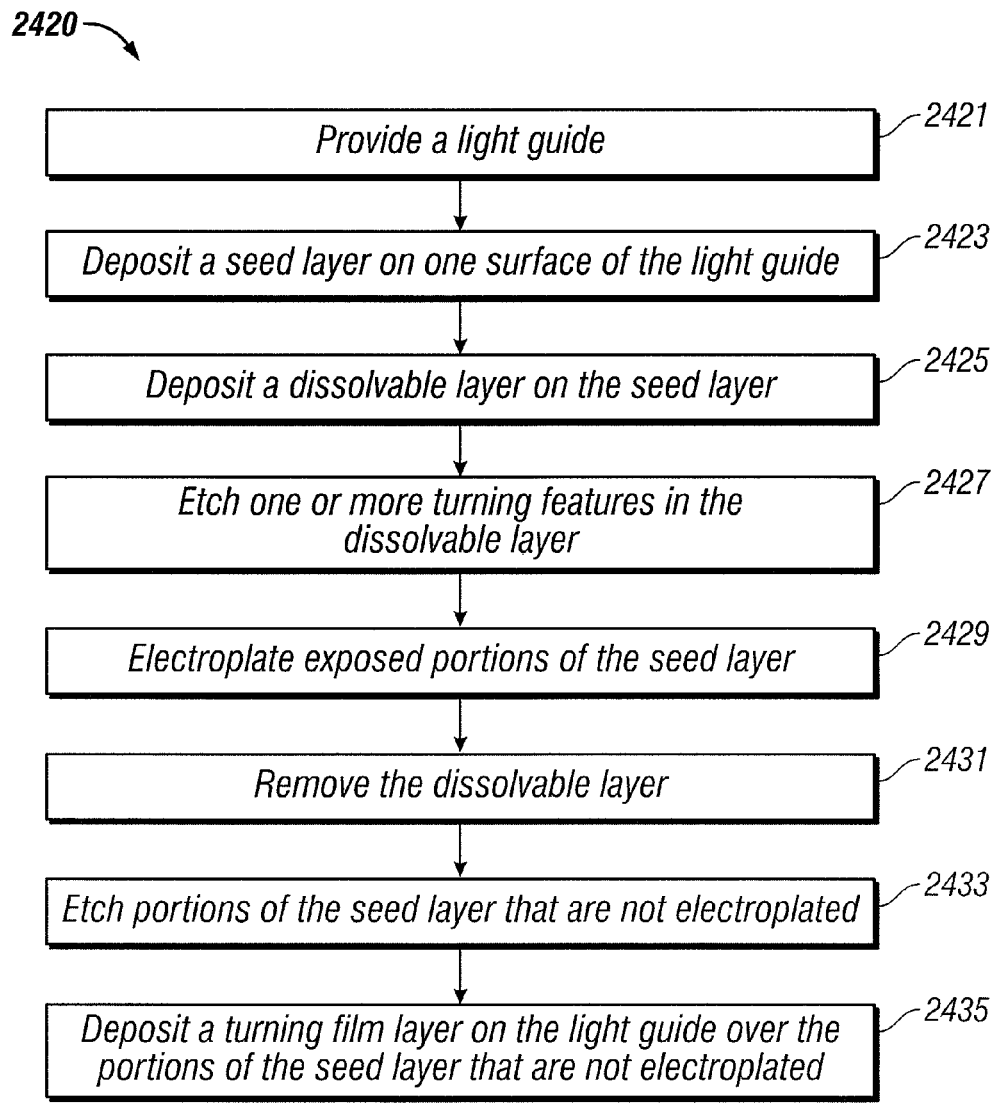
FIG. 24G is a block diagram schematically illustrating one embodiment of a method of making the illumination device of FIG. 24F.

FIG. 24G is a block diagram depicting a method 2420 of manufacturing the illumination device shown in FIG. 24F, according to one embodiment. Method 2420 includes the steps of providing a light guide 2421, depositing a seed layer on one surface of the light guide 2423, depositing a dissolvable layer on the seed layer 2425, etching one or more turning features in the dissolvable layer 2427, electroplating exposed portions of the seed layer 2429, removing the dissolvable layer 2431, etching portions of the seed layer that are not electroplated 2433, and depositing a turning film layer on the light guide over portions of the seed layer that are not electroplated 2435.

Figure 25A:
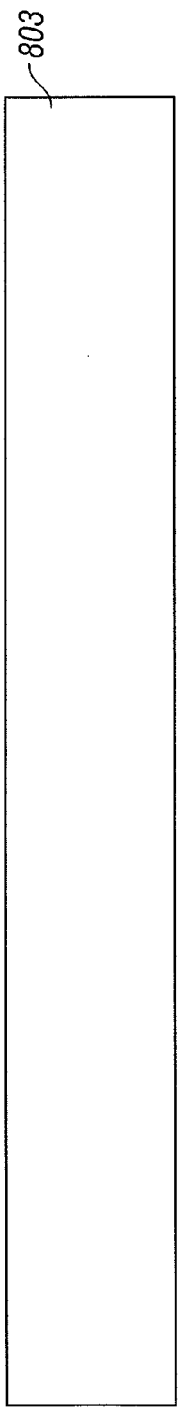
Figure 25B:
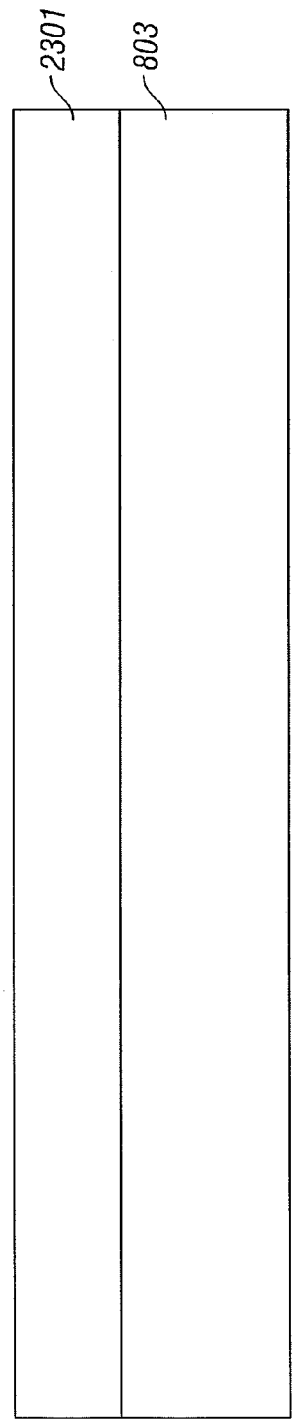
Figure 25C:
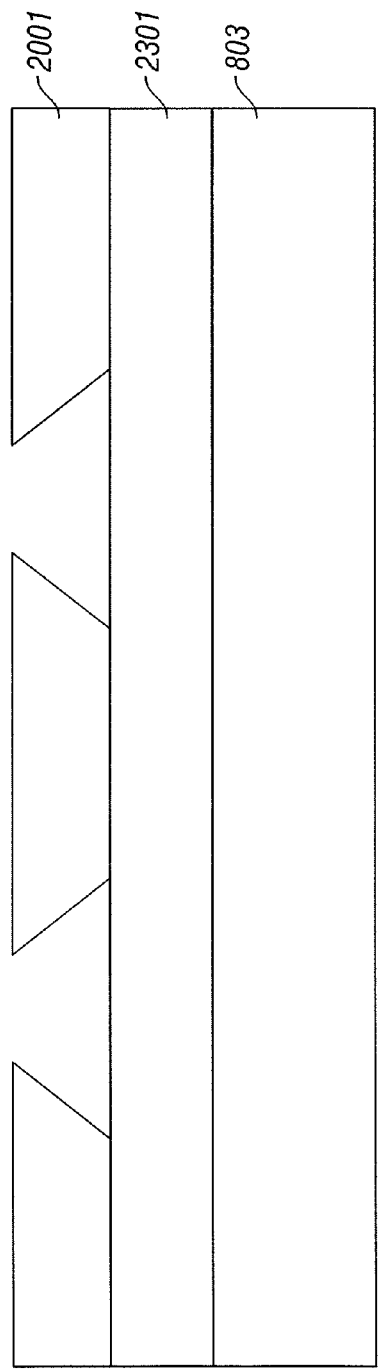
Figure 25D:
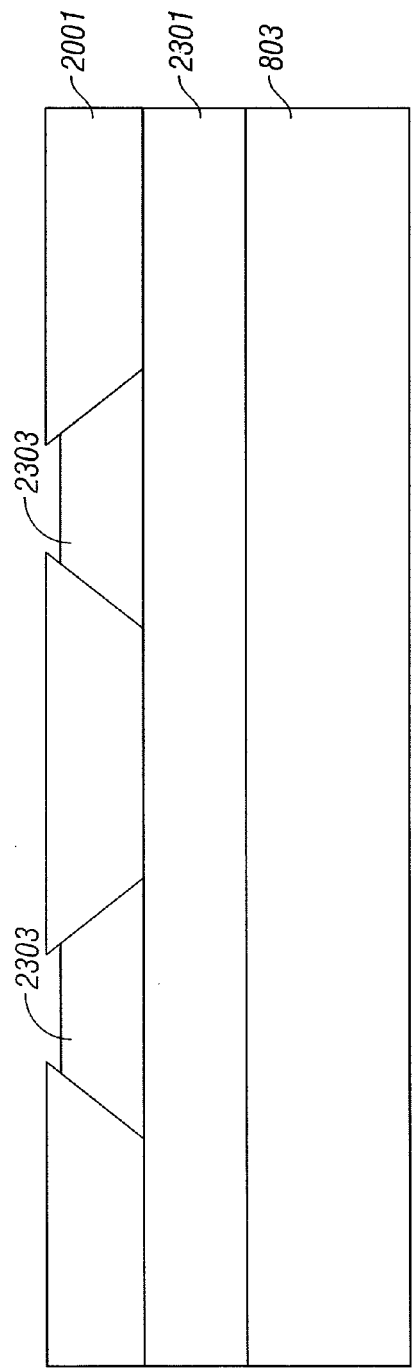
Figure 25G:
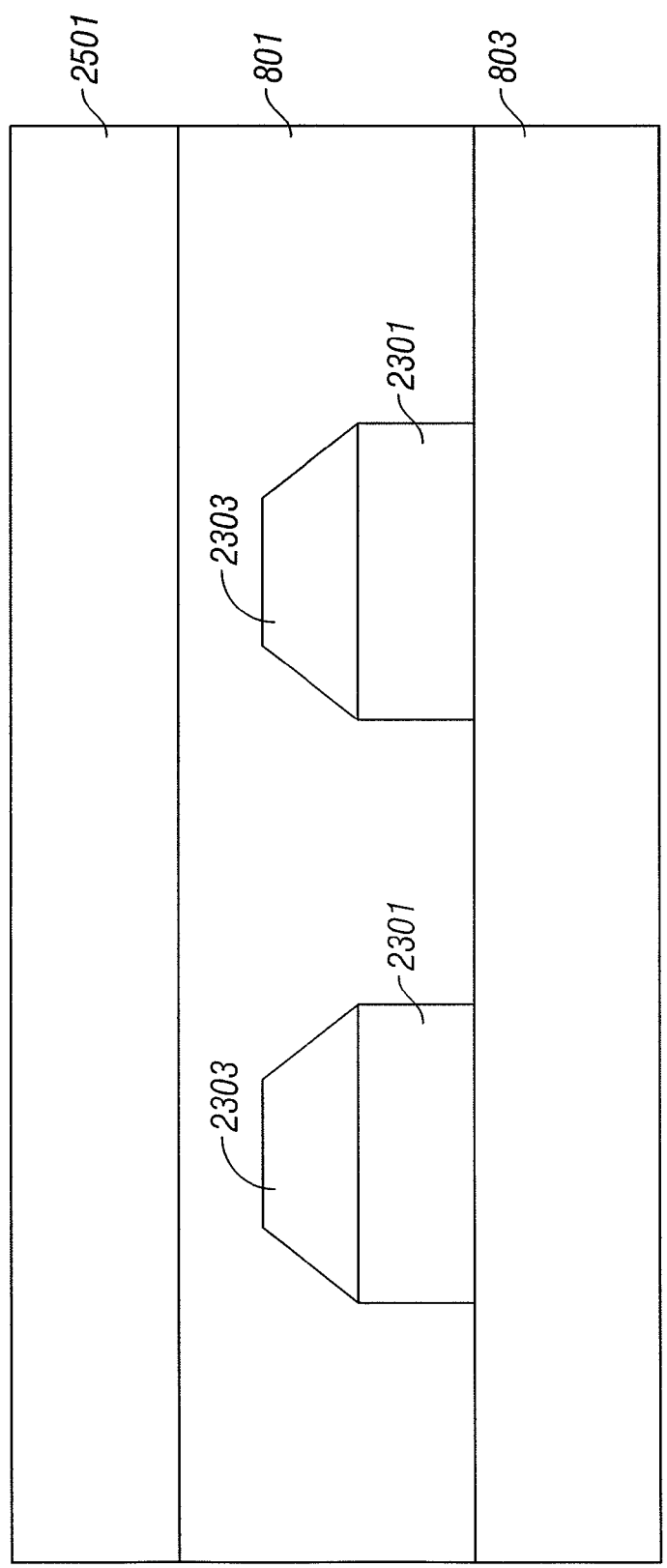

FIGS. 25A-25G show another embodiment of a method of forming turning features 820 with a reflective coating on the side of a light guide 803 opposite a reflective display. Referring to FIGS. 25A-25C, in some embodiments, the method includes providing a light guide 803, depositing a seed layer 2301 on one surface of the light guide 803, and adding a dissolvable layer 2001 over the seed layer 2301. In some embodiments, the dissolvable layer 2001 may be added in a certain pattern or it may be deposited over the entire surface of the seed layer 2301 and have certain portions removed to create a desired pattern. Comparing FIG. 25C to 24C, it can be appreciated by those of skill in the art that the dissolvable layer 2001 pattern can be used to create differently shaped voids defined by sides or surfaces of different portions of the dissolvable layer 2001 and the seed layer 2301. For example, in some embodiments, voids may be formed with generally trapezoidal cross-sectional shapes or inverted trapezoidal cross-sectional shapes. Turning to FIG. 25D, in some embodiments, exposed portions of the seed layer 2301 may be electroplated, resulting in an electroplate layer 2303 that partially fills the voids shown in FIG. 25C. In some embodiments, the dissolvable layer 2001 may then be removed and portions of the seed layer 2301 that were not electroplated may be etched or otherwise removed resulting in the light guide 803, seed layer 2301, and electroplate 2303 stack depicted in FIG. 25E. Turning to FIGS. 25F and 25G, in certain embodiments, a turning film 801 may be added over the light guide 803 and surround the seed layer 2301 portions and electroplate layers 2303. In some embodiments, a buffering layer 2501 may be added on top of the turning film 801. In certain embodiments, the buffering layer 2501 may comprise varying materials or layers configured to protect the turning film 801 from scratches or other damage.

Figure 25H:
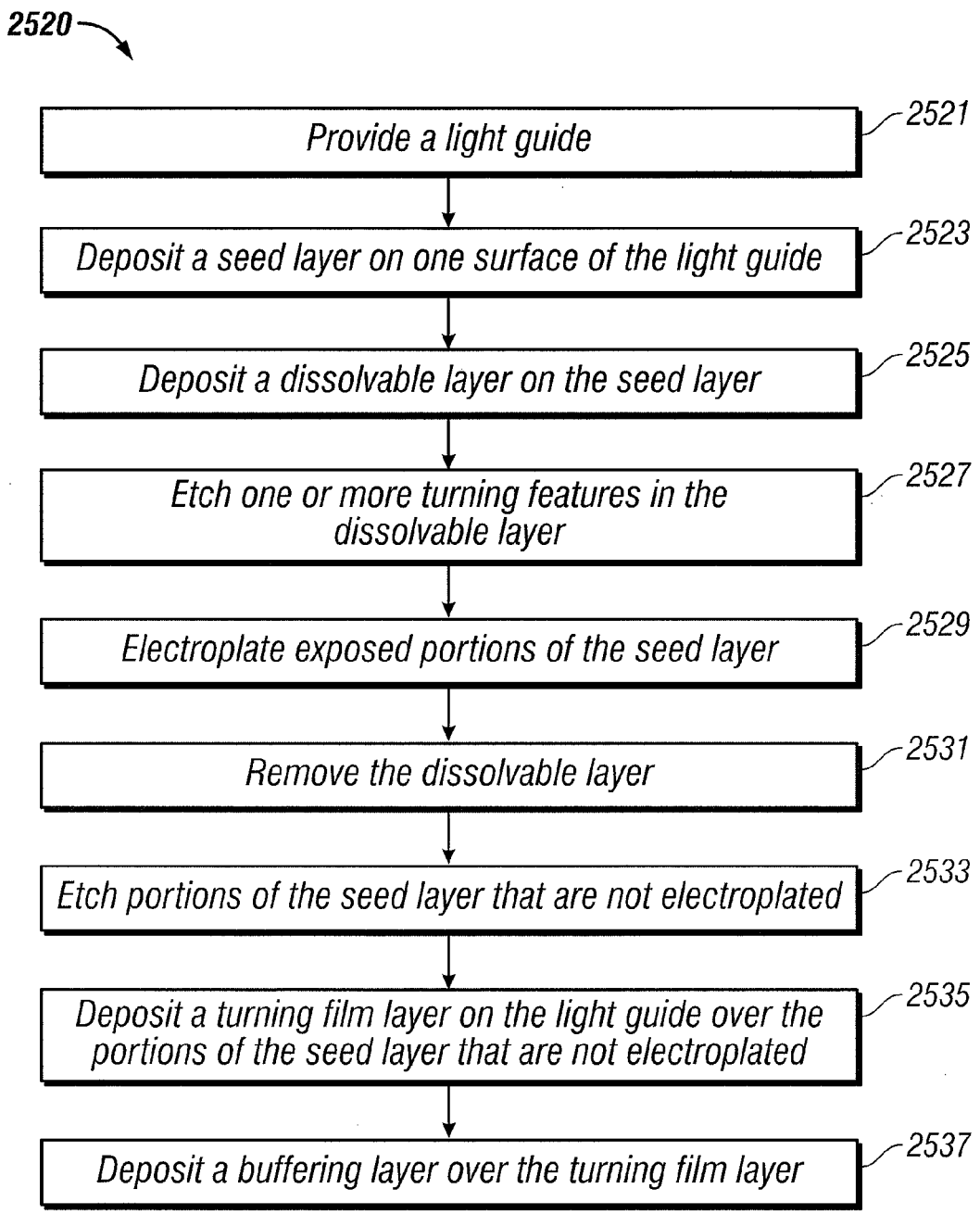
FIG. 25H is a block diagram schematically illustrating one embodiment of a method of making the illumination device of FIG. 25G.

FIG. 25H is a block diagram depicting a method 2520 of manufacturing the illumination device shown in FIG. 25G, according to one embodiment. Method 2520 includes the steps of providing a light guide at block 2521, depositing a seed layer on one surface of the light guide at block 2523, depositing a dissolvable layer on the seed layer at block 2525, etching one or more turning features in the dissolvable layer at block 2527, electroplating exposed portions of the seed layer at block 2529, removing the dissolvable layer at block 2531, etching portions of the seed layer that are not electroplated at block 2533, depositing a turning film layer on the light guide over portions of the seed layer that are not electroplated at block 2535, and depositing a buffering layer over the turning film layer at block 2537.

Figure 26A:
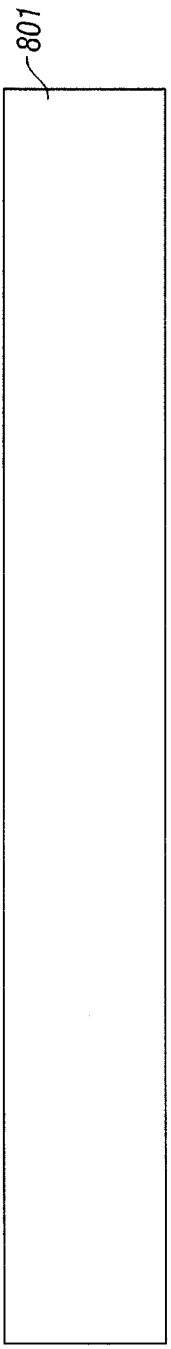
Figure 26B:
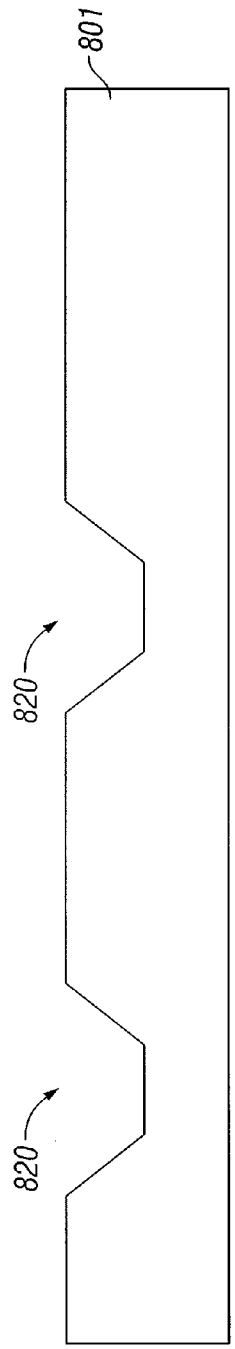
Figure 26C:
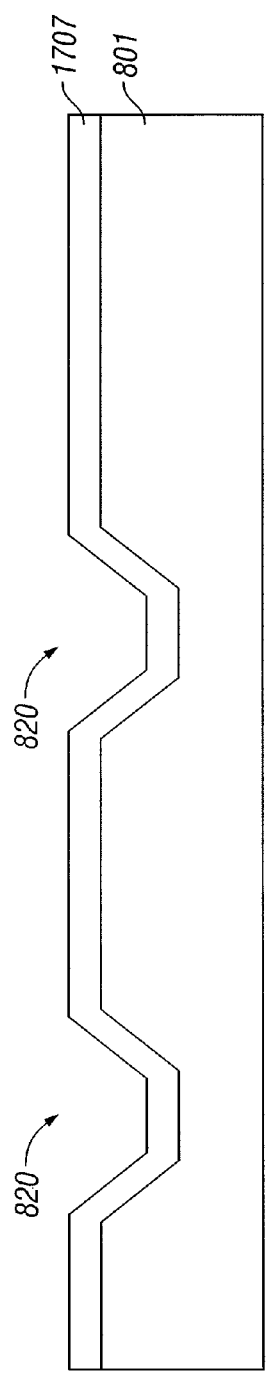

Turning now to FIGS. 26A-26F, another embodiment of a method of forming turning features 820 with a reflective coating on a turning film 801 is shown. In some embodiments, the method begins with providing a turning film 801 and forming turning features 820 on at least one surface of the turning film 801. In some embodiments, a light guide may be provided and turning features 820 may be formed on the light guide using known methods. As shown in FIG. 26C, in some embodiments, an interferometric stack 1707 is deposited over the turning feature 820 side of the turning film 801. In certain embodiments, a reflective coating is applied instead of an interferometric stack and a dark coating layer is applied over the reflective coating. In some embodiments, a dissolvable layer 2001 is then formed in a pattern covering certain portions of the interferometric stack 1707 as shown in FIG. 26D. In some embodiments, the dissolvable layer 2001 includes a photoresist material. In certain embodiments, portions of the interferometric stack 1707 that are not covered by the dissolvable layer 2001 are removed. In some embodiments, the portions of the interferometric stack 1707 that are not covered by the dissolvable layer 2001 are etched away using known methods and the dissolvable layer 2001 is then removed resulting in the embodiment shown in FIG. 26E. In some embodiments, an additional layer 2101, for example, a passivation layer or cover layer, may then be added over the turning film 801 and the interferometric stacks 1707. One of skill in the art will understand that there are numerous methods and processes to form reflective layers and/or interferometric stacks over turning features or portions of turning features on a substrate layer.

Figure 26G:
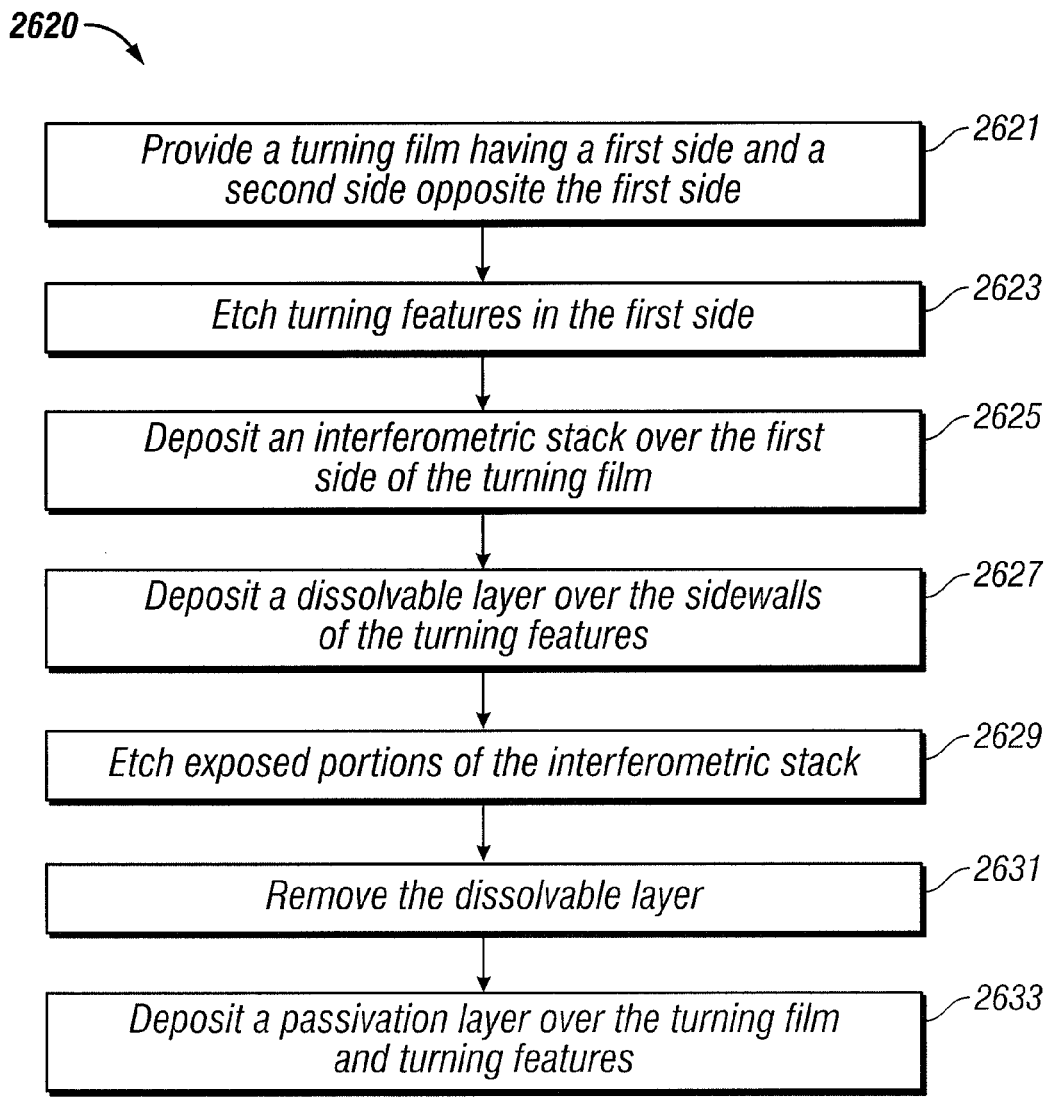
FIG. 26G is a block diagram schematically illustrating one embodiment of a method of making the illumination device of FIG. 26F.

FIG. 26G is a block diagram depicting a method 2620 of manufacturing the illumination device shown in FIG. 26F, according to one embodiment. Method 2620 includes the steps of providing a turning film having a first side and a second side opposite the first side at block 2621, etching turning features in the first side at block 2623, depositing an interferometric stack over the first side of the turning film at block 2625, depositing a dissolvable layer over the sidewalls of the turning features at block 2627, etching exposed portions of the interferometric stack at block 2629, removing the dissolvable layer at block 2631, and depositing a passivation layer over the turning film and turning features at block 2633.

As discussed above, turning films and light guides can comprise various materials. Light guides or turning films are commonly formed by organic materials such as polymers or plastics. Using plastics in the light guide and/or turning film, however, can limit the mechanical, environmental, and/or chemical robustness of an illumination device. Certain molded plastics, for example, acrylics, polycarbonates, and cycloolefin polymers, have low scratch resistance, limited chemical resistance, and have limited lifetime, as their optical properties can degrade from exposure to environmental stress factors. In some cases, cleaning and/or exposure to ultraviolet rays, temperature, and humidity, can cause molded plastics to degrade over time. In some embodiments of the invention, inorganic materials, for example, silicates and alumina, can be used to form one or more layers of a display device to increase the robustness of an illumination device. For example, in some embodiments, a substrate, light guide, turning feature, or other layers of the device can comprise an inorganic material. In some embodiments, inorganic materials can also provide superior optical properties, for example, higher transparency and higher refractive indices, than those of organic materials. In some embodiments, an inorganic turning film can be formed on an inorganic light guide using the methods disclosed below.

Turning now to FIGS. 27A-27C, one embodiment of a method of building an illumination device incorporating an inorganic light guide and turning film is depicted. FIG. 27A shows an embodiment of a light guide 803 comprising an inorganic material. In some embodiments, the light guide 803 comprises an aluminosilicate or sapphire. In some embodiments, a mixture of high purity silane ($SiH_4$ dilute in argon), nitrous oxide ($N_2O$), and ammonia ($NH_3$) gases may be mixed to form an illumination device comprising silicon oxy-nitride having a desired refractive index. In some embodiments, the refractive index of the silicon oxy-nitride can be adjusted to a desired level, for example, to match the index of the light guide 803. In certain embodiments, the refractive index of the silicon oxy-nitride can be adjusted to the desired level by adjusting the $N_2O:NH_3$ molar ratio. In one embodiment, the $N_2O:NH_3$ molar ratio may be adjusted by controlling the flow rates of the respective gases. Example refractive indices of materials used in some embodiments include indices ranging from about 1.46 to about 2.05 as the $N_2O:NH_3$ molar ratio increases from 0 to 100%.

Turning now to FIG. 27B, silicon oxy-nitride can be deposited on the light guide 803 to form a turning film 801 which can be configured with an index of refraction matched to that of the light guide 803. In one embodiment, a silicon oxy-nitride material can be deposited on the light guide 803 using plasma enhanced chemical vapor deposition ("PECVD"). In some embodiments, turning features 820 can then be formed in the surface of the turning film 801 opposite the light guide 803, for example as illustrated in FIG. 27C. In one embodiment, the turning features 820 can be etched to form sloped side-walls, for example using a photolithographically patterned mask layer and a suitable wet or dry etching method. Differently sized and shaped turning features 820 can be formed in the turning film 801 using various manufacturing methods. In some embodiments, the shape formed by the surface of a turning feature 820 may comprise a cone, a frustum of a cone, a pyramid, a frustum of a pyramid, a prism, a polyhedron, or another three-dimensional shape. In some embodiments, additional coatings, for example, reflective coatings, interferometric stacks, and/or dark coatings may be added over the turning features 820 or portions of the turning features.

In some embodiments, an illumination device comprising an inorganic light guide and turning film can be made using a sol-gel precursor mixture to form the light turning film. In some embodiments, the sol-gel precursor mixture can comprise organosilicon and organotitanium compounds which, when combined, form mixtures of silicon oxide and titanium dioxide. In some embodiments, the index of refraction of the structure produced from a sol-gel precursor mixture can be adjusted by adjusting the ratios of the precursors and/or by applying heat treatment. In some embodiments, the index of refraction of a structure produced from a sol-gel precursor mixture can be adjusted to a level anywhere between about 1.4 to about 2.4. In some embodiments, the light guide can comprise glass (e.g., TFT substrate type or aluminosilicate) having a refractive index of about 1.52. In other embodiments, a light guide can comprise sapphire having a refractive index of about 1.77. In some embodiments, a sol-gel precursor mixture can comprise tetraethoxysilane (TEOS or tetraethyl orthosilicate), titanium isopropoxide, solvents, for example, ethanol, isopropanol, or mixtures thereof, and can also include one or more additives, for example, hydrochloric acid, acetic acid, and titanium chloride.

In one embodiment, a sol-gel precursor mixture is formed by hydrolyzing TEOS and titanium isopropoxide, at a ratio chosen to match the refractive index of the light guide, along with $TiCl_4$ in an ethanol/IPA mixture with water at an acidic pH of about 1 (which can be obtained, for example, by addition of HCl), and aging the solution at about 40 C. In some embodiments, the sol-gel precursor mixture can then be coated over the light guide. In certain embodiments, turning features may be formed in the sol-gel precursor mixture layer by pressing a mold onto the gelled ceramic coating, ramping the temperature to increase cross-link density, and drying at about 110 C. In some embodiments, the turning film comprising the sol-gel mixture can be further processed by densifying the sol-gel precursor mixture between about 600 C and about 800 C, so that the final refractive index of the turning film matches the refractive index of the light guide.

Figure 27D:
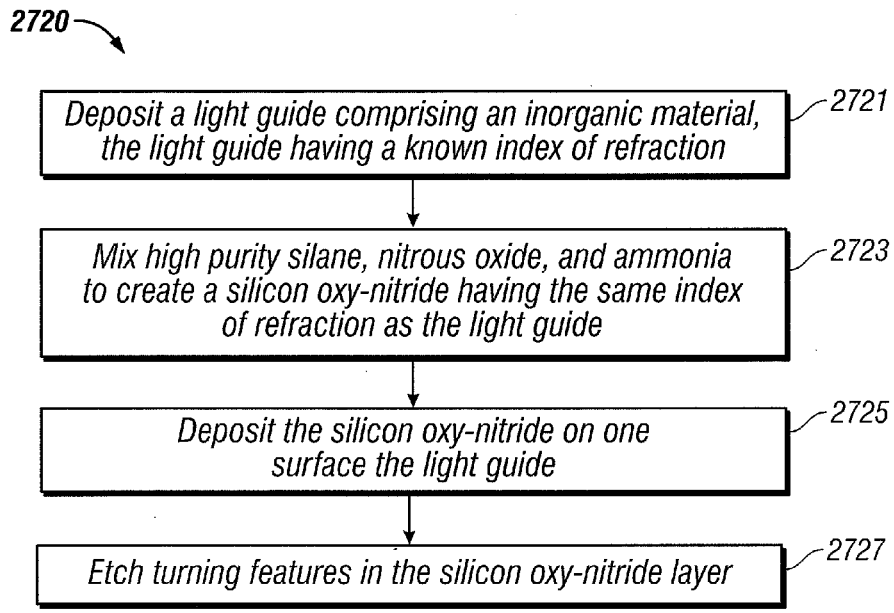
FIG. 27D is a block diagram schematically illustrating one embodiment of a method of making the illumination device of FIG. 27C.
Figure 27E:
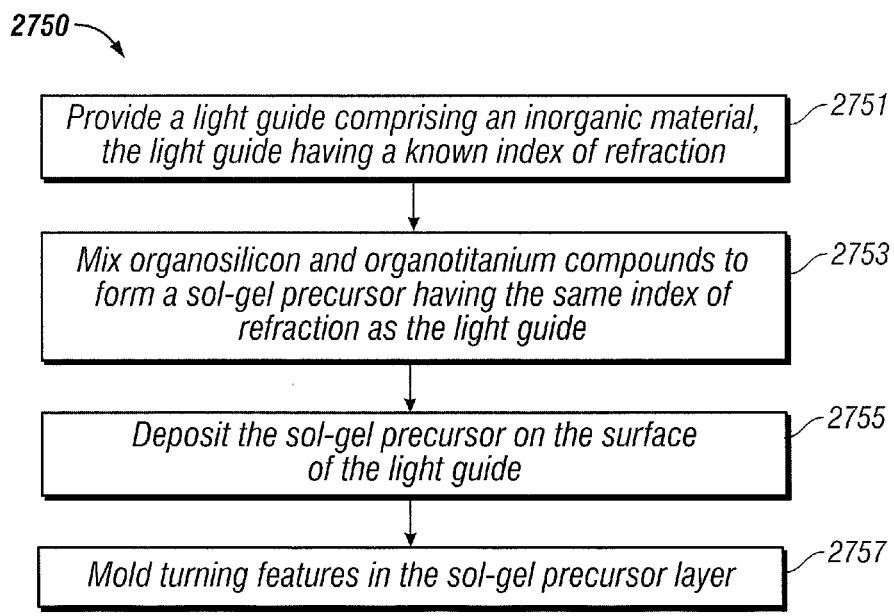
FIG. 27E is a block diagram schematically illustrating one embodiment of a method of making the illumination device of FIG. 27C.

FIG. 27D is a block diagram depicting a method 2720 of manufacturing the illumination device shown in FIG. 27C, according to one embodiment. Method 2720 includes the steps of providing a light guide comprising an inorganic material, the light guide having a known index of refraction at block 2721, mixing high purity silane, nitrous oxide, and ammonia to create a silicon oxy-nitride having the same index of refraction as the light guide at block 2723, depositing the silicon oxy-nitride on one surface of the light guide at block 2725, and etching turning features in the silicon oxy-nitride layer at block 2727. FIG. 27E is a block diagram depicting a method at block 2750 of manufacturing the illumination device shown in FIG. 27C, according to one embodiment. Method 2750 includes the steps of providing a light guide comprising an inorganic material, the light guide having a known index of refraction at block 2751, mixing organosilicon and organotitanium compounds to form a sol-gel precursor having the same index of refraction as the light guide at block 2753, depositing the sol-gel precursor on one surface of the light guide at block 2755, and molding turning features in the sol-gel precursor layer at block 2757.

Figure 28:
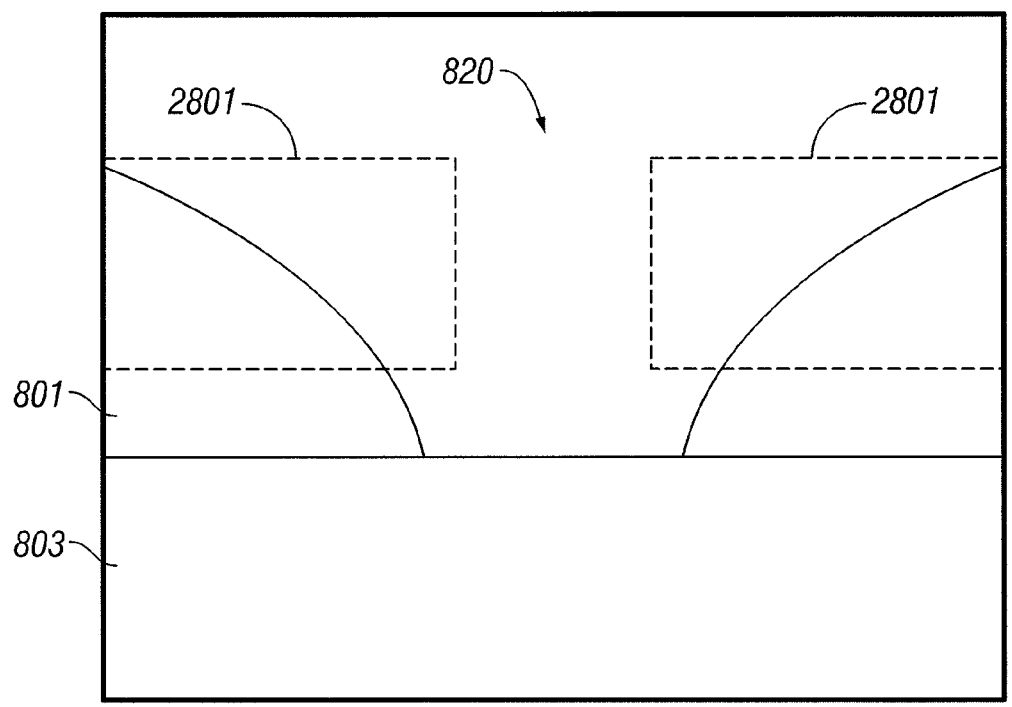
FIG. 28 is a cross-section of an embodiment of a turning film having tapered walls.

Turning now to FIG. 28, a cross-sectional view of an embodiment of a turning film 801 is depicted. In some embodiments, the turning film 801 comprises silicon oxynitride and includes one or more turning feature 820. In some embodiments, the one or more turning features 820 can be formed by an etching process. In one embodiment, the etching process uses an etching gas comprising a mixture of SiON etchant, for example, $CF_4$, and a mask material etchant, for example, $O_2$ for photoresist. In some embodiments, the silicon oxy-nitride is pulled back from its initial profile 2801 as it is removed during etching, resulting in one or more light turning features 820 with tapered side walls. In some embodiments, the turning film 801 can be disposed on a light guide 803. In some embodiments, the turning film 801 can have an index of refraction that is, or is about, the same as the index of refraction of the light guide 803. In some embodiments, a reflective layer (not shown), an interferometric stack (not shown), and/or a black or dark coating (not shown) can be disposed over portions of the turning film 801 including portions of the turning features 820.

As indicated herein, in some embodiments turning films can include turning features having curvilinear cross-sectional shapes. In the absence of curved edges or sidewalls, each edge extracts light and produces an emission cone based on the collimation of the light propagating in the turning film. Turning features with curved edges can be configured to adjust the angular width of the illumination cone of light produced by the turning features. Thus, curved edges can be configured to focus (e.g., reduce the angular width of the emission cone) or to disperse (e.g., increase the angular width of the emission cone) light propagating inside the turning film. These configurations can allow for the optimization of the emission properties of the turning film for a variety of input light sources and other geometrical constraints.

Adjusting (e.g., increasing or decreasing) the angular width of the illumination cone can enable embodiments of displays to have thinner front lights by abrogating the need for a diffusing isolation layer that is sometimes used to produce a uniform display. Additionally, in some embodiments, turning features having curved edges can be placed farther apart from one another than turning features with straight edges because each curved turning feature illuminates a larger area of the display due to the increased width of the illumination cone. Turning films configured with increased spatial separation between light turning features can also be configured such that the thickness of the turning film is decreased.

Figure 29A:
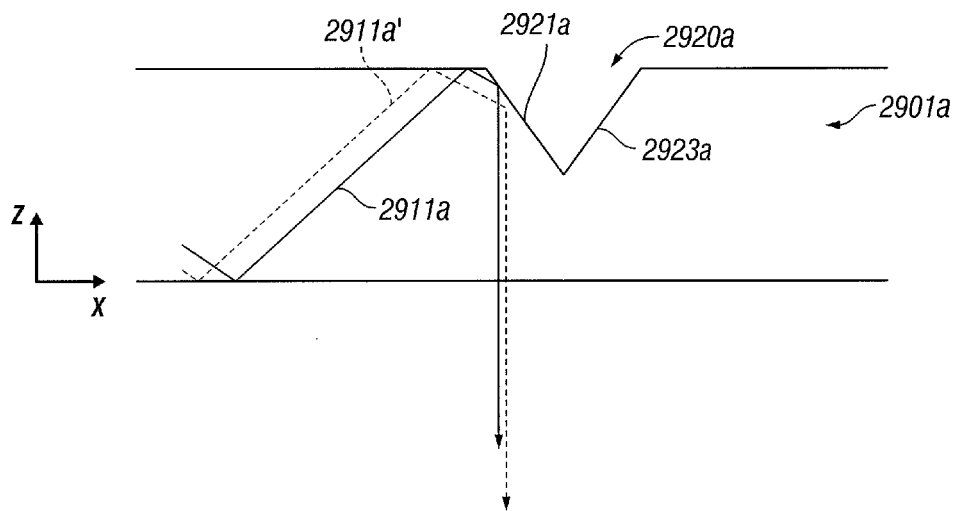
FIG. 29A is a schematic of a cross-section of an embodiment of a turning film having a polygonal turning feature.

FIG. 29A illustrates a cross-sectional view of one embodiment of a turning film 2901*a* that includes a turning feature 2920*a*. The turning film 2901*a* is illustrated with an x-axis extending generally parallel to a bottom surface of the turning film, a z-axis extending generally normal to the bottom surface and a top surface of the turning film, and a y-axis extending generally normal to the x-axis and z-axis. Turning feature 2920*a* is v-shaped and includes a left edge 2921*a* and a right edge 2923*a* configured to direct light towards the bottom of the turning film 2901*a*. Also shown is a first ray of light 2911*a* and a second ray of light 2911*a*'. Both light rays 2911*a*, 2911*a*' are propagating within the turning film 2901*a* at the same angle relative to the top and bottom of the turning film and the light rays 2911*a*, 2911*a*' are offset or spaced apart from one another. Because the left edge 2921*a* of the turning feature 2920*a* is at a constant angle relative to the top of the turning film 2901*a*, the light rays 2911*a*, 2911*a*' reflect off of the left edge 2921*a* at the same angle towards the bottom of the turning film 2901*a* (in this illustration, downward). Thus, the illumination cone of light produced by the turning feature 2920*a* is collimated (e.g., the rays of light that form the cone are substantially parallel to one another) as the light travels away from the turning feature 2920*a*. While only the cross-section of the prismatic turning feature 2920*a* is shown in FIG. 29A, it should be understood by those of skill in the art that the in-plane distribution of the light turning features disclosed herein can be linear, curvilinear, etc., so that a variety of front light configurations can be implemented, for example, light bar sources or LED sources.

Figure 29B:
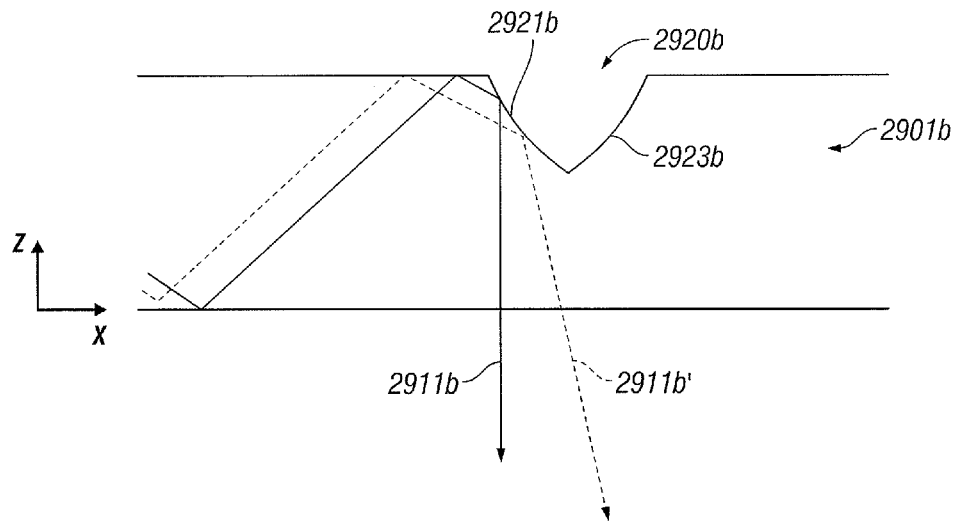
FIG. 29B is a schematic of a cross-section of an embodiment of a turning film having a concave curvilinear turning feature.

FIG. 29B illustrates a cross-sectional view of another embodiment of a turning film 2901*b* that includes a turning feature 2920*b*. Turning feature 2920*b* includes a left curved edge 2921*b* and a right curved edge 2923*b*. Edges 2921*b*, 2923*b* form a turning feature 2920*b* that is concave relative to the turning film 2901*b*. Curved edges 2921*b*, 2923*b* can be disposed in the turning film in one or more planes that are at least substantially parallel to the illustrated x-z plane of the turning film. Also shown are rays of light 2911*b*, 2911*b*' that are propagating within the turning film 2901*b* at the same angles relative to the top and bottom of the turning film. The rays 2911b, 2911b' are directed away from one another after reflecting off of the left edge 2921b because the edge is curved. Thus, the curved turning feature 2920b can create an illumination cone of light with an angular width that is greater than the cone of light produced by the turning feature 2920a shown in FIG. 29A (e.g., an illumination cone of light that is not collimated).

Figure 29C:
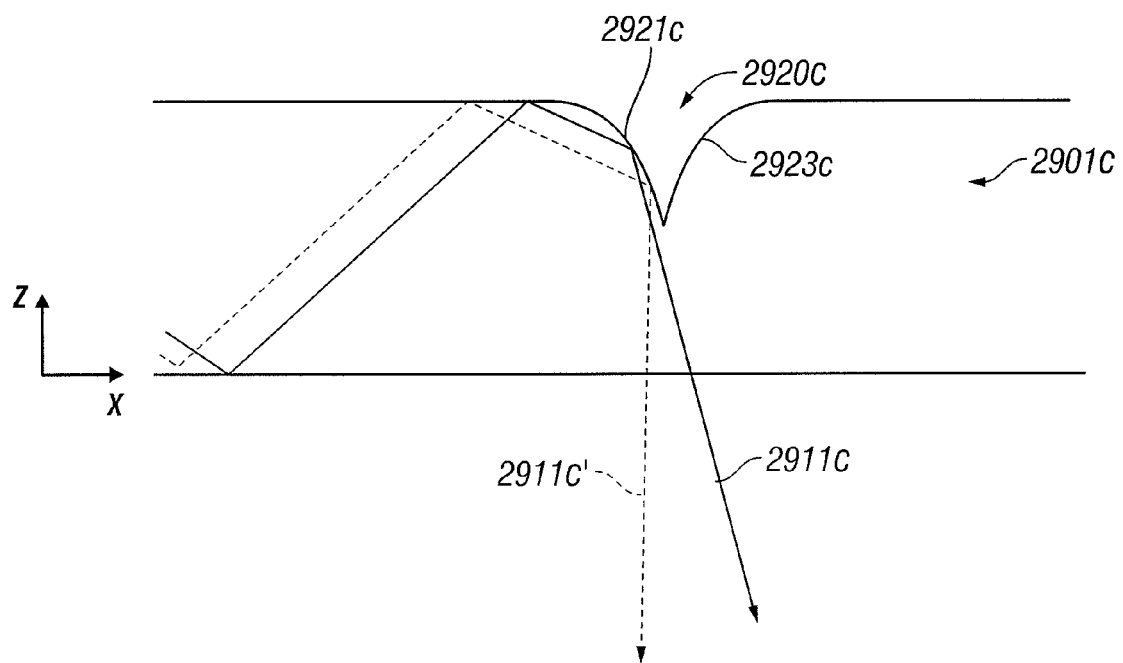
FIG. 29C is a schematic of a cross-section of an embodiment of a turning film having a convex curvilinear turning feature.

FIG. 29C illustrates a cross-sectional view of another embodiment of a turning film 2901c that includes a turning feature 2920c. Turning feature 2920c includes a left curved edge 2921c and a right curved edge 2923c. Edges 2921c, 2923c form a turning feature 2920c that is convex relative to the turning film 2901c. Curved edges 2921c, 2923c can be disposed in the turning film in one or more planes that are at least substantially parallel to the illustrated x-z plane of the turning film. Rays of light 2911c, 2911c' are directed away from one another after reflecting off the left edge 2921c because the edge is curved. Similarly to the turning feature illustrated in FIG. 29B, this results in an illumination cone of light that has an angular width that is greater than the cone of light produced by the turning feature 2920a shown in FIG. 29A (e.g., an illumination cone of light that is not collimated).

Figure 29D:
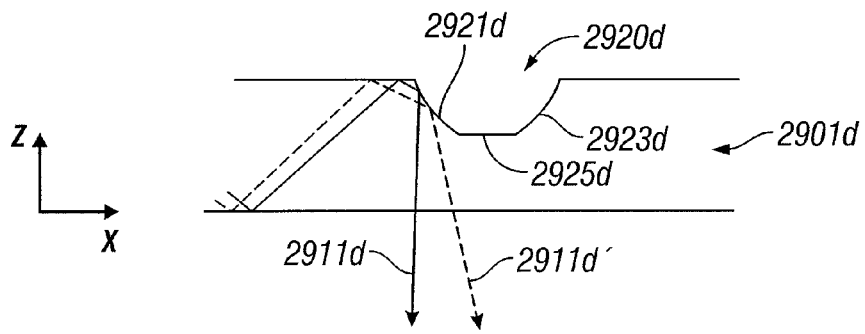
FIG. 29D is a schematic of a cross-section of an embodiment of a turning film having a frustum shaped turning feature with concave sidewalls.

FIG. 29D illustrates a cross-sectional view of another embodiment of a turning film 2901d that includes a turning feature 2920d. Turning feature 2920d includes a left curved edge 2921d and a right curved edge 2923d. Turning feature 2920d also includes a substantially straight edge 2925d between the left and right edges and disposed substantially parallel to the top and bottom of the turning film. Edges 2921d, 2923d, and 2925d form a turning feature 2920d with sidewalls that are convex relative to the turning film 2901d and disposed in the turning film in one or more planes that are at least substantially parallel to the illustrated x-z plane of the turning film. Rays of light 2911d, 2911d' are directed away from one another after reflecting off the left edge 2921d because the edge is curved. Similarly to the turning features illustrated in FIGS. 29B and 29C this results in an illumination cone of light that has an angular width that is greater than the cone of light produced by the turning feature 2920a shown in FIG. 29A (e.g., an illumination cone of light that is not collimated).

Figure 29E:
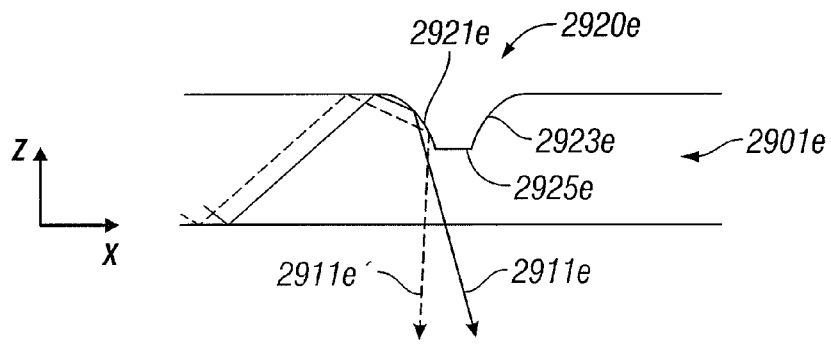
FIG. 29E is a schematic of a cross-section of an embodiment of a turning film having a frustum shaped turning feature with convex sidewalls.

FIG. 29E illustrates a cross-sectional view of another embodiment of a turning film 2901e that includes a turning feature 2920e. Turning feature 2920e includes a left curved edge 2921e and a right curved edge 2923e. Turning feature 2920e also includes a substantially straight edge 2925e between the left and right edges and disposed substantially parallel to the top and bottom of the turning film. Edges 2921e, 2923e, and 2925e form a turning feature 2920e with sidewalls that are concave relative to the turning film 2901e and disposed in the turning film in one or more planes that are at least substantially parallel to the illustrated x-z plane of the turning film. Rays of light 2911e, 2911e' are directed away from one another after reflecting off the left edge 2921e because the edge is curved. Similarly to the turning features illustrated in FIGS. 29B and 29C this results in an illumination cone of light that has an angular width that is greater than the cone of light produced by the turning feature 2920a shown in FIG. 29A (e.g., an illumination cone of light that is not collimated).

Figure 29F:
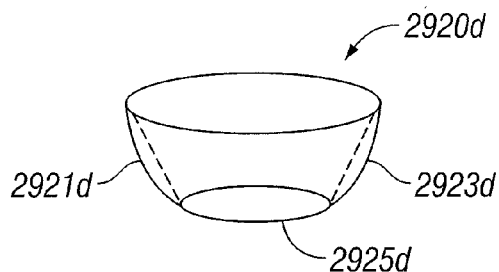
FIG. 29F is a perspective view of the turning feature of FIG. 29D.
Figure 29G:
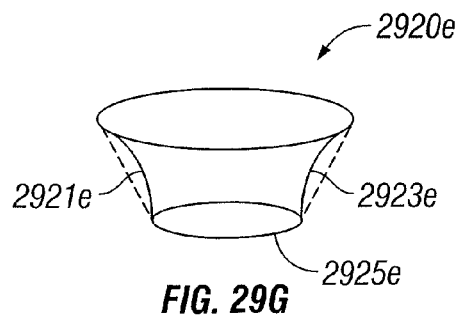
FIG. 29G is a perspective view of the turning feature of FIG. 29F.
Figure 30A:
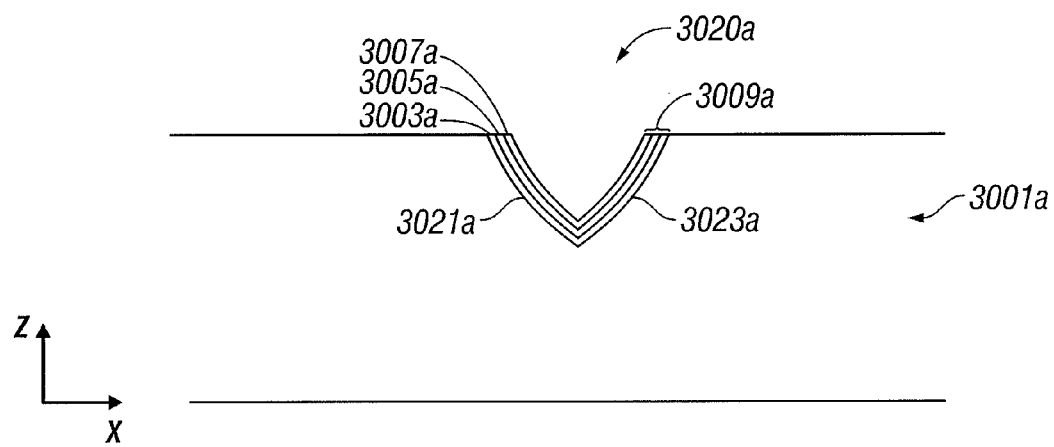
FIG. 30A is a schematic of a cross-section of an embodiment of a turning film having a concave curvilinear turning feature with multi-coated edges.
Figure 30B:
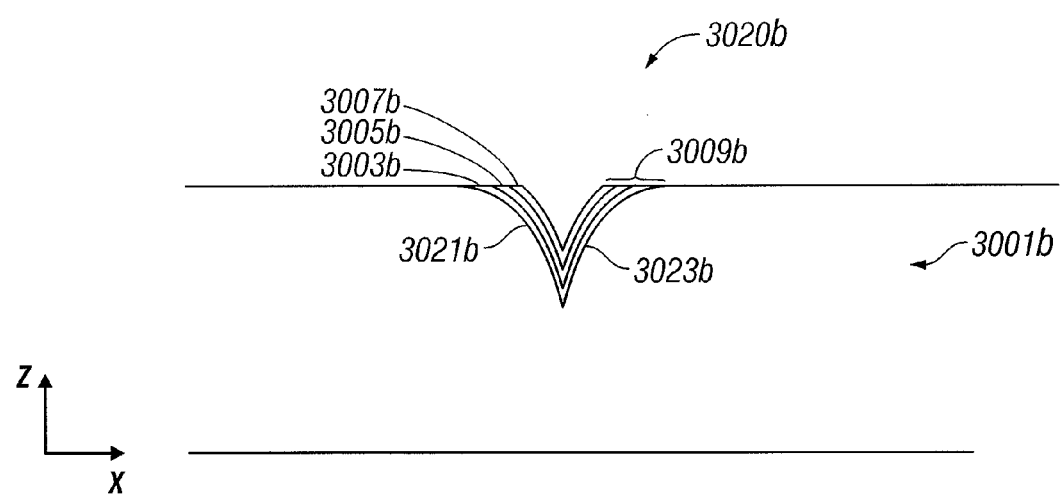
FIG. 30B is a schematic of a cross-section of an embodiment of a turning film having a convex curvilinear turning feature with multi-coated edges.
Figure 30C:
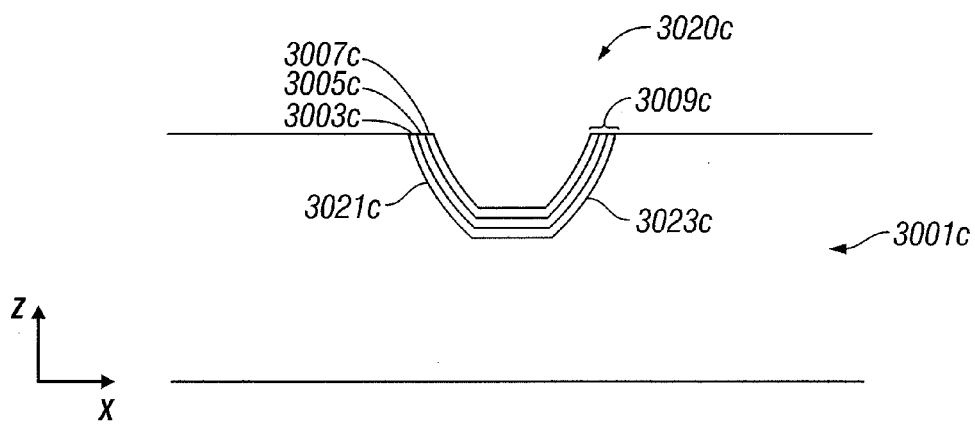
FIG. 30C is a schematic of a cross-section of an embodiment of a turning film having a frustum shaped turning feature with concave sidewalls and multi-coated edges.
Figure 30D:
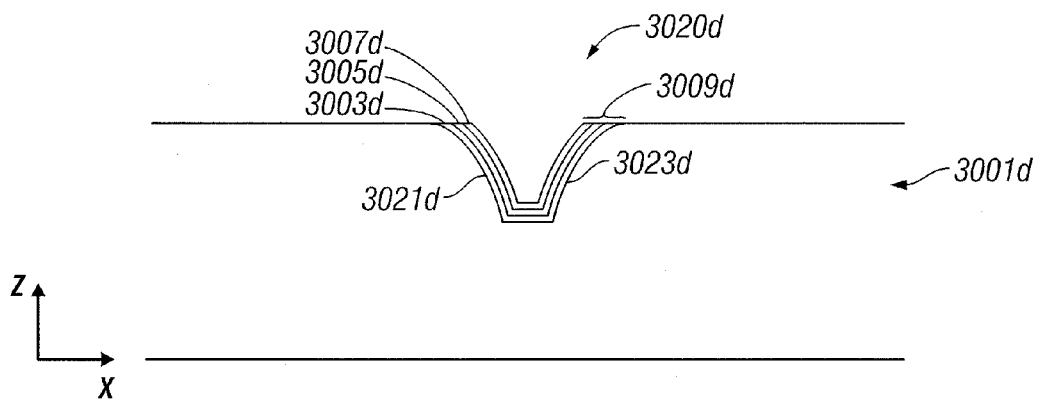
FIG. 30D is a schematic of a cross-section of an embodiment of a turning film having a frustum shaped turning feature with convex sidewalls and multi-coated edges.

FIG. 29F illustrates a perspective view of the turning feature 2920d of FIG. 29D. The surfaces of the turning feature 2920d form a truncated curvilinear shape or frustum having sidewalls that are concave relative to the space adjacent the turning feature. FIG. 29G illustrates a perspective view of the turning feature 2920e of FIG. 29E. The surfaces of the turning feature 2920e form a truncated curvilinear shape or frustum having sidewalls that are convex relative to the space adjacent the turning feature.

As discussed above, turning features can be coated with reflective layers or coatings to provide desirable optical characteristics and additional layers can be deposited over the reflective coating to prevent the reflection of light from the reflective coating towards a viewer. In some embodiments, additional layers can be deposited over the reflective coating to form a static interferometric stack, or optical mask, that appears dark or black to a viewer in order to improve the contrast of the display device while reflecting light incident on the reflective coating side of the stack towards a reflective display. FIGS. 30A-30D illustrate embodiments of turning features 3020 that have curved sidewalls or edges 3021, 3023 with reflective coatings 3003 deposited over the curved sidewalls. An optically resonant layer 3005 and absorber layer 3007 can optionally be deposited over the reflective coating 3003 to form an interferometric stack 3009. The interferometric stacks 3009 can be configured such that the absorber layers 3007 absorb light of the reflected wavelength such that the stack 3009 appears black or dark, which can increase the contrast of the display. As discussed above, the reflective coatings 3003 and/or interferometric stacks 3009 can be disposed over only a portion or portions of the surface of a turning feature 3020 or they can be disposed over the entire surface of a turning feature.

In some instances, frustum shaped turning features similar to turning feature 2920d of FIG. 29F and turning feature 2920e of FIG. 29G can be easier to manufacture or produce than the turning features shown in FIGS. 29B and 29C which do not have flat bottom edges. All of the turning features discussed herein can be manufactured, fabricated, or produced using plastic molding or by using the inorganic material system deposition and etching techniques discussed above. In some embodiments, a thin film front light can be manufactured using known film embossing techniques, for example hot or UV embossing, using a master mold tool produced by diamond turning techniques. A diamond tool can be machined so that its tip has a curved-wall cross-section and can be used to cut into a substrate (e.g., metals or alloys based on copper or nickel) to fabricate a mold with the desired curved sidewall grooves. In another example of making master tools, photolithography and etching techniques can be used to produce wafers with desired surface topography. Photolithography and etching can be used to produce a light guide by producing one or more turning features directly in a substrate, or such techniques can be used to produce a surface relief that can be used to produce turning films. By properly designing the lithography mask, turning features with concave and/or convex sidewalls or edges can be produced. For example, an etchant can be chosen that etches the photoresist material and another layer of material in order to control the curvature of the etching.

Figure 31A:
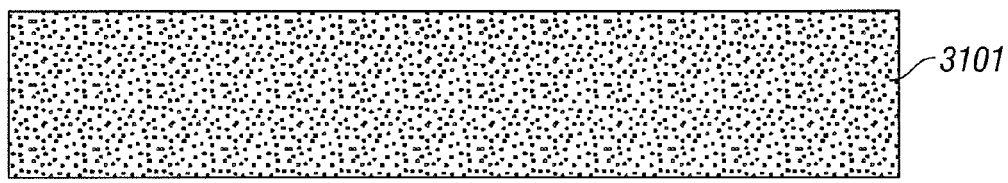
FIGS. 31A-31E are schematics of cross-sectional views illustrating steps in a process of manufacturing a turning film having convex turning features.
Figure 31B:
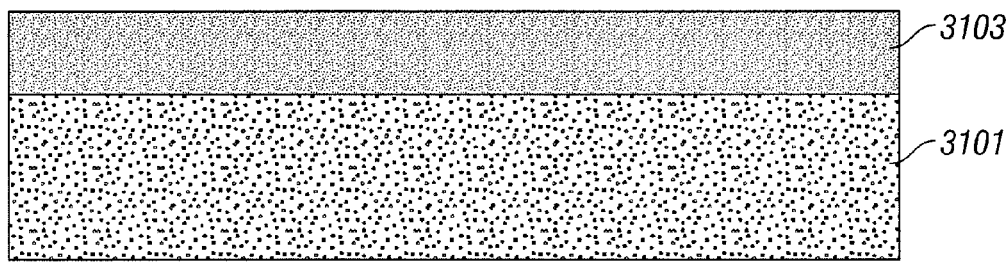

FIGS. 31A-31E illustrate one example of a process for fabricating a turning film or light guide including convex turning features. As shown in FIG. 31A, a process for fabricating a turning film or light guide can begin by providing a substrate 3101. In some embodiments, the substrate 3101 comprises silicon or silicon dioxide. With reference to FIG. 31B, a layer of material 3103 can then be deposited on the substrate. As discussed below, the layer of material 3103 can later be etched and can comprise, for example, silicon oxynitride, aluminum, and other suitable materials.

Figure 31C:
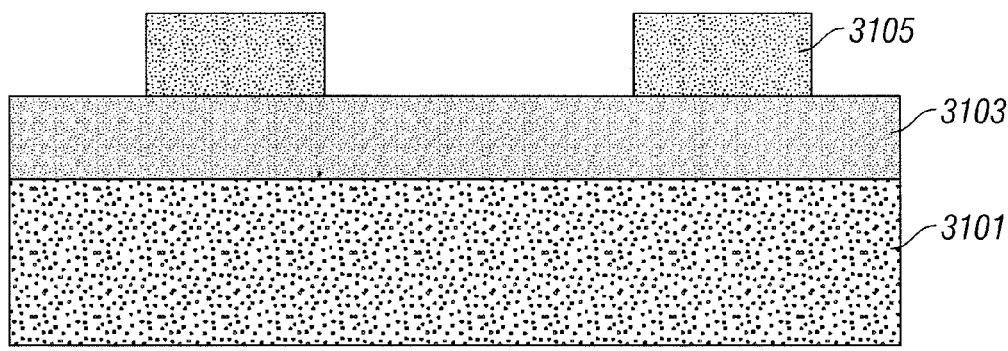
Figure 31D:
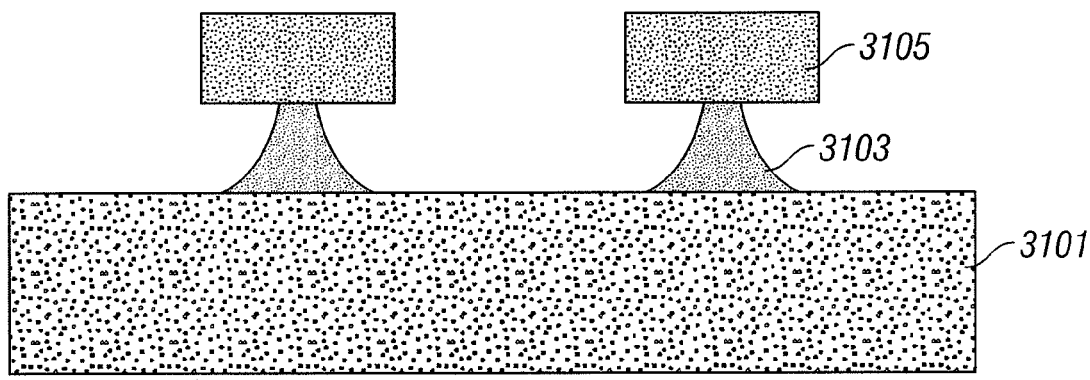
Figure 31E:
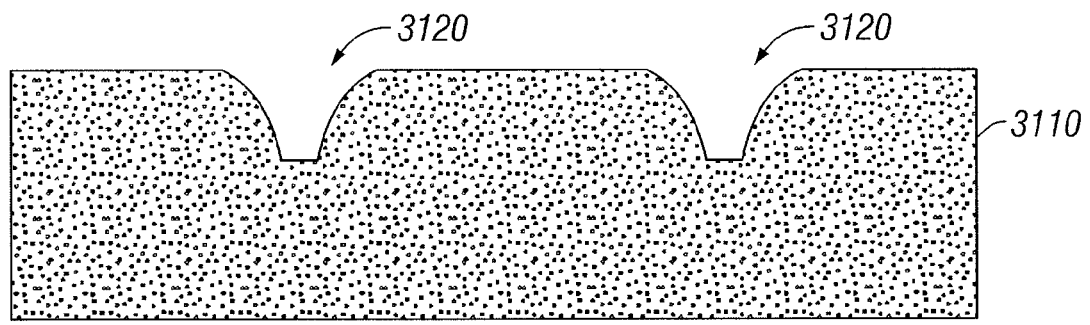

Referring now to FIG. 31C, the layer of material 3103 can then be coated with a photoresist 3105. After coating the layer of material 3103, the photoresist 3105 can be exposed and patterned through a specially designed photolithographic mask and developed to leave portions of the coat of photoresist 3105 on the layer of material 3103. Turning now to FIG. 31D, the layer of material 3103 can then be etched to produce curved sidewalls or edges. The etching process can be controlled to pull-back or etch certain portions of the photoresist in addition to the material 3103 to produce curved sidewalls (edges). For example, the material 3103 can be etched isotropically or with a combination of isotropic with anisotropic etching for tailoring the curved shape of the sidewalls. After etching, the photoresist layer can be removed resulting in a light guide or a surface relief that can be used to manufacture a turning film. When manufacturing a turning film, the surface relief can be electroplated to produce a mold that can be used to manufacture turning films that match the surface relief. As shown in FIG. 31E, with the surface relief replicated, a front light turning film 3110 including convex turning features 3120 can be tooled and embossed.

Figure 32A:
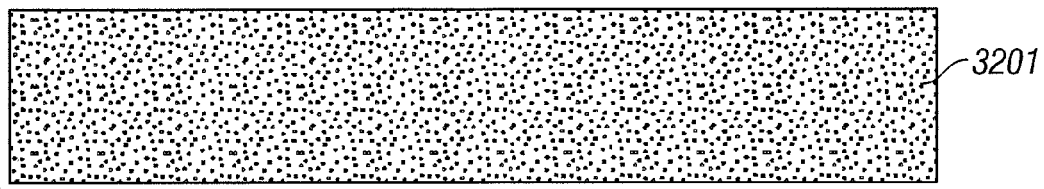
FIGS. 32A-32E are schematics of cross-sectional views illustrating steps in a process of manufacturing a turning film having a concave turning feature.
Figure 32B:
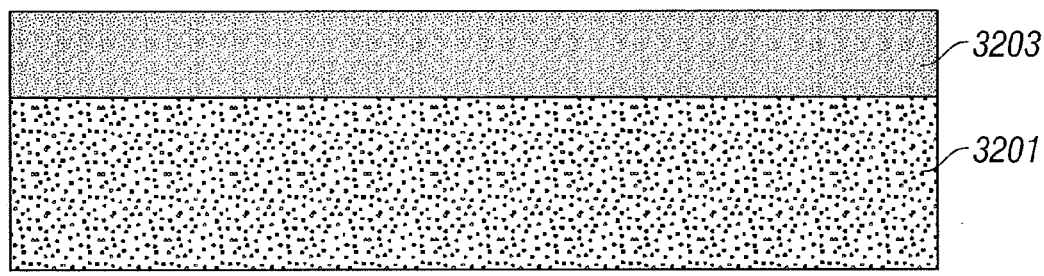

FIGS. 32A-32E illustrate one example of a process for fabricating a turning film including concave turning features. As shown in FIG. 32A, a process for fabricating a turning film can begin by providing a substrate 3201. In some embodiments, the substrate 3201 comprises silicon or silicon dioxide. With reference to FIG. 32B, a layer of material 3203 can then be deposited on the substrate. As discussed below, the layer of material 3203 can later be etched and can comprise, for example, silicon dioxide, aluminum, silicon nitride, and other suitable materials.

Figure 32C:
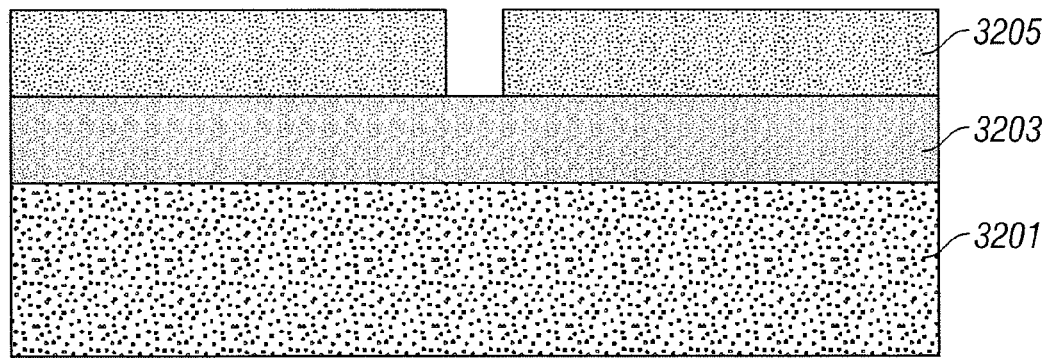
Figure 32D:
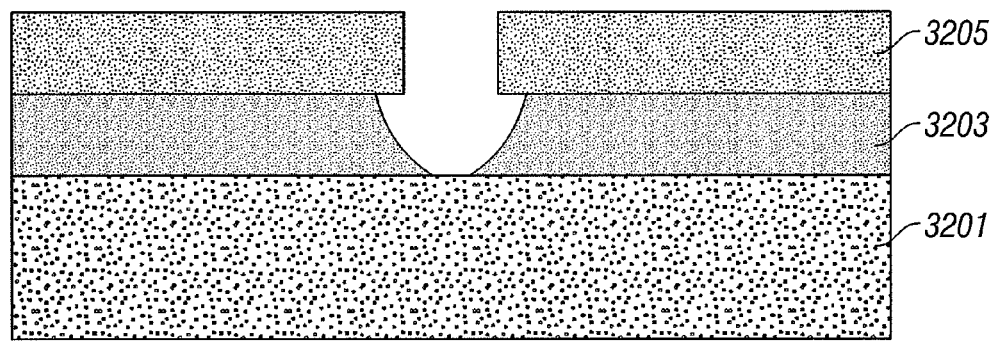
Figure 32E:
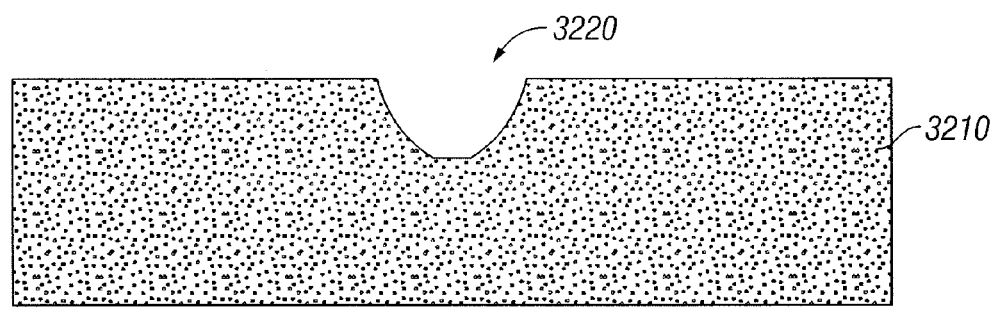

Referring now to FIG. 32C, the layer of material 3203 can then be coated with a photoresist 3205. After coating the layer of material 3203, the photoresist 3205 can be exposed through a specially designed photolithographic mask and developed to leave portions of the coat of photoresist 3205 on the layer of material 3203. Turning now to FIG. 32D, the layer of material 3203 can then be etched to produce curved sidewalls or edges. In some embodiments, the material 3203 can be etched isotropically or with a combination of isotropic with anisotropic etching for tailoring the curved shape of the sidewalls. After etching, the photoresist layer can be removed and the surface relief can be replicated by electroforming the surface. As shown in FIG. 32E, with the surface relief replicated, a front light film 3210 including a convex turning feature 3220 can be tooled and embossed.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An illumination apparatus comprising:
   a light source;
   a light guide having a generally planar first surface, a generally planar second surface opposite the first surface, a first end and a second end, and a length therebetween, wherein the light guide is positioned to receive light from the light source into the light guide first end, and wherein the light guide is configured such that light from the light source provided into the first end of the light guide propagates generally towards the second end; and
   a plurality of light turning features, each light turning feature having a turning surface configured to receive at least a portion of the light which is propagating generally towards the second end of the light guide and reflect at least a portion of the received light out of the first surface of the light guide, each light turning feature including an interferometric stack formed on at least a portion of the turning surface; wherein each light turning feature includes a depression formed in the first surface or the second surface of the light guide.

2. The apparatus of claim 1, wherein the light guide is disposed with respect to a plurality of spatial light modulators such that light reflected out of the light guide first surface illuminates the plurality of spatial light modulators.

3. The apparatus of claim 1, wherein the interferometric stack includes a reflective layer disposed on the turning surface, a spacer layer disposed on the reflective layer, and a partially reflective absorber layer disposed on the spacer layer.

4. The apparatus of claim 3, wherein the reflective layer includes aluminum.

5. The apparatus of claim 3, wherein the absorber layer includes chromium.

6. The apparatus of claim 3, wherein the spacer layer includes silicon oxide.

7. The apparatus of claim 1, further comprising a turning film having a generally planar first portion and a generally planar second portion, wherein the second portion is disposed between the first portion and the light guide.

8. The apparatus of claim 7, wherein the turning film includes the plurality of light turning features.

9. The apparatus of claim 8, wherein the plurality of light turning features are disposed in a uniform pattern on the turning film.

10. The apparatus of claim 8, wherein the plurality of light turning features are disposed in a non-uniform pattern on the turning film.

11. The apparatus of claim 7, wherein the first portion and the second portion of the turning film include at least a portion of a light turning feature.

12. The apparatus of claim 7, wherein at least one of the plurality of light turning features runs through both the first portion and the second portion.

13. The apparatus of claim 7, wherein the turning film includes at least one light turning feature in the first portion and at least one light turning feature in the second portion.

14. The apparatus of claim 13, wherein the at least one light turning feature in the first portion is laterally offset from the at least one light turning feature disposed in the second portion.

15. The apparatus of claim 1, further comprising a turning film disposed on the light guide and having first and second ends, wherein the turning film includes the light turning features.

16. The apparatus of claim 15, wherein the turning film and the light guide are configured such that at least one of the first and second ends of the turning film and at least one of the first and second ends of the light guide are curved.

17. The apparatus of claim 1, wherein at least two of the plurality of light turning features are configured with a different depth.

18. The apparatus of claim 1, wherein at least two of the plurality of light turning features are configured in a different shape.

19. The apparatus of claim 1, wherein the plurality of light turning features are disposed in a non-uniform pattern on the light guide second surface.

20. The apparatus of claim 1, wherein the plurality of light turning features are disposed in a uniform pattern on the light guide second surface.

21. The apparatus of claim 1, wherein the plurality of light turning features are disposed in a non-uniform pattern on the light guide first surface.

22. The apparatus of claim 1, wherein the plurality of light turning features are disposed in a uniform pattern on the light guide first surface.

23. The apparatus of claim 1, wherein the turning surface of at least one of the plurality of light turning features is curved.

24. The apparatus of claim 1, wherein at least one of the plurality of light turning features is frustum-shaped.

25. The apparatus of claim 1, wherein at least one of the plurality of light turning features is cone-shaped.

26. The apparatus of claim 1, wherein the plurality of light turning features are rotationally symmetrical.

27. The apparatus of claim 1, further comprising:
an array of light modulating elements positioned to receive light reflected out of the first surface of the light guide;
a processor that is configured to communicate with the array of light modulating elements, the processor being configured to process image data; and
a memory device that is configured to communicate with the processor.

28. The apparatus of claim 27, further comprising a driver circuit configured to send at least one signal to the array of light modulating elements.

29. The apparatus of claim 28, further comprising a controller configured to send at least a portion of the image data to the driver circuit.

30. The apparatus of claim 27, further comprising an image source module configured to send the image data to the processor.

31. The apparatus of claim 30, wherein the image source module includes at least one of a receiver, transceiver, or transmitter.

32. The apparatus of claim 27, further comprising an input device configured to receive input data and to communicate the input data to the processor.

33. The apparatus of claim 1, further comprising a turning film disposed on the light guide, the turning film having a first end and a second end, wherein the light source is further configured to provide light into the turning film first end such that the light propagates through the turning film towards the turning film second end, wherein the turning film includes the plurality of light turning features.

34. An illumination apparatus comprising:
means for providing light;
means for guiding light, wherein the light guiding means has a planar first surface, a generally planar second surface, a first end and a second end, and a length therebetween, wherein the light guiding means is configured such that light from the light providing means provided into the light guiding means first end propagates generally towards the light guiding means second end; and
a plurality of means for turning light, each means for turning light having a turning surface configured to receive light propagating towards the second end of the light guiding means and reflect at least a portion of the received light out of the light guiding means first surface, each means for turning light including an interferometric stack formed on the turning surface; wherein each means for turning for turning light includes a depression formed in the first surface or the surface of the means for guiding light.

35. The apparatus of claim 34, wherein the light providing means includes a light emitting diode.

36. The apparatus of claim 34, wherein the light guiding means includes a light guide.

37. The apparatus of claim 34, wherein the plurality of light turning means includes frustum-shaped light turning features.

38. An illumination apparatus comprising:
a light source;
a light guide having a generally planar first surface, a generally planar second surface, first end and a second end, and a length therebetween, the light guide positioned to receive light from the light source into the light guide first end, and the light guide configured such that light from the light source provided into the first end of the light guide propagates generally towards the second end; and
a plurality of light turning features, each light turning feature having a turning surface configured to receive at least a portion of the light which is propagating generally towards the second end of the light guide and reflect at least a portion of the received light out of the planar first surface of the light guide, each light turning feature including a reflective layer disposed over at least a portion of each turning surface; and
a plurality of optical masks, each optical mask formed on a reflective layer, each optical mask including a dark coating; the dark coating including an absorbing layer that forms an interferometric stack with the reflective layer; wherein each light turning feature includes a depression formed in the first surface or the second surface of the light guide.

* * * * *